United States Patent
Beach et al.

(10) Patent No.: US 12,447,171 B2
(45) Date of Patent: Oct. 21, 2025

(54) AZACITIDINE IN COMBINATION WITH VENETOCLAX, GILTERITINIB, MIDOSTAURIN OR OTHER COMPOUNDS FOR TREATING LEUKEMIA OR MYELODYSPLASTIC SYNDROME

(71) Applicant: CELGENE QUANTICEL RESEARCH, INC., San Diego, CA (US)

(72) Inventors: C L Beach, Lee's Summit, MO (US); Shelonitda Rose, Branchburg, NJ (US); Diana R. Dunshee, Alamo, CA (US); Daniel E. Lopes De Menezes, Berkeley, CA (US); Kyle MacBeth, Santa Rosa, CA (US); Yumin Dai, Danville, CA (US); Jessica Jang, New York, NY (US); Mark Frattini, Ridgewood, NJ (US)

(73) Assignee: Celgene Quanticel Research, Inc., San Diego, CA (US)

( * ) Notice: Subject to any disclaimer, the term of this patent is extended or adjusted under 35 U.S.C. 154(b) by 958 days.

(21) Appl. No.: 17/620,545

(22) PCT Filed: Jun. 19, 2020

(86) PCT No.: PCT/US2020/038772
§ 371 (c)(1),
(2) Date: Dec. 17, 2021

(87) PCT Pub. No.: WO2020/257671
PCT Pub. Date: Dec. 24, 2020

(65) Prior Publication Data
US 2022/0249529 A1 Aug. 11, 2022

Related U.S. Application Data

(60) Provisional application No. 62/864,413, filed on Jun. 20, 2019.

(51) Int. Cl.
| | | |
|---|---|---|
| A61K 31/706 | (2006.01) |
| A61K 31/407 | (2006.01) |
| A61K 31/497 | (2006.01) |
| A61K 31/501 | (2006.01) |
| A61K 31/513 | (2006.01) |
| A61K 31/553 | (2006.01) |
| A61K 31/635 | (2006.01) |
| A61P 35/02 | (2006.01) |

(52) U.S. Cl.
CPC .......... *A61K 31/706* (2013.01); *A61K 31/407* (2013.01); *A61K 31/497* (2013.01); *A61K 31/501* (2013.01); *A61K 31/513* (2013.01); *A61K 31/553* (2013.01); *A61K 31/635* (2013.01); *A61P 35/02* (2018.01)

(58) Field of Classification Search
None
See application file for complete search history.

(56) References Cited

U.S. PATENT DOCUMENTS

| | | |
|---|---|---|
| 9,255,097 B2 | 2/2016 | Chen et al. |
| 9,822,119 B2 | 11/2017 | Chen et al. |
| 2009/0286752 A1 | 11/2009 | Etter et al. |
| 2019/0367473 A1 | 12/2019 | Chen et al. |
| 2022/0331265 A1 | 10/2022 | Ciceri et al. |

FOREIGN PATENT DOCUMENTS

| | | |
|---|---|---|
| CN | 107074787 A | 8/2017 |
| CN | 108473442 A | 8/2018 |
| CN | 109462980 A | 3/2019 |
| WO | WO-2016/040238 A1 | 3/2016 |
| WO | WO-2017/066571 A1 | 4/2017 |
| WO | WO-2017/066611 A1 | 4/2017 |
| WO | WO 2017/157813 A1 | 9/2017 |
| WO | WO-2018/106984 A1 | 6/2018 |
| WO | WO-2019/006299 A1 | 1/2019 |
| WO | WO 2019/012328 A1 | 1/2019 |
| WO | WO 2020/127503 A1 | 6/2020 |

OTHER PUBLICATIONS

Pollyea, Daniel Aaron, et al. "Results of a phase 1b study of venetoclax plus decitabine or azacitidine in untreated acute myeloid leukemia patients≥ 65 years ineligible for standard induction therapy." (2016): 7009-7009.*

Cogle et al., "Oral Azacitidine (CC-486) for the Treatment of Myelodysplastic Syndromes and Acute Myeloid Leukemia", The Oncologist, vol. 20, pp. 1404-1412 (2015).

Dinardo et al., "Safety and preliminary efficacy of venetoclax with decitabine or azacytidine in elderly patients with previously untreated acute myeloid leukaemia: a non-randomised, open-label, phase 1b study", Lancet Oncol., vol. 19(2), pp. 216-228 (Feb. 2018).

Gore et al., "Oral Azacitidine (AZA) Activity in Patients with Acute Myelogenous Leukemia (AML)", Blood, vol. 118(21), Abstract 1546, pages (Nov. 2011).

Office Action issued in Eurasia Patent Application No. 202290052, dated Mar. 3, 2024.

DiNardo, et al., "Mutant Isocitrate Dehydrogenase (mIDH) Inhibitors, Enasidenib or Ivosidenib, in Combination with Azacitidine (AZA): Preliminary Results of a Phase 1b/2 Study in Patients with Newly Diagnosed Acute Myeloid Leukemia (AML)," Blood, vol. 130, No. Suppl. 1, p. 639 (Dec. 2017).

Swaminathan Mahesh, et al., "The Combination of Quizartinib with Azacitidine or Low Dose Cytarabine is Highly Active in Patients (Pts) with FLT3-ITD Mutated Myeloid Leukemias: Interim Report of a Phase I/II Trial," Blood, vol. 130, No. Suppl. 1, p. 723 (Dec. 2017).

(Continued)

*Primary Examiner* — Patrick T Lewis
(74) *Attorney, Agent, or Firm* — Foley & Lardner LLP

(57) ABSTRACT

Provided herein are methods for using 5-azacytidine in combination with additional agents to treat diseases and disorders including AML.

39 Claims, 56 Drawing Sheets

(56) References Cited

OTHER PUBLICATIONS

Aboudalle Iman, et al., "Phase I-II Study of Crenolanib Combined with Standard Salvage Chemotherapy and Crenolanib Combined with 5-Azacitidine in Acute Myeloid Leukemia Patients with FLT3 Activitating Mutations," *Blood*, vol. 132, No. Suppl. 1, p. 2715 (Nov. 2018).

Esteve Jordi et al., "Multicnter, Open-Label, 3-Arm Study of Gilteritinib, Gilteritinib Plus Azacitidine, or Azacitidine Alone in Newly Diagnosed FLT3 Mutated (FLT3(mut+)) Acute Myeloid Leukemia (AML) Patients Ineligible for Intensive Induction Chemotherapy: Findings from the Safey Cohort," *Blood*, vol. 132, No. Suppl. 1, p. 2736 (Nov. 2018).

Montesinos, et al., "PF277 Alice: An AML Study with LSD1 Inhibition in Combination with Azacitidine in the Elderly," Hemasphere, 24th Congress of the European Hematology Association, vol. 3, No. Supplement 1, p. 90, (Jun. 2019).

Bradley, et al., "Leveraging Hypomethylating Agents for Better MDS Therapy," Current Hematologic Malignancy Reports, Current Science Inc., vol. 13, No. 6, pp. 507-515 (Sep. 2018).

International Search Report and Written Opinion issued in International Patent Application No. PCT/US2020/038772, dated Sep. 4, 2020.

Quentmeier et al., "FLT3 Mutations in Acute Myeloid Leukemia Cell Lines," *Leukemia*, vol. 17, No. 1, pp. 120-124 (Jan. 2003).

Yoshimoto et al., FLT3-ITD up-regulates MCL-1 to promote survival of stem cells in acute myeloid leukemia via FLT3-ITD-specific STAT5 activation, *Blood*, vol. 114, No. 24, pp. 5034-5043 (Dec. 2009).

Rai et al., "Treatment of Acute Myelocytic Leukemia: A Study by Cancer and Leukemia Group B," *Blood*, vol. 58, pp. 1203-1212 (1981).

Winer et al., "Novel therapy in Acute myeloid leukemia (AML): moving toward targeted approaches," *Ther. Adv. Hematol.*, vol. 10, 18 pages (Jul. 2019).

Aparicio, "Review of the clinical experience with 5-azacitidine and 5-aza-2'-deoxycytidine in solid tumors," Current Opinion Investigational Drugs, vol. 3, No. 4, pp. 627-633 (2002).

Khan, et al., "Hypomethylation and apoptosis in 5-azacytidine-treated myeloid cells," *Experimental Hematology*, vol. 36, No. 2, pp. 149-157 (2008).

Tsai et al., "Transient Low Doses of DNA-Demethylating Agents Exert Durable Antitumor Effects on Hematological and Epithelial Tumor Cells," Cancer Cell, vol. 21, No. 3, pp. 430-446 (2012).

Garcia-Manero et al., "Efficacy and safety of extended dosing schedules of CC-486 (oral azacitidine) in patients with lower-risk myelodysplastic syndromes," Leukemia, vol. 30, No. 4, pp. 889-896 (2016).

Lyons et al., "Hematologic Response to Three Alternative Dosing Schedules of Azacitidine in Patients with Myelodysplastic Syndromes," *J. Clin. Oncol.*, vol. 27, No. 11, pp. 1850-1856 (Apr. 2009).

Di Veroli et al., "Combenefit: an interactive platform for the analysis and visualization of drug combinations," Bioinformatics, 32(18), pp. 2866-2868 (Sep. 2016).

Garcia-Manero et al., "A Pilot Pharmacokinetic Study of Oral Azacitidine," Leukemia, vol. 22, pp. 1680-1684 (2008).

Guo, et al., "A Bayesian interval dose-finding design addressing Ockham's razor: mTPI-2," Contemp. Clin. Trials, pp. 23-33 (Jul. 2017).

Abdelall et al., "The Combination of Quizartinib with Azacitidine or Low Dose Cytarabine Is Highly Active in Patients (Pts) with FLT3-ITD Mutated Myeloid Leukemias: Interim Report of a Phase I/II Trial," Blood, Dec. 2, 2016, vol. 128, No. 22 (5 pages).

Bao Jiyin et al., "Advances in the Research of Enzyme Inhibitors for AML," Guangdong Chemical Industry, vol. 46, No. 5, Mar. 18, 2019 (pp. 116-119) [Abstract only.

Chinese First Office Action with Search Report on CN Appl. Ser No. 202080057984.0 dated Jun. 7, 2023 (12 pages).

CN Office Action Appl. Ser. No. 202080058723 dated May 31, 2023 (20 pages).

Dinardo et al., "Mutant Isocitrate Dehydrogenase 1 Inhibitor Ivosidenib in Combination With Azacitidine for Newly Diagnosed Acute Myeloid Leukemia," Journal of Clinical Oncology, 2020 by American Society of Clinical Oncology vol. 39, No. 1 (11 pages).

Dinardo et al., "Venetoclax combined with decitabine or azacitidine in treatment-naive, elderly patients with acute myeloid leukemia," Blood, Jan. 3, 2019, vol. 133, No. 1 (pp. 7-17).

Pollyea et al., "Venetoclax with azacitidine disrupts energy metabolism and targets leukemia stem cells in patients with acute myeloid leukemia," Nature Medicine, Dec. 2018, vol. 24, No. 12 (pp. 1859-1866).

Singapore Search Report with Written Opinion on SG Appl. Ser. No. 11202114059U dated Jul. 24, 2023 (11 pages).

Strati et al., "Phase I/II trial of the combination of midostaurin (PKC412) and 5-azacitidine for patients with acute myeloid leukemia and myelodysplastic syndrome," American Journal of Hematology, Apr. 2015, vol. 90, No. 4 (pp. 276-281).

SG Written Opinion with Invitation to Respond for SG Appl. Ser. No. 11202114060Q, dated Aug. 2, 2023 (8 pages).

J. Huang, "Formulation Forum—Considerations in Formulation Development of Injectable Solutions," Drug Development & Delivery, 21(4):28 (May 2021), 8 pages.

Non-Final Office Action on U.S. Appl. No. 17/620,541, dated Jan. 28, 2025.

Vinarov, et al., "Current Challenges and Future Perspectives in Oral Absorption Research: An Opinion of the UNGAP Network," Advanced Drug Delivery Reviews, vol. 171, pp. 289-331 (2021).

* cited by examiner

FIG. 4
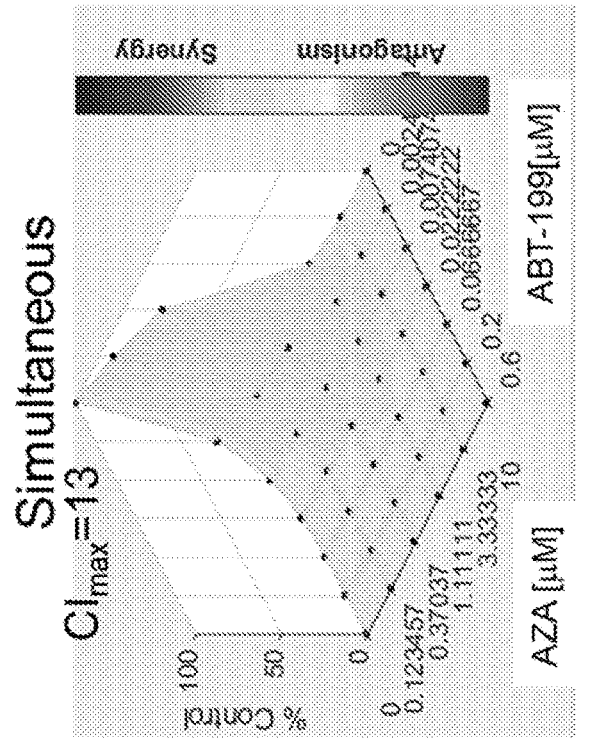
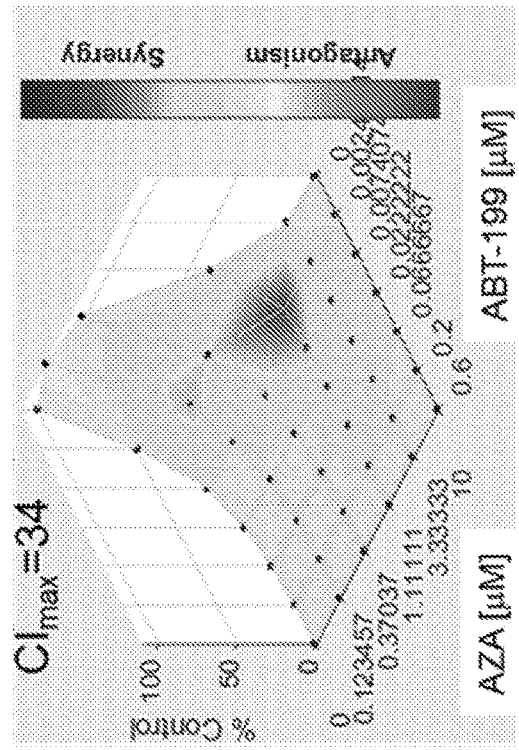

c

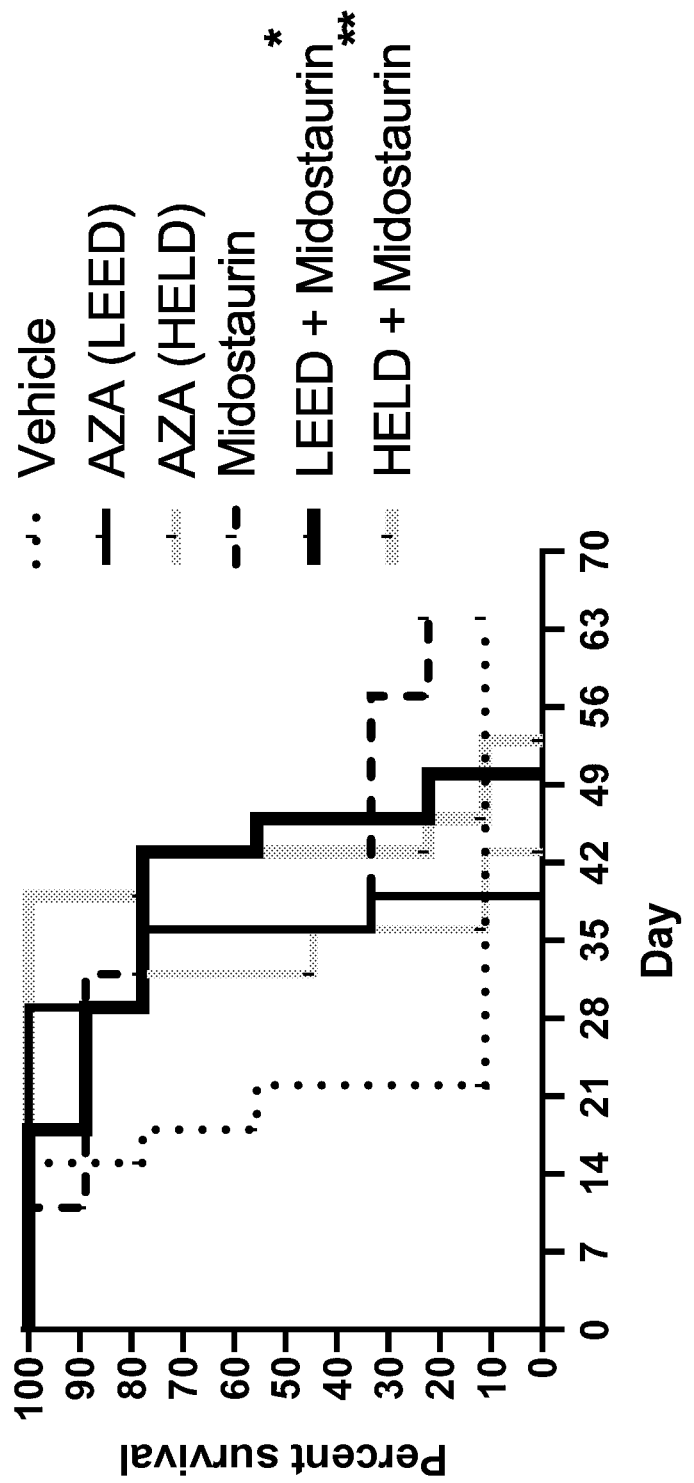

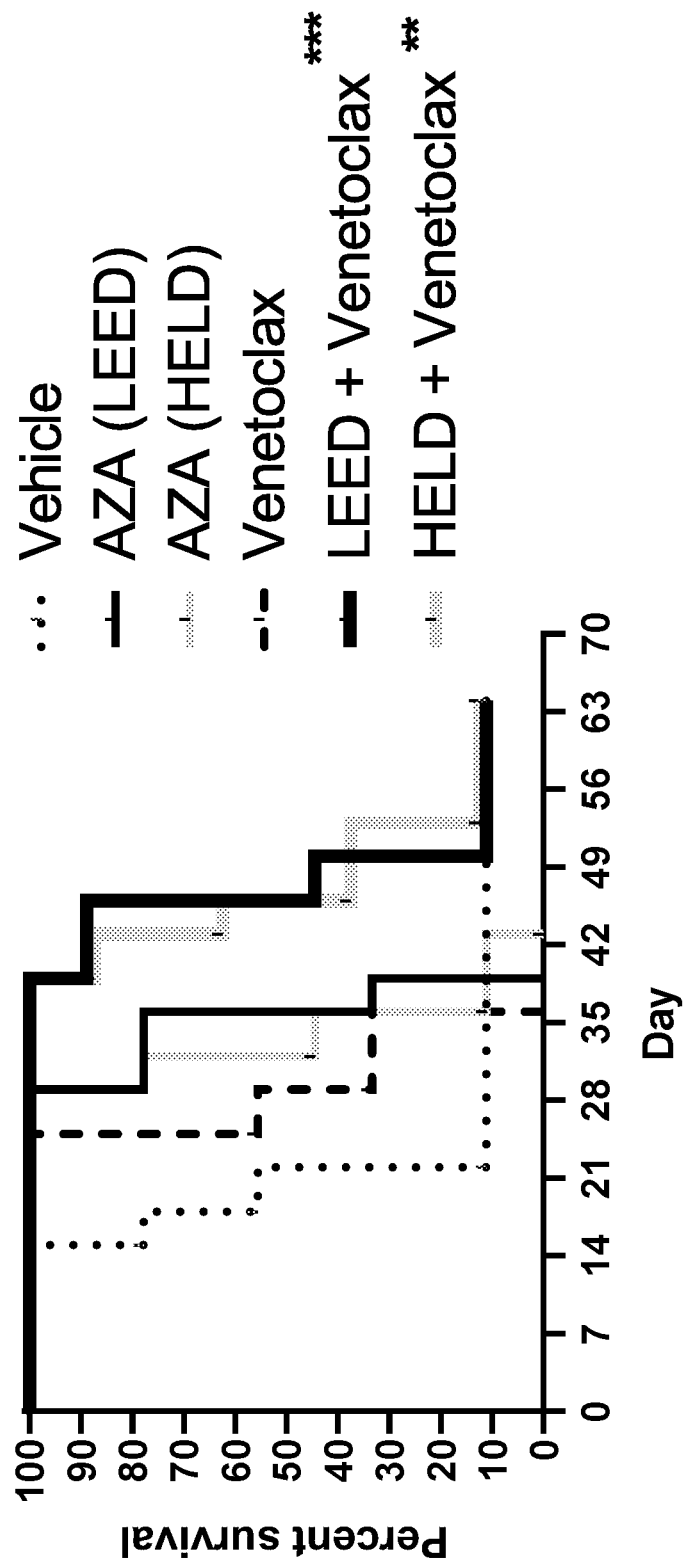

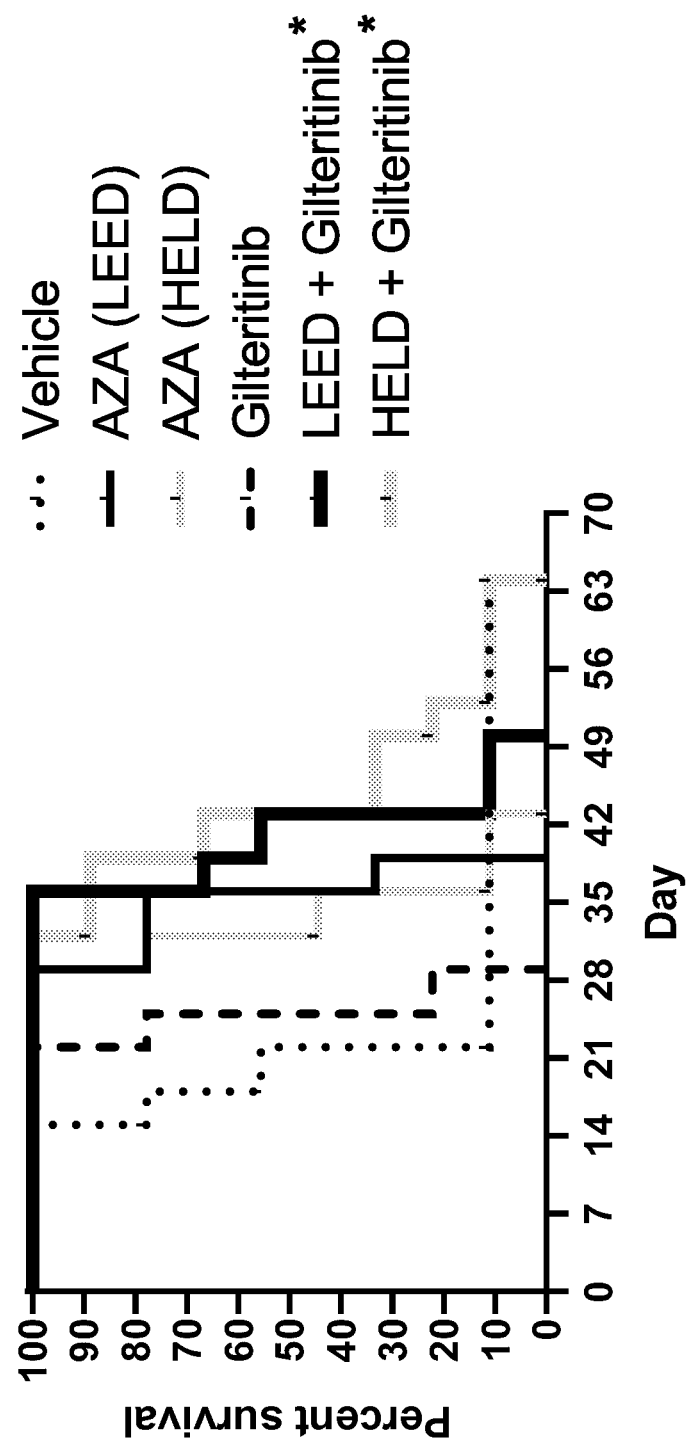

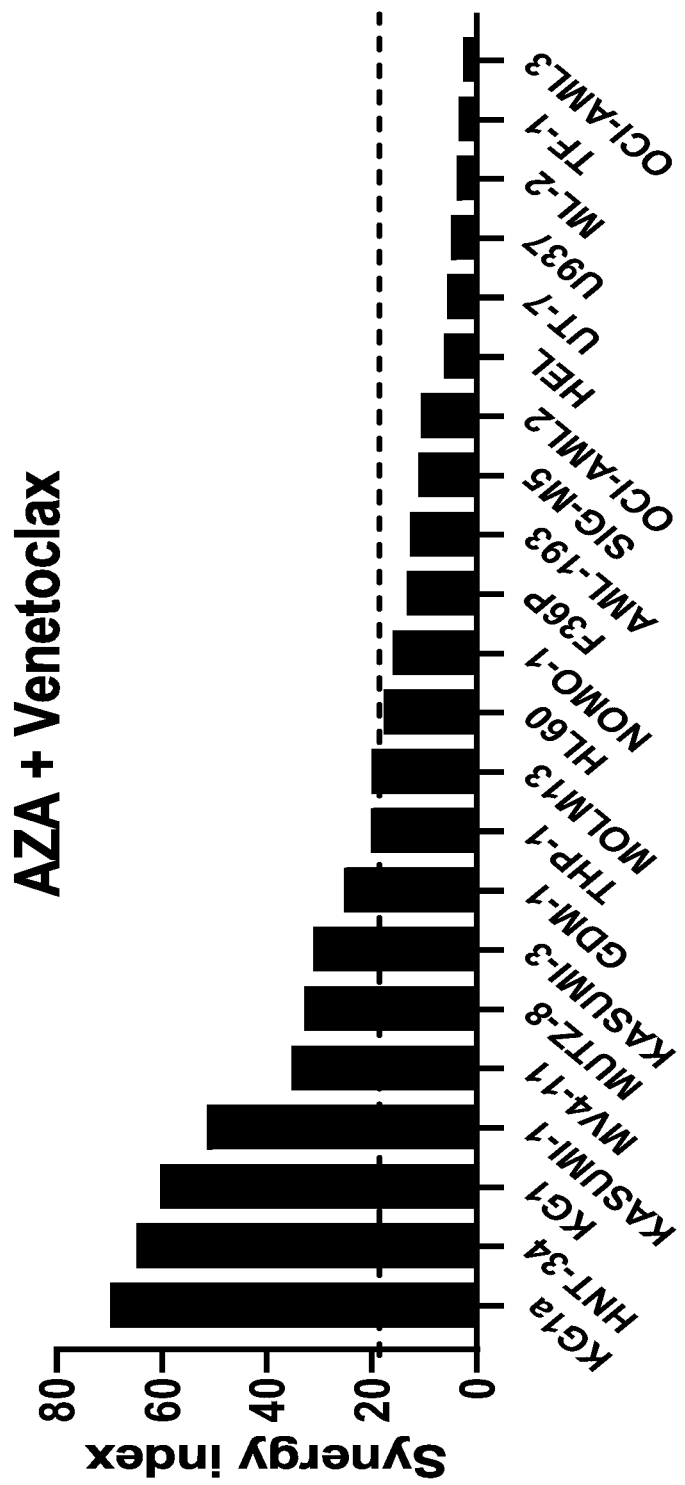

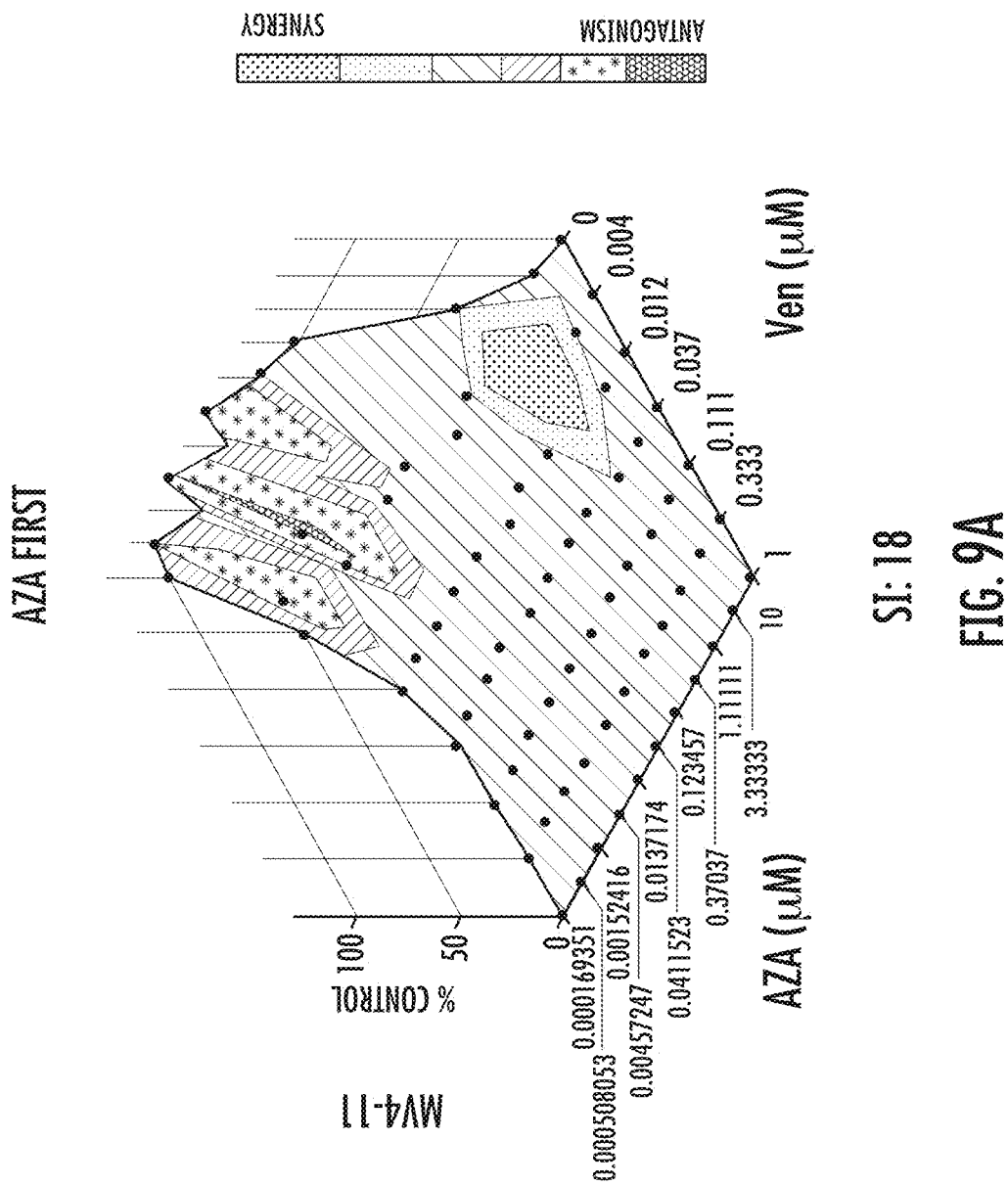

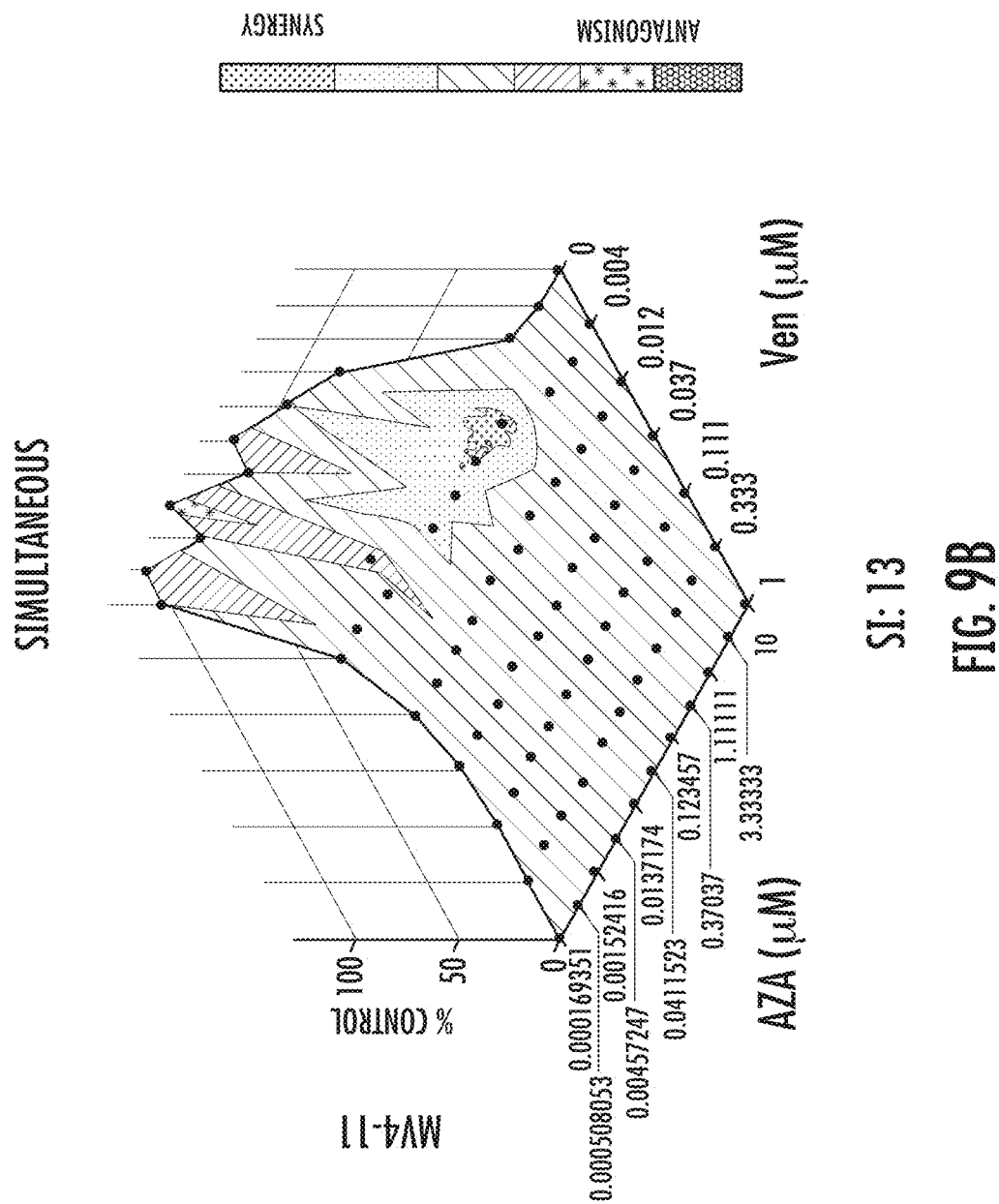

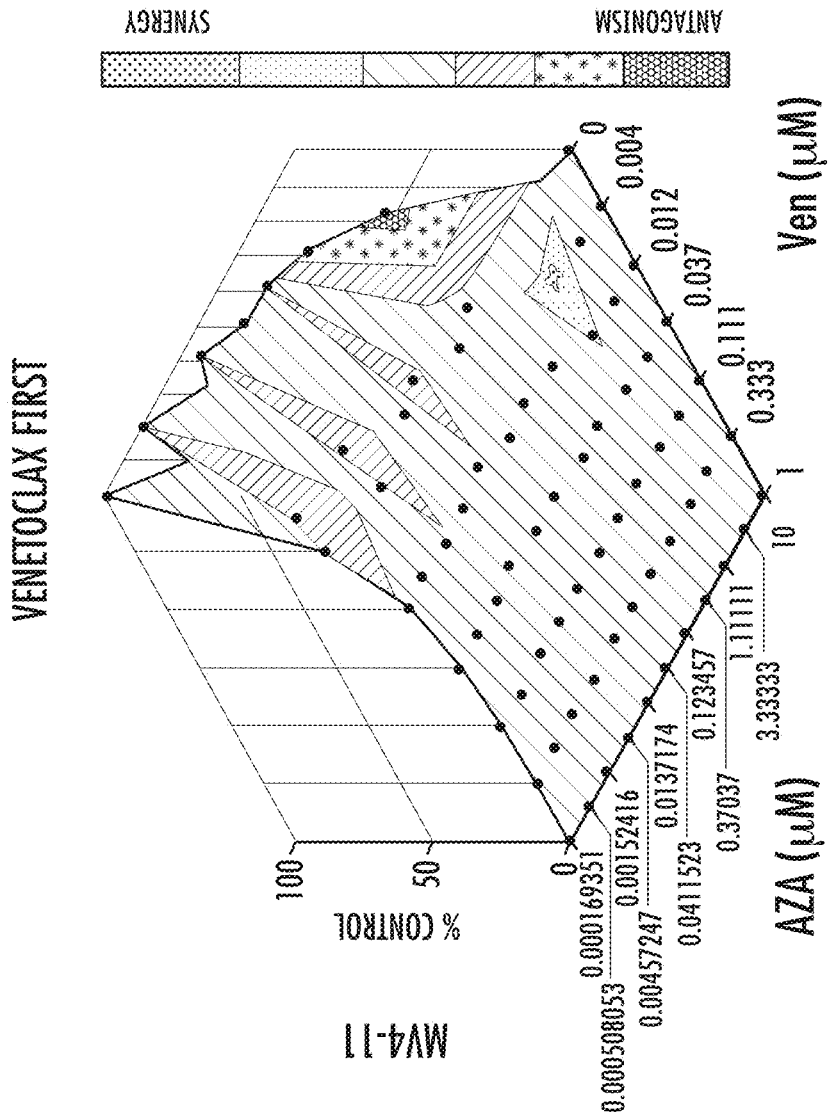

FIG. 10A

BaF3 cells expressing various FLT3 (EC50, nM)

|  | BaF-FLT3(WT) | BaF-FLT3-ITD | BaF-FLT3(D835Y) |
|---|---|---|---|
| AZA | 189 | 598 | 456 |
| Gilteritinib | 4 | 1.8 | 1.8 |
| Midostaurin | 23 | 5.5 | 5.4 |
| Quizartinib | 3 | 0.008 | 9.5 |
| Venetoclax | >10000 | >10000 | 4332 |

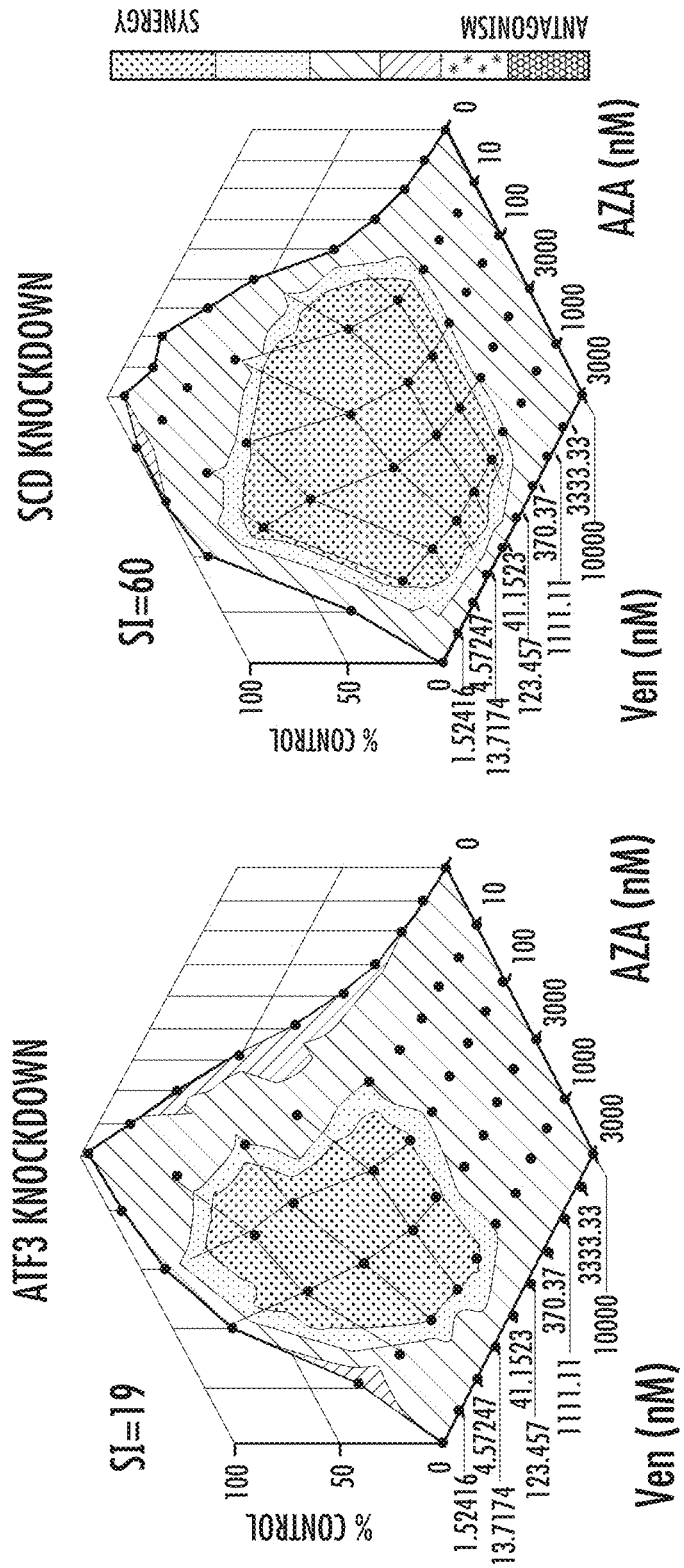

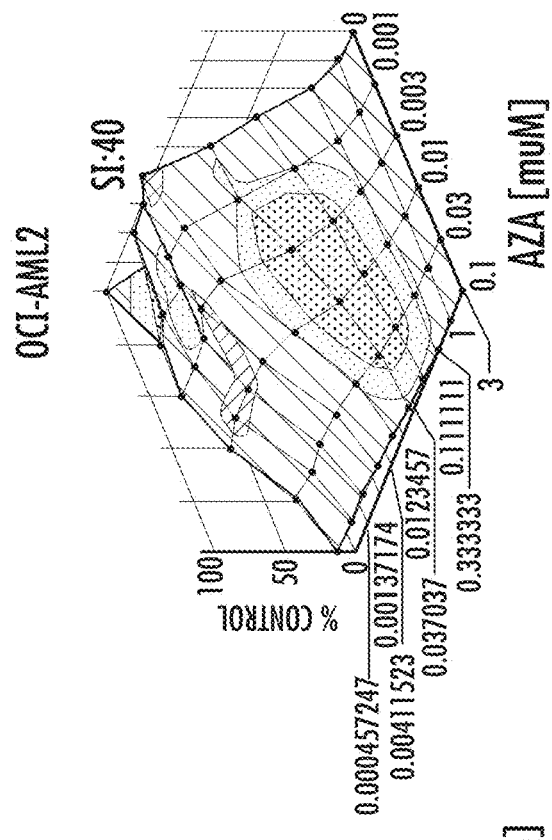
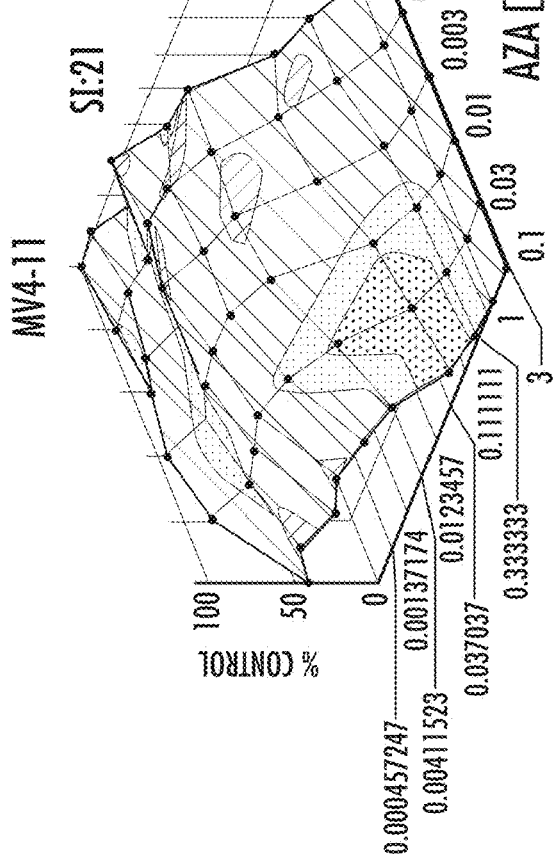
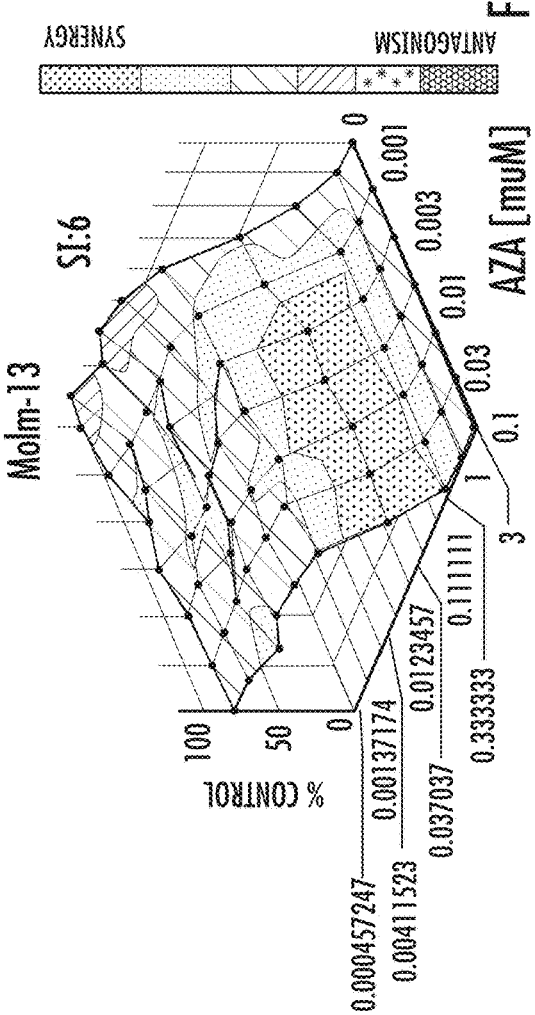
FIG. 19A
FIG. 19B
FIG. 19C

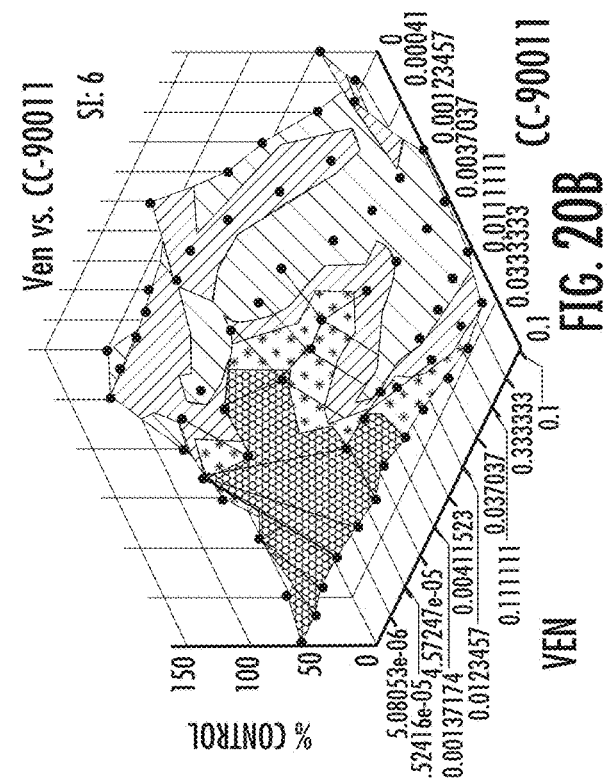
FIG. 20A
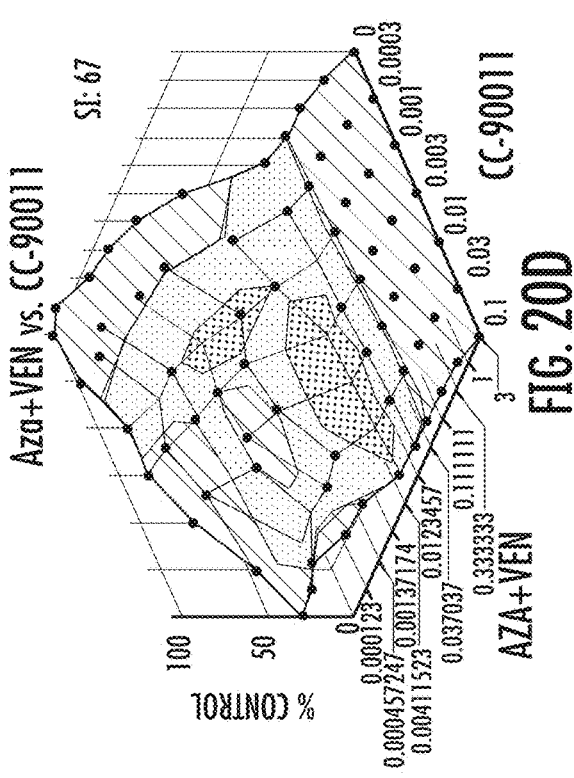
FIG. 20B
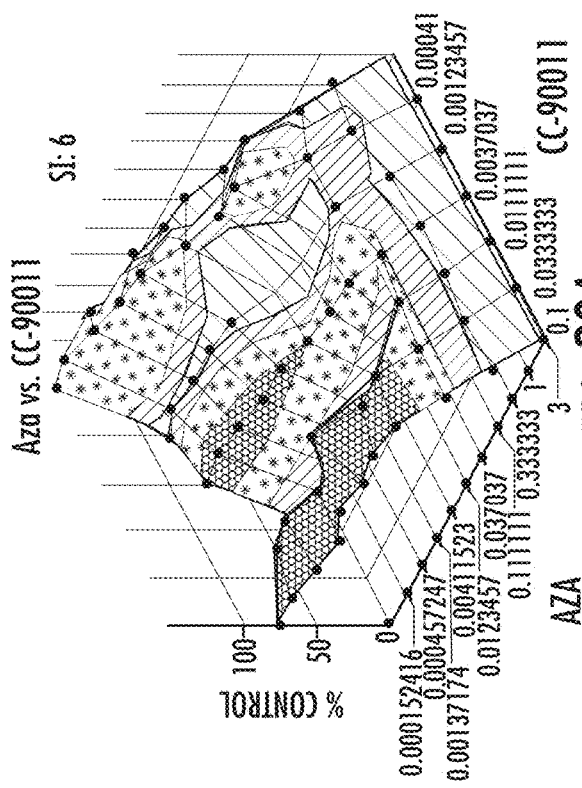
FIG. 20C
FIG. 20D

AZACITIDINE IN COMBINATION WITH VENETOCLAX, GILTERITINIB, MIDOSTAURIN OR OTHER COMPOUNDS FOR TREATING LEUKEMIA OR MYELODYSPLASTIC SYNDROME

RELATED APPLICATIONS

This application is the U.S. National Stage of International Patent Application No. PCT/US2020/038772, filed Jun. 19, 2020, which claims the benefits of priority from U.S. Provisional Patent Application No. 62/864,413, filed Jun. 20, 2019, the entire contents of these applications are incorporated herein by reference in their entirety.

FIELD

Provided are methods for using 5-azacytidine in combination with one or more additional therapeutic agents to treat diseases and disorders, which include acute myeloid leukemia (AML).

BACKGROUND

Acute myeloid leukemia (AML) is a type of cancer that affects the bone marrow and blood. AML is known by a variety of names, including acute myelogenous leukemia, acute myeloblastic leukemia, acute granulocytic leukemia, and acute nonlymphocytytic leukemia. The word "acute" in acute myelogenous leukemia reflects the disease's rapid progression. It is called myelogenous leukemia because it affects a group of white blood cells called the myeloid cells, which normally develops into the various types of mature blood cells, such as red blood cells, white blood cells, and platelets. In other words, AML is a malignancy of the myeloid precursor cell line, characterized by the rapid proliferation of abnormal cells, which accumulate in the bone marrow and interfere with the production of normal cells.

AML is generally classified as de novo, or secondary when arising following exposure to prior cytotoxic chemotherapy, or after a history of prior myelodysplastic syndrome (MDS) or antecedent hematologic disorder (AHD). The pathogenesis of AML at the genetic level is also heterogeneous. Genetic alterations in AML include an internal tandem duplication in a tyrosine kinase gene, chromosomal rearrangements that alter the functioning of genes involved in leukemogenesis, and mutations resulting in activation of transcription factors, etc. Comprehensive profiling of genetic alterations in AML will enhance disease classification, risk stratification and prognosis, and ultimately, allow more precise therapeutic interventions. MV4-11 and MOLM-13 are AML cell lines that express FLT3 mutations. See Quentmeier et al., *Leukemia*, 17(1):120-4 (January 2003). FLT3-ITD up-regulates MCL-1 to promote survival of stem cells in AML. See Yoshimoto et al., *Blood*, 114(24): 5034-43 (Dec. 3, 2009).

Current strategies of AML treatment include inductive chemotherapy (IC) for remission induction and low-intensity therapy intended for survival prolongation. The remission-induction chemotherapy is a cytoreductive modality for achieving remission or at least effective reduction of tumor burden. The combination of cytarabine and anthracycline has been the mainstay of treatments to induce remission. A common induction regimen consists of cytarabine 100 to 200 mg/m$^2$/day for 7 days and daunorubicin 45 to 90 mg/m$^2$/day for 3 days, often referred to as the "7+3 protocol." If remission is achieved, additional cycles of chemotherapy or stem cell transplantation from a donor (allogeneic hematopoietic stem cell transplantation [HSCT]) are employed for consolidation. Although IC has become the standard for younger fit patients, it remains a matter of debate in the elderly and unfit population. In elderly patients who have received IC, outcomes are less favorable primarily due to the increased rate of treatment-related death and poor prognostic factors leading to lower remission rates seen in the elderly population. Treatment options for patients considered ineligible or unfit due to age, performance status, and co-morbidities or those who choose not to receive IC current chemotherapy options include low-dose cytarabine, 5-azacytidine, or decitabine.

Although induction chemotherapy produces morphologic complete remissions (CRs) in about 60% to 80% of younger adults and 40% to 50% of older adults with newly diagnosed AML, there is a substantial population of patients who will fail to attain CR (ie, refractory). Even for those who attain CR after induction treatment, a significant portion will eventually relapse, leading to only about 29% relapse-free survival at 3 years.

Thus, there is a need for more effective treatments for AML, and this disclosure addresses this need.

SUMMARY

Provided herein are methods of treating diseases and disorders including AML, using 5-azacytidine in combination with at least one additional therapeutic agent and a lysine specific demethylase-1 (LSD-1) inhibitor or a pharmaceutically acceptable salt thereof.

Certain embodiments herein provide that the additional therapeutic agent is selected from gilteritinib, midostaurin, quizartinib, enasidenib, ivosidenib, or venetoclax.

Provided in one aspect is a method of treating a human subject having acute myeloid leukemia (AML), wherein the method comprises administering to the subject a combination of (i) a pharmaceutical composition comprising 5-azacytidine, (ii) at least one additional therapeutic agent, and (iii) a lysine specific demethylase-1 (LSD-1) inhibitor or a pharmaceutically acceptable salt thereof.

In some embodiments, the subject is not eligible for intensive induction chemotherapy.

In some embodiments, the 5-azacytidine and the at least one additional therapeutic agent are administered concomitantly. In some embodiments, the 5-azacytidine and the at least one additional therapeutic agent are administered sequentially wherein the 5-azacytidine is administered first.

In some embodiments, the 5-azacytidine and the at least one additional therapeutic agent are co-formulated as a single unit dosage form. In some embodiments, the 5-azacytidine and the at least one additional therapeutic agent are formulated as separate dosage forms.

In some embodiments, the 5-azacytidine and the LSD-1 inhibitor, or a pharmaceutically acceptable salt thereof, are administered concomitantly. In some embodiments, the 5-azacytidine and the LSD-1 inhibitor, or a pharmaceutically acceptable salt thereof, are administered sequentially.

In some embodiments, the 5-azacytidine, the at least one additional therapeutic agent, and the LSD-1 inhibitor, or a pharmaceutically acceptable salt thereof, are administered concomitantly. In some embodiments, the 5-azacytidine, the at least one additional therapeutic agent, and the LSD-1 inhibitor, or a pharmaceutically acceptable salt thereof, are administered sequentially.

In some embodiments, the 5-azacytidine is administered subcutaneously or intravenously. In some embodiments, the 5-azacytidine is administered at a dose of about 75 mg/m$^2$ to about 100 mg/m$^2$ subcutaneously or intravenously. In some embodiments, the 5-azacytidine is administered at a dose of about 75 mg/m$^2$ subcutaneously or intravenously. In some embodiments, the 5-azacytidine is administered subcutaneously or intravenously daily for the first seven days of a 28-day cycle.

In some embodiments, the 5-azacytidine is administered at a dose of about 50 mg, about 60 mg, about 70 mg, about 80 mg, about 90 mg, about 100 mg, about 150 mg, about 200 mg, about 250 mg, about 300 mg, about 350 mg, about 400 mg, about 450 mg, about 500 mg, about 550 mg, or 600 mg orally. In some embodiments, the 5-azacytidine is administered at a dose of about 200 mg. In some embodiments, the 5-azacytidine is administered at a dose of about 300 mg. In some embodiments, the 5-azacytidine is administered daily for the first seven, fourteen, or twenty-one days of a 28 day cycle. In some embodiments, the 5-azacytidine is administered to the human subject one or two times per day. In some embodiments, the 5-azacytidine is administered in the form of a capsule or a tablet. In some embodiments, the 5-azacytidine is administered in the form of a non-enteric-coated tablet.

In some embodiments, the 5-azacytidine is administered orally at a dose of about 200 mg per day for 14 days in a 28-day cycle. In some embodiments, the 5-azacytidine is administered orally at a dose of about 300 mg per day for 14 days in a 28-day cycle. In some embodiments, the 5-azacytidine is administered orally at a dose of about 200 mg per day for 21 days in a 28-day cycle. In some embodiments, the 5-azacytidine is administered orally at a dose of about 300 mg per day for 21 days in a 28-day cycle.

In some embodiments, the 5-azacytidine is administered (a) daily for 1, 2, 3, 4, 5, 6, 7, 8, 9, 10, 11, 12, 13, 14, or greater than 14 days, optionally followed by a treatment dosing holiday of 1, 2, 3, 4, 5, 6, 7, 8, 9, 10, 11, 12, 13, 14, or greater than 14 days; (b) daily for 14 or more days, optionally followed by a treatment dosing holiday of 7 or more days; (c) for 21 or more days, optionally followed by a treatment dosing holiday of 7 or more days; (d) for 14 days, optionally followed by a treatment dosing holiday of 14 days; (e) for 21 or more days, followed by a treatment dosing holiday of 7 or more days; (f) for 14 days, followed by a treatment dosing holiday of 14 days. In some embodiments, at least one of the steps (a), (b), (c), (d), (e), or (f) are repeated.

In some embodiments, the 5-azacytidine is administered (a) at a dose of about 300 mg daily for 14 days, followed by a treatment dosing holiday of 14 days; (b) at a dose of about 200 mg daily for 14 days, followed by a treatment dosing holiday of 14 days; (c) at a dose of about 300 mg daily for 21 days, followed by a treatment dosing holiday of 7 days; (d) at a dose of about 200 mg daily, followed by a treatment dosing holiday of 7 days. In some embodiments, at least one of the steps (a), (b), (c), or (d) are repeated.

In some embodiments, the 5-azacytidine is administered orally using a treatment cycle comprising administration of 5-azacytidine per day for 7 days in a 28-day cycle. In some embodiments, the 5-azacytidine is administered orally using a treatment cycle comprising administration of 5-azacytidine per day for 14 days in a 28-day cycle. In some embodiments, the 5-azacytidine is administered orally using a treatment cycle comprising administration of 5-azacytidine per day for 21 days in a 28-day cycle.

In some embodiments, the at least one additional therapeutic agent comprises gilteritinib, midostaurin, quizartinib, enasidenib, ivosidenib, and/or venetoclax. In some embodiments, the at least one additional therapeutic agent is venetoclax. In some embodiments, the venetoclax is administered orally. In some embodiments, the venetoclax is administered in a form of a tablet. In some embodiments, the venetoclax is administered daily. In some embodiments, the venetoclax is administered at a dose of about 400 mg.

In some embodiments, the LSD-1 inhibitor is a compound having the structure:

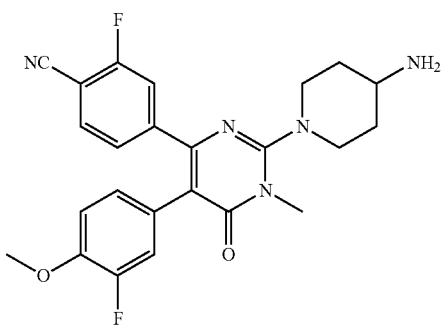 [SMILES: COc1ccc(-c2c(-c3ccc(C#N)c(F)c3)nc(N3CCC(N)CC3)n(C)c2=O)cc1F]

or a pharmaceutically acceptable salt thereof.

In some embodiments, the LSD-1 inhibitor, or a pharmaceutically acceptable salt thereof, is administered orally. In some embodiments, the LSD-1 inhibitor, or a pharmaceutically acceptable salt thereof, is administered in a form of a tablet or capsule. In some embodiments, the LSD-1 inhibitor, or a pharmaceutically acceptable salt thereof, is administered once a week. In some embodiments, the LSD-1 inhibitor, or a pharmaceutically acceptable salt thereof, is administered at a dose of about 20 mg, about 40 mg, or about 60 mg.

In some embodiments, the AML is resistant to treatment with the 5-azacytidine alone. In some embodiments, the AML is resistant to treatment with the at least one additional therapeutic agent alone. In some embodiments, the AML is resistant to treatment with the LSD-1 inhibitor, or a pharmaceutically acceptable salt thereof alone.

In some embodiments, the combination of the 5-azacytidine, the at least one additional therapeutic agent, LSD-1 inhibitor, and a pharmaceutically acceptable salt thereof, increases AML cell death as compared to the 5-azacytidine alone. In some embodiments, the combination of the 5-azacytidine, the at least one additional therapeutic agent, LSD-1 inhibitor, and a pharmaceutically acceptable salt thereof, increases AML cell death as compared to the 5-azacytidine alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the combination of the 5-azacytidine, the at least one additional therapeutic agent, LSD-1 inhibitor, and a pharmaceutically acceptable salt thereof, increases AML cell death as compared to at least one additional therapeutic agent alone. In some embodiments, the combination of the 5-azacytidine, the at least one additional therapeutic agent, LSD-1 inhibitor, and a pharmaceutically acceptable salt thereof, increases AML cell death as compared to the at least one additional therapeutic agent alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof. In some embodiments, the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof. In some embodiments, the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the 5-azacytidine administered orally and at least one additional therapeutic agent increases AML cell death as compared to 5-azacytidine administered intravenously or subcutaneously and at least one additional therapeutic agent. In some embodiments, the 5-azacytidine administered orally and at least one additional therapeutic agent increases AML cell death as compared to 5-azacytidine administered intravenously or subcutaneously and at least one additional therapeutic agent by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof. In some embodiments, the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In some embodiments, the method comprises: (a) administering the 5-azacytidine subcutaneously or intravenously to the subject once daily for the first 7 days of a 28 day cycle; (b) administering the at least one additional therapeutic agent to the subject once daily in a 28 day cycle; and (c) administering the LSD-1 inhibitor, or a pharmaceutically acceptable salt thereof, to the subject once a week in a 28 day cycle.

In some embodiments, the method comprises: (a) administering the 5-azacytidine subcutaneously or intravenously to the subject on days 1, 2, 3, 4, 5, 6, and 7 days of a 28 day cycle; (b) administering the at least one additional therapeutic agent to the subject on days 1, 2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and (c) administering the LSD-1 inhibitor, or a pharmaceutically acceptable salt thereof, to the subject on days 1, 8, 15, and 22 of a 28 day cycle.

In some embodiments, the method further comprises: (a) administering the 5-azacytidine at a dose of about 75 mg/m$^2$ subcutaneously or intravenously every day for the first seven days of a 28 day cycle; (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

In some embodiments, the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle.

In some embodiments, the method comprises administering the 5-azacytidine at a dose of about 75 mg/m$^2$ subcutaneously or intravenously every day for the first seven days of a 28 day cycle. In some embodiments, the method comprises administering the at least one additional therapeutic agent to the subject at a dose of about 400 mg orally every day of a 28 day cycle. In some embodiments, the method comprises administering the LSD-1 inhibitor to the subject at a dose of about 20 mg, about 40 mg or about 60 mg orally once a week of a 28 day cycle. In some embodiments, administering the at least one additional therapeutic agent comprises administering venetoclax.

In some embodiments, the method comprises: (a) administering the 5-azacytidine orally to the subject once daily for the first 14 days of a 28 day cycle; (b) administering the at least one additional therapeutic agent to the subject once daily in a 28 day cycle; and (c) administering the LSD-1 inhibitor, or a pharmaceutically acceptable salt thereof, to the subject once a week in a 28 day cycle.

In some embodiments, the method comprises: (a) administering the 5-azacytidine orally to the subject on days 1, 2, 3, 4, 5, 6, 7, 8, 9, 10, 11, 12, 13, and 14 of a 28 day cycle; (b) administering the at least one additional therapeutic agent to the subject on days 1, 2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and (c) administering the LSD-1 inhibitor, or a pharmaceutically acceptable salt thereof, to the subject on days 1, 8, 15, and 22 of a 28 day cycle.

In some embodiments, the method further comprises administering the 5-azacytidine at a dose of about 300 mg every day for the first fourteen days of a 28 day cycle. In some embodiments, the method further comprises administering the at least one additional therapeutic agent to the subject at a dose of at least about 100 mg every day of a 28 day cycle. In some embodiments, the method further comprises administering the LSD-1 inhibitor to the subject at a dose of about 20 mg, about 40 mg, or about 60 mg once a week of a 28 day cycle.

In some embodiments, the method further comprises administering the 5-azacytidine at a dose of about 200 mg every day for the first fourteen days of a 28 day cycle. In some embodiments, the method further comprises administering the at least one additional therapeutic agent to the subject at a dose of at least about 100 mg every day of a 28 day cycle. In some embodiments, the method further comprises administering the LSD-1 inhibitor to the subject at a dose of about 20 mg, about 40 mg, or about 60 mg once a week of a 28 day cycle.

In some embodiments, the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle.

In some embodiments, the method comprises administering the 5-azacytidine at a dose of about 300 mg orally every day for the first fourteen days of a 28 day cycle. In some embodiments, the method comprises administering the at least one additional therapeutic agent to the subject at a dose of about 400 mg orally every day of a 28 day cycle. In some embodiments, the method comprises administering the LSD-1 inhibitor to the subject at a dose of about 20 mg, about 40 mg or about 60 mg orally once a week of a 28 day cycle. In some embodiments, the at least one additional therapeutic agent comprises administering venetoclax.

In some embodiments, the method comprises administering the 5-azacytidine at a dose of about 200 mg orally every day for the first fourteen days of a 28 day cycle. In some embodiments, the method comprises administering the at least one additional therapeutic agent to the subject at a dose of about 400 mg orally every day of a 28 day cycle. In some embodiments, the method comprises administering the LSD-1 inhibitor to the subject at a dose of about 20 mg, about 40 mg or about 60 mg orally once a week of a 28 day cycle. In some embodiments, the at least one additional therapeutic agent comprises administering venetoclax.

In some embodiments, the acute myeloid leukemia comprises acute myeloid leukemia with recurrent genetic abnormalities, acute myeloid leukemia with myelodysplasia-related changes, therapy-related myeloid neoplasms, myeloid sarcoma, myeloid proliferations related to Down syndrome, blastic plasmacytoid dendritic cell neoplasm, and/or acute promyelocytic leukaemia.

Provided in a another aspect is a method of treating a human subject having acute myeloid leukemia (AML) who is not eligible for intensive induction chemotherapy, the method comprises administering to the human subject:
(i) in a first continuous 28-day cycle:
  (a) the 5-azacytidine subcutaneously or intravenously daily at a dose of about 75 mg/m² on Days 1 to 7;
  (b) the venetoclax orally at a dose of about 100 mg on Day 1; about 200 mg on Day 2, and about 400 mg daily on Days 3 to 28; and
  (c) a pharmaceutical composition comprising the besylate salt of the following compound:

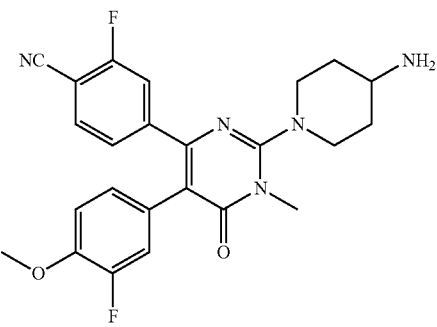 [SMILES: COc1ccc(-c2c(-c3ccc(C#N)c(F)c3)nc(N3CCC(N)CC3)n(C)c2=O)cc1F]

on Days 1, 8, 15, and 22; and
(ii) in subsequent 28 day cycles:
  (d) the 5-azacytidine subcutaneously or intravenously daily at a dose of about 75 mg/m² on Days 1 to 7 of each subsequent cycle;
  (e) the venetoclax orally at a dose of about 400 mg on Days 1 to 28 of each subsequent cycle; and
  (f) a pharmaceutical composition comprising the besylate salt of the following compound

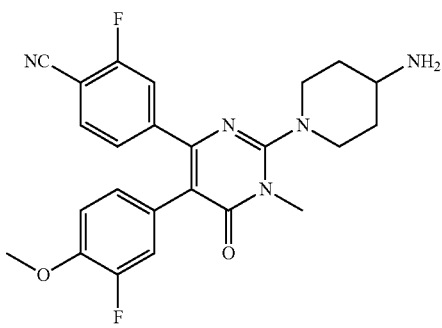 [SMILES: COc1ccc(-c2c(-c3ccc(C#N)c(F)c3)nc(N3CCC(N)CC3)n(C)c2=O)cc1F]

on Days 1, 8, 15, and 22 of each subsequent cycle.

In some embodiments, the pharmaceutical composition is administered at the dose of about 20 mg in the first continuous 28-day cycle and subsequent 28 day cycles. In some embodiments, the pharmaceutical composition is administered at the dose of about 40 mg in the first continuous 28-day cycle and subsequent 28 day cycles. In some embodiments, the pharmaceutical composition is administered at the dose of about 60 mg in the first continuous 28-day cycle and subsequent 28 day cycles.

In some embodiments, the pharmaceutical composition is administered at the dose of about 20 mg in the first continuous 28-day cycle and subsequent 28 day cycles; and if the dose of 20 mg is tolerated, then a second dose cohort will open where the pharmaceutical composition is administered at the dose of about 40 mg in the first continuous 28-day cycle and subsequent 28 day cycles.

In some embodiments, if the dose of 40 mg is tolerated, then a third dose cohort will open where the pharmaceutical composition is administered at the dose of about 40 mg in the first continuous 28-day cycle and subsequent 28 day cycles.

Both the foregoing summary and the following description of the drawings and detailed description are exemplary and explanatory. They are intended to provide further details of the disclosure, but are not to be construed as limiting. Other objects, advantages, and novel features will be readily apparent to those skilled in the art from the following detailed description of the disclosure.

BRIEF DESCRIPTION OF THE DRAWINGS

FIGS. 7A-C depicts in vivo assessments of 5-azacytidine combinations in a MOLM-13 xenograft model, with a graph of percent survival (y-axis) vs. day 0 to 70 (x-axis). FIG. 7A shows the results of the combination of 5-azacytidine and midostaurin, FIG. 7B shows the results of 5-azacytidine combined with venetoclax, and FIG. 7C shows the results of the combination of 5-azacytidine and gilteritinib. Dosing for the experiments shown in FIGS. 7A-C was as follows: (i) 5-azacytidine (low exposure, extended duration, LEED): 1 mg/kg interperitoneally (IP), once daily for five days, three times (qdx 5×3); (ii) 5-azacytidine (high exposure, limited duration, HELD): 3 mg/kg interperitoneally (IP), once daily for five days (qdx5); (iii) Midaustaurin (100 mg/kg orally (PO), once daily for twenty-one days (qd×21)); (iv) Gilteritinib (4 mg/kg orally (PO), once daily for twenty-one days (qd×21)); and (v) Venetoclax (100 mg/kg orally (PO), once daily for twenty-one days (qd×21)). P-value (relative to best single agent) *P<0.05; P<0.001; *P<0.0001.

FIGS. 8A, 8B, and 8C depict the sensitivity of 22 AML cell lines to 5-azacytidine (AZA) and venetoclax as single agents (FIGS. 8A and 8B, respectively) and the combination with 5-azacytidine and venetoclax (FIG. 8C).

FIGS. 9A-F show the cell survival of MV4-11 cells (FIGS. 9A-C) and MOLM-13 cells (FIGS. 9D-F) seven days after the start of treatment with 5-azacytidine and venetoclax. The following schedules were tested: 5-azacytidine administration on Days 1, 2 and 3, followed by venetoclax administration on Day 4 (5-azacytidine AZA) First) (FIGS. 9A and 9D); 5-azacytidine and venetoclax co-administration on Day 1, followed by 5-azacytidine administration on Days 2 and 3 (Simultaneous) (FIGS. 9B and 9E); and venetoclax administration on Day 1, followed by 5-azacytidine on Days 2, 3 and 4 (venetoclax first) (FIGS. 9C and 9F).

FIGS. 10A, 10B, and 10C depict the correlation of MCL-1 expression with the degree of the synergistic effect of the 5-azacytidine-venetoclax combination in a panel of engineered BaF3 cell lines expressing either wild-type FLT3, FLT3-ITD or FLT3 (D835Y) mutations.

FIGS. 14A and B show volcano plots of significantly modified genes at 24 hours (FIG. 14A) and 48 hours (FIG. 14B), showing that 5-azacytidine induced 133 differentially expressed genes at 24 hours and 226 differentially expressed genes at 48 hours. Upon further analysis of the 5-azacytidine-induced differentially expressed genes, two genes were identified that have previously been shown to regulate MCL1 expression: activating transcription factor 3 (ATF3) and stearoyl-CoA desaturase (SCD). ATF3 expression was increased two-fold 48 hours after 5-azacytidine treatment. The expression of SCD (Stearoyl-CoA desaturase), a regulator of lipid metabolism and MCL1, was decreased 2.5-fold by 5-azacytidine treatment at 48 hours. Alterations in ATF3 (FIG. 14C) and SCD (FIG. 14D) expression were validated in a separate experiment using real-time PCR. ATF3 expression was increased in a time- and concentration-dependent manner, as 0.3 µM 5-azacytidine treatment was not sufficient to induce ATF3 expression at either 24 or 48 hours (FIG. 14C). Similarly, SCD expression was decreased rapidly within 24 hours when treated with 3 µM 5-azacytidine, although it was not affected by low concentrations of 5-azacytidine at this timepoint (FIG. 14D).

FIG. 15F=ATF3 knockdown; and FIG. 15G=SCD knockdown.

FIGS. 17A-D show the results from experiments with MV4-11 cells and FIGS. 17E-H show the results from experiments with MOLM-13 cells. FIGS. 17A, 17B, 17E, and 17F show the results from treatment with 5-azacytidine and midostaurin. FIGS. 17C, 17D, 17G, and 17H show the results from treatment with 5-azacytidine and gilteritinib. Cells were treated with daily doses of 5-azacytidine on Day 1-3, and then treated with a FLT-3 inhibitor (midostaurin or gilteritinib) at Day 4. Cells were collected on Day 7 and cell viability was assessed by CellTiter-Glo® assay. Midostaurin sensitized MV4-11 to 5-azacytidine (FIG. 17A) and showed synergistic activity with 5-azacytidine (FIG. 17B). Similar effects were observed in MV4-11 cells treated with 5-azacytidine and gilteritinib (FIGS. 17C and 17D), as well as in MOLM-13 cells treated with 5-azacytidine and midostaurin (FIGS. 17E and 17F) or gilteritinib (FIGS. 17G and 17H). FIG. 17I shows the results in MOLM-13 cells of percent survival (y-axis) vs day 1-70 for administration of vehicle, 5-azacytidine (LEED), 5-azacytidine (HELD), midostaurin, 5-azacytidine (LEED)+midostaurin, and 5-azacytidine (HELD)+midostaurin. FIG. 17J shows the results in MV4-11 cells of percent survival (y axis) vs day 1-91 for administration of vehicle, 5-azacytidine (LEED), 5-azacytidine (HELD), midostaurin, 5-azacytidine (LEED)+midostaurin, and 5-azacytidine (HELD)+midostaurin. FIG. 17K shows the results in MOLM-13 cells of percent survival (y-axis) vs day 1-70 for administration of vehicle, 5-azacytidine (LEED), 5-azacytidine (HELD), gilteritinib, 5-azacytidine (LEED)+gilteritinib, and 5-azacytidine (HELD)+gilteritinib.

FIG. 18A shows single agent cytotoxicity (EC50); FIG. 18B shows differentiation marker induction by CC-90011 (EC50); and FIG. 18C shows the CC-90011/(AZA+Ven) synergy index (SI). Four cells lines were sensitive to AZA and venetoclax, but resistant to CC-90011 ($EC_{50}$>10 µM), while 7 cell lines were resistant to both venetoclax and CC-90011 (FIG. 18A). LSD inhibitors increase differentiation in several AML cell lines and in human AML xenograft models (FIG. 18B). To investigate the induction of differentiation markers by CC-90011, flow cytometry was used to measure CD11b, CD14, and CD86 surface marker expression in 22 AML cell lines following CC-90011 treatment. Seventeen of these cell lines increased expression of at least one of these differentiation markers, while five cell lines had no changes in any of these differentiation markers, including HEL, KG-1, MOLM-13, KG-1a, and NOMO-1 (FIG. 18B). To examine whether AZA+Ven+CC-90011 triple combination exhibits synergy in AML cell lines, 13 of 22 AML cell lines were treated with various concentrations of AZA+Ven+CC-90011 (FIG. 18C).

FIGS. 19A-M depict an analysis of cell viability using CellTiter-Glo® and a calculation of synergy using Combenefit and surface mapped using "Highest Single Agent" modeling. FIG. 19A=MV4-11 cells; FIG. 19B=OCI-AML2 cells; FIG. 19C=Molm-13 cells; FIG. 19D=KG1 cells; FIG. 19E=HL-60 cells; FIG. 19F=Kasumi-1 cells; FIG. 19G=GDM-1 cells; FIG. 19H=THP-1 cells; FIG. 19I=MUTZ-8 cells; FIG. 19J=HNT-34 cells; FIG. 19K=OCI-AML3 cells; FIG. 19L=HEL cells; and FIG. 19M=SIG-M5 cells.

FIGS. 20A-C depict a comparison of different combination treatments. To find out whether AZA+Ven+CC-90011 triple combination was more effective as compared to AZA+CC-90011 or Ven+CC-90011, triple combination was compared to pairwise combinations of these agents (FIGS. 20A-D). In OCI-AML-2, double combinations of AZA+CC-90011 (FIG. 20A), Ven+CC-90011 (FIG. 20B), or AZA+Ven (FIG. 20C) did not exhibit synergy in OCI-AML2 cells. However, when OCI-AML2 are treated with AZA+Ven+CC-90011 combination (FIG. 20D), synergy is substantially increased.

FIG. 21 depicts the study design of Example 2.

DETAILED DESCRIPTION

I. Overview

Figure 1:
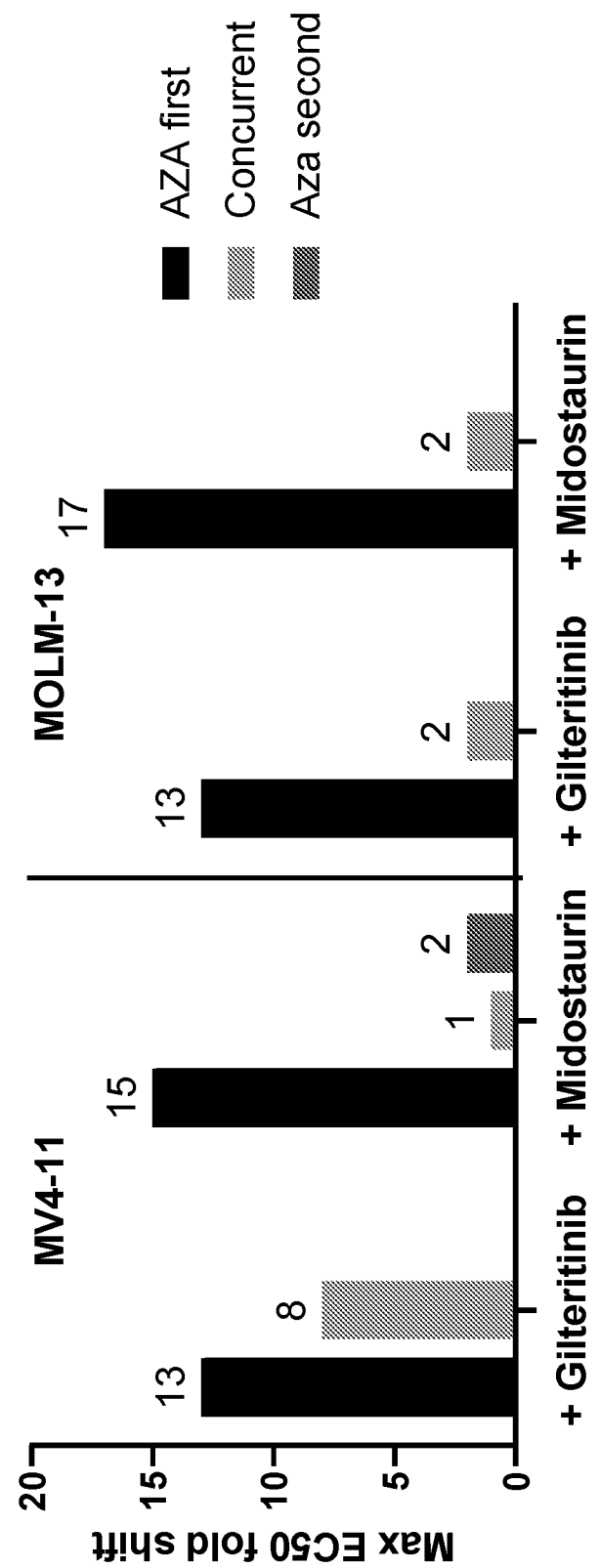
FIG. 1 represents the maximum $EC_{50}$ fold shift of 5-azacytidine in combination with gilteritinib, and 5-azacytidine in combination with midostaurin; both with cell lines MV4-11 and MOLM-13. The results from three different dosing schedules are shown: (i) 5-azacytidine administered first (black bar); (ii) two agents administered concurrently (light gray bar); and (iii) 5-azacytidine administered second (medium gray bar).

The present disclosure is directed to methods of treating acute myeloid leukemia (AML) by administering to a human subject (i) a pharmaceutical composition comprising 5-azacytidine; and (ii) at least one additional therapeutic agent. In some embodiments, the additional therapeutic agent comprises gilteritinib, midostaurin, quizartinib, enasidenib, ivosidenib, and/or venetoclax. In some embodiments, a lysine specific demethylase-1 (LSD-1) inhibitor or a pharmaceutically acceptable salt thereof is administered in combination with the (i) a pharmaceutical composition comprising 5-azacytidine; and (ii) at least one additional therapeutic agent. Also disclosed are pharmaceutical compositions comprising 5-azacytidine with at least one additional therapeutic agent and optionally, a LSD-1 inhibitor or a pharmaceutically acceptable salt thereof, for treating AML in a human subject.

In another aspect described is a method of treating acute myeloid leukemia (AML) by administering to a human subject (i) a pharmaceutical composition comprising 5-azacytidine; (ii) at least one additional therapeutic agent; and (iii) a lysine specific demethylase-1 (LSD-1) inhibitor or a pharmaceutically acceptable salt thereof. In some embodiments, the additional therapeutic agent comprises gilteritinib, midostaurin, quizartinib, enasidenib, ivosidenib, and/or venetoclax. In some embodiments, the additional therapeutic agent is venetoclax. Also disclosed herein are pharmaceutical compositions comprising 5-azacytidine with at least one additional therapeutic agent and a lysine specific demethylase-1 (LSD-1) inhibitor, or a pharmaceutically acceptable salt thereof, for treating AML in a human subject.

In some embodiments, certain combinations work synergistically in the treatment of particular diseases or disorders, including, e.g., types of cancer and certain diseases and conditions associated with, or characterized by, undesired angiogenesis or abnormal cell proliferation.

Acute myeloid leukemia (AML), also known as acute myelogenous leukemia, is an aggressive, heterogeneous, myeloid malignancy. According to the American Cancer Society, AML is the most common type of leukemia diagnosed in adults and makes up 32% of all adult leukemia cases. It is estimated that approximately 19,940 people will be diagnosed with AML in 2020 in the United States (US) with 11,180 patients estimated to die from the disease. The disease is particularly difficult to treat in older adults who account for the majority of patients; thus, the 5-year overall survival is only approximately 29%. National Cancer Institute, SEER Cancer Stat Facts: Leukemia—Acute Myeloid Leukemia (AML), https://seer.cancer.gov/statfacts/html/amyl.html (accessed 10 Jun. 2020). Since the 1970s, initial standard therapy, for those fit enough to receive it, consisted of the '7+3' regimen, which includes 7 days of continuous infusion cytarabine and 3 days of an anthracycline. Rai et. al. *Blood* 1981:58: 1203-1212. Over the next 35 years, a number of clinical trials attempting to augment AML treatment have been performed with little change in the standard of care. However, recent data detailing the molecular ontogeny of AML have elucidated causal pathways which have led to efforts to develop targeted drug therapies. E. Winer and R. Stone, *Ther. Adv. Hematol.*, 10:PMC6624910 (July 2019).

There is a long felt need for the combination treatments described herein, as AML has a high rate of relapse, and additionally relapsed and refractory AML is a very difficult disease status and is likely driven by multiple abnormal signaling pathways that give the leukemic cell an advantage in overcoming any single pathway that is being inhibited. Thus, successful combination treatments are highly desirable in efforts to combat AML.

In one aspect of the methods of treatment described herein, the patient to be treated is about age 60 or older. In another aspect of the methods of treatment described herein, the patient to be treated is about age 65 or older, about age 70 or older, about age 75 or older, or about age 80 or older. In yet another aspect, the patient is a relapsed AML subject. In another aspect, the patient is a refractory AML subject. The subject to be treated can also be under about age 60, under about age 55, under about age 50, under about age 45, or under about age 40. In other aspects, the patient to be treated has FLT3 mutations, either FLT3-ITD or FLT3-TKD. In some aspects, the patient to be treated has a recurrent AML mutation. Exemplary AML mutations include, but are not limited to, Fms-related tyrosine kinase 3 (FLT3), Kirsten rat sarcoma viral oncogene homolog (KRAS), neuroblastoma RAS viral (V-Ras) oncogene homolog (NRAS), proto-oncogene c-Kit (KIT), protein tyrosine phosphatase non-receptor type 11 (PTPN11), neurofibromin 1 (NF1), DNA methyltransferase 3A (DNMT3A), isocitrate dehydrogenase 1 (IDH1), isocitrate dehydrogenase 2 (IDH2), ten-eleven translocation-2 (TET2), additional sex comb-like 1 (ASXL1), enhancer of zeste homolog 2 (EZH2), mixed-lineage leukemia 1/histone-lysine N-methyltransferase 2A (MLL/KMT2A), nucleophosmin (NPM1), CCAAT enhancer binding protein alpha (CEBPA), runt-related transcription factor 1 (RUNX1), GATA-binding factor 2 (GATA2), tumor protein p53 (TP53), serine and arginine rich splicing factor 2 (SRSF2), U2 small nuclear RNA auxiliary factor 1 (U2AF1), splicing factor 3b subunit 1 (SF3B1), zinc finger (CCCH type), RNA-binding motif and serine/arginine rich 2 (ZRSR2), RAD21 cohesin complex component (RAD21), stromal antigen 1 (STAG1), stromal antigen 2 (STAG2), structural maintenance of chromosomes 1A (SMC1A), and structural maintenance of chromosomes protein 3 (SMC3).

II. Experimental Protocols

The drug combinations to be tested include 5-azacytidine given in combination with Ivosidenib, Enasidenib, Venetoclax, or an FLT3 inhibitor (in AML subjects with a FLT3 ITD or TKD mutation). In some embodiments, the 5-azacytidine is administered in combination with venetoclax.

Isocitrate dehydrogenase (IDH) is a critical enzyme in the citric acid cycle. Mutated forms of IDH produce high levels of the (R)-enantiomer of 2-hydroxyglutarate (R-2-HG) and can contribute to the growth of tumors. IDH1 catalyzes this reaction in the cytoplasm, while IDH2 catalyzes this reaction in mitochondria. Ivosidenib and Enasidenib are IDH inhibitors.

Ivosidenib (Tibsovo®) is a small molecule inhibitor of IDH1. In tumors from patients diagnosed with Glioma, Acute Myeloid Leukemia (AML), Cholangiocarcinoma, and Chondrosarcoma, somatic mutations in the conserved active site of isocitrate dehydrogenase (IDH) 1 and 2 are observed. With these new mutations, these enzymes exhibit new, neomorphic behavior, which results in the reduction of α-ketoglutarate to the oncometabolite R-2-hydroxyglutarate. Ivosidenib competitively inhibits α-ketoglutarate-dependent enzymes, ultimately leading to epigenetic alterations and impaired hematopoietic differentiation.

In in vitro studies, Ivosidenib showed non-competitive inhibitory behavior towards the alpha-ketoglutarate (α-KG) substrate and to the NADPH cofactor. This is what is believed to lead to Ivonsidenib being a rapid equilibrium inhibitor of the mIDH1-R132H homodimer.

Enasidenib (Idhifa®) is a small molecule inhibitor of the isocitrate dehydrogenase 2 (IDH2) gene. As noted above, mutated forms of IDH produce high levels of R-2-HG, with IDH1 catalyzing this reaction in the cytoplasm and IDH2 catalyzing this reaction in mitochondria. Enasidenib disrupts this cycle by decreasing total (R)-2-HG levels in the mitochondria Venetoclax (Venclexta® and Venclyxto®) is a BH3 (Bcl-2 homology domain 3)-mimetic as it blocks the anti-apoptotic B-cell lymphoma-2 (Bcl-2) protein, leading to programmed cell death of chronic lymphocytic leukemia (CLL) cells. Overexpression of Bcl-2 in some lymphoid malignancies has sometimes shown to be linked with increased resistance to chemotherapy.

FLT3 inhibitors are tyrosine kinase inhibitors (TKI). Like other tyrosine kinase inhibitors, they compete for the adenosine triphosphate (ATP) binding site in the active domain of the kinase, which inhibits the ability of the protein to be phosphorylated, and subsequently decreases in the activity of that protein. FLT3 mutations are one of the most common findings in acute myeloid leukemia (AML). FLT3/ITD gene is found in approximately 30% of patients with AML with normal cytogenetics. The FLT3 gene is expressed mainly in human hematopoietic progenitors and dendritic cells and plays key roles in leukemia cell proliferation, differentiation, and survival. Constitutive activation of the FLT3/ITD gene triggers multiple downstream signaling cascades, such as STAT5, RAS, MEK, and PI3K/AKT pathways, and ultimately causes suppression of apoptosis and differentiation of leukemic cells, including dysregulation of leukemic cell proliferation. The FLT3 inhibitors evaluated include midostaurin (Rydapt®) and gilteritnib (Xospata®). Midostaurin is a semi-synthetic derivative of staurosporine, an alkaloid from the bacterium *Streptomyces staurosporeus*, and is active against oncogenic CD135 (FMS-like tyrosine kinase 3 receptor, FLT3). Gilteritnib also acts as an inhibitor of AXL receptor tyrosine kinase.

Example 2 describes an experiment that will evaluate the safety and tolerability of CC-90011, the besylate salt of 4-[2-(4-amino-piperidin-1-yl)-5-(3-fluoro-4-methoxy-phenyl)-1-methyl-6-oxo-1,6-dihydro-pyrimidin-4-yl]-2-fluorobenzonitrile, in combination with venetoclax and 5-azacytidine in treatment-naïve subjects with AML who are not eligible for intensive induction chemotherapy. CC-90011 is a lysine specific demethylase-1 (LSD-1) inhibitor. FIG. 21 shows the overall study design for Example 2.

The goals of the experiment will be to (1) evaluate the safety and tolerability of CC-90011 in combination with venetoclax and 5-azacytidine in treatment-naïve subjects with AML who are not eligible for intensive induction; (2) assess the preliminary efficacy of CC-90011 in combination with venetoclax and 5-azacytidine in treatment-naïve subjects with AML who are not eligible for intensive induction chemotherapy; and (3) evaluate the minimal residual disease (MRD) response rate and MRD conversion rate by multicolor flow cytometry (MFC) and/or next generation sequencing (NGS). Further objectives will also include: (1) exploring the duration of MRD response by assessments of bone marrow aspiration and examination of peripheral blood smears; (2) characterizing the PK profile of CC-90011 when given in combination with venetoclax and 5-azacytidine; (3) characterizing the PD to understand the mechanistic effects of CC-90011 in combination with venetoclax and 5-azacytidine; (4) exploring the relationship between PK, PD biomarkers, and/or clinical outcomes of CC-90011 in combination with venetoclax and 5-azacytidine; (5) evaluating molecular and/or cellular markers in the bone marrow and blood that correlate with efficacy with CC-90011 in combination with venetoclax and 5-azacytidine; and (6) evaluating the post-baseline transfusion independence rate of CC-90011 in combination with venetoclax and 5-azacytidine.

A. 5-Azacytidine

5-Azacytidine (National Service Center designation NSC-102816; CAS Registry Number 320-67-2) is also known as azacitidine, AZA, or 4-amino-1-B-D-ribofuranosyl-1,3,5-triazin-2(1H)-one. The marketed product VIDAZA® (5-azacytidine for injection) contains 5-azacytidine, and is for subcutaneous or intravenous use. 5-Azacytidine is a pyrimidine nucleoside analog of cytidine. 5-Azacytidine has the following structure:

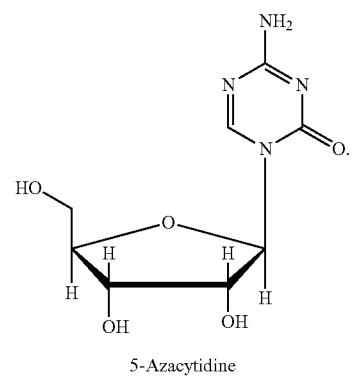

5-Azacytidine

After its incorporation into replicating DNA, 5-azacytidine forms a covalent complex with DNA methyltransferases. DNA methyltransferases are responsible for de novo DNA methylation and for reproducing established methylation patterns in daughter DNA strands of replicating DNA. Inhibition of DNA methyltransferases by 5-azacytidine leads to DNA hypomethylation, thereby restoring normal functions to morphologically dysplastic, immature hematopoietic cells and cancer cells by re-expression of genes involved in normal cell cycle regulation, differentiation and death. The cytotoxic effects of these cytidine analogs cause the death of rapidly dividing cells, including cancer cells, that are no longer responsive to normal cell growth control mechanisms. 5-azacytidine also incorporates into RNA. The cytotoxic effects of 5-azacytidine may result from multiple mechanisms, including inhibition of DNA, RNA and protein synthesis, incorporation into RNA and DNA, and activation of DNA damage pathways.

Injectable 5-azacytidine has been tested in clinical trials and showed significant anti-tumor activity, such as, for example, in the treatment of myelodysplastic syndromes (MDS), acute myelogenous leukemia (AML), chronic myelogenous leukemia (CML), acute lymphocytic leukemia (ALL), and non Hodgkin's lymphoma (NHL). See, e.g., Aparicio et al., *Curr. Opin. Invest. Drugs* 3(4): 627-33 (2002).

5-Azacytidine is approved for subcutaneous (SC) or intravenous (IV) administration to treat various proliferative disorders. Oral dosing has been studied in clinical trials, such as NCT00761722, NCT01519011, NCT00528982, and NCT01757535. Oral formulations and methods of treatment using 5-azacytidine are disclosed in U.S. Pat. No. 8,846,628, which is incorporated by reference for the disclosure of such formulations and methods of treatment. In some embodiments, 5-azacytidine is administered subcutaneously. In some embodiments, the 5-azacytidine is administered intravenously. In some embodiments, the 5-azacytidine is administered at a dose of about 75 mg/m² to about 100 mg/m² subcutaneously or intravenously, including about 75 mg/m², about 80 mg/m², about 85 mg/m², about 90 mg/m², about 95 mg/m², or about 100 mg/m² subcutaneously or intravenously. In some embodiments, 5-azacytidine is administered at a dose of about 75 mg/m² subcutaneously or intravenously. In some embodiments, 5-azacytidine is administered subcutaneously or intravenously daily for the first seven days of a 28-day cycle.

In some embodiments, 5-azacytidine is administered orally. In some embodiments, 5-azacytidine is administered in the form of a capsule or a tablet. In some embodiments, the tablet is a non-enteric-coated tablet. In some embodiments, the 5-azacytidine is administered at a dose of about 50 mg, about 60 mg, about 70 mg, about 80 mg, about 90 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 510 mg, about 520 mg, about 530 mg, about 540 mg, about 550 mg, about 560 mg, about 570 mg, about 580 mg or about 600 mg orally. In some embodiments, 5-azacytidine is administered at a dose of about 200 mg. In some embodiments, 5-azacytidine is administered at a dose of about 300 mg. In some embodiments, 5-azacytidine is administered daily orally for the first seven, fourteen, or twenty-one days of a 28 day cycle. In some embodiments, 5-azacytidine is administered daily orally for the first fourteen days of a 28 day cycle. In some embodiments, 5-azacytidine administered to the subject once per day. In some embodiments, 5-azacytidine administered to the subject two times per day.

In some embodiments, the 5-azacytidine is administered orally at a dose of about 200 mg per day for 14 days in a 28-day cycle. In some embodiments, the 5-azacytidine is administered orally at a dose of about 300 mg per day for 14 days in a 28-day cycle. In some embodiments, the 5-azacytidine is administered orally at a dose of about 200 mg per day for 21 days in a 28-day cycle. In some embodiments, the 5-azacytidine is administered orally at a dose of about 300 mg per day for 21 days in a 28-day cycle.

In some embodiments, the 5-azacytidine is administered orally daily for 1, 2, 3, 4, 5, 6, 7, 8, 9, 10, 11, 12, 13, 14, or greater than 14 days, optionally followed by a treatment dosing holiday of 1, 2, 3, 4, 5, 6, 7, 8, 9, 10, 11, 12, 13, 14, or greater than 14 days. In some embodiments, the 5-azacytidine is administered orally daily for 14 or more days, optionally followed by a treatment dosing holiday of 7 or more days. In some embodiments, the 5-azacytidine is administered orally for 21 or more days, optionally followed by a treatment dosing holiday of 7 or more days. In some embodiments, the 5-azacytidine is administered orally for 14 days, optionally followed by a treatment dosing holiday of 14 days. In some embodiments, the 5-azacytidine is administered orally for 21 or more days, followed by a treatment dosing holiday of 7 or more days. In some embodiments, the 5-azacytidine is administered orally for 14 days, followed by a treatment dosing holiday of 14 days.

In some embodiments, the 5-azacytidine is administered orally at a dose of about 300 mg daily for 14 days, followed by a treatment dosing holiday of 14 days. In some embodiments, the 5-azacytidine is administered orally at a dose of about 200 mg daily for 14 days, followed by a treatment dosing holiday of 14 days. In some embodiments, the 5-azacytidine is administered orally at a dose of about 300 mg daily for 21 days, followed by a treatment dosing holiday of 7 days. In some embodiments, the 5-azacytidine is administered orally at a dose of about 200 mg daily, followed by a treatment dosing holiday of 7 days.

In some embodiments, the 5-azacytidine is administered orally using a treatment cycle comprising administration of 5-azacytidine per day for 7 days in a 28-day cycle. In some embodiments, the 5-azacytidine is administered orally using a treatment cycle comprising administration of 5-azacytidine per day for 14 days in a 28-day cycle. In some embodiments, the 5-azacytidine is administered orally using a treatment cycle comprising administration of 5-azacytidine per day for 21 days in a 28-day cycle.

5-azacytidine exerts effects on cell viability and epigenetic reprogramming of cells. Taylor and Jones, *Cell* 20(1): 85-93 (1980). At high doses, 5-azacytidine is thought to exercise a predominantly acute cytotoxic effect (Khan et al., *Experimental Hematology* 36(2): 149-57, 2008), while at low doses it inhibits clonogenicity of tumor cells though differentiation (Tsai et al., *Cancer Cell*, 21(3): 430-46, 2012).

The marketed product VIDAZA®, the injectable formulation of 5-azacytidine, is administered at relatively higher doses and for shorter duration compared to the oral, non-enteric coated formulation of 5-azacytidine as described in U.S. Pat. No. 8,846,628, including CC-486. Clinical studies revealed that CC-486 induces more sustainable demethylative effects as compared to VIDAZA® (Laille et al., *PLOSOne* 10(8):e0135520, 2015), although cumulative exposures of 14 or 21 day regimens of CC-486 are lower than VIDAZA®, administered for 5 days (Garcia-Manero et al., *Leukemia* 30(4):889-96, 2016).

To examine differences in cytotoxic and epigenetic effects as a function of duration of exposure to 5-azacytidine, high exposure, limited duration (HELD) administration of injectable 5-azacytidine was compared with low exposure, extended duration (LEED) administration of 5-azacytidine administered orally. To model injectable and oral azacyitdine dosing in non-clinical systems, the total 5-azacytidine exposure was held constant while varying the duration of exposure. In some embodiments, to model the oral administration of 5-azacytidine, the 5-azacytidine was delivered at a low exposure for extended duration (LEED), at a dose of 1 mg/kg, once daily for fifteen days (QD×15). To model the same cumulative dose by intravenous or subcutaneous administration of 5-azacytidine, the 5-azacytidine was administered at a high exposure for a limited duration (HELD), at a dose of 3 mg/kg, once daily for 5 days (QD×5).

In some embodiments, LEED administration of 5-azacytidine in combination with other agents provides a sustained pharmacodynamic effect and/or improved patient compliance. A sustained pharmacodynamic effect may include any change elicited by 5-azacytidine, which includes for example MCL-1 degradation, and/or changes in ATF3 or SCD gene expression. In some embodiments, LEED of 5-azacyitidine in combination with other agents provides a reduction in global DNA methylation (e.g., due to increased nucleic acid incorporation) that sustained through the end of the treatment cycle (i.e., a 28-day cycle) compared to HELD of 5-azacyitidine in combination with other agents. In some embodiments, LEED of 5-azacyitidine in combination with other agents provides a differentiation maker upregulation that peaks at Day 21 of a 28-day cycle and has a cell death that is characterized by a gradual loss of viability through Day 28 of a 28 day cycle. In some embodiments, HELD of 5-azacyitidine in combination with other agents provides a differentiation marker upregulation that peaks at Day 7 of a 28-day cycle and has a cell death that is characterized by a peak at Day 14 followed by recovery in a 28-day cycle. In some embodiments, LEED of 5-azacyitidine in combination with other agents provides a higher expression of myeloid differentiation markers, which include but are not limited to CD11b, CD14, CD86, HLA-DR and MERTK, that is sustained through a treatment cycle (i.e., a 28-day cycle) compared to HELD of 5-azacyitidine in combination with other agents. In some embodiments, LEED of 5-azacyitidine in combination with other agents provides more pronounced epigenetic changes and more extensive differentiation compared to HELD of 5-azacytidine in combination with other agents.

III. Pharmaceutical Formulations

A. 5-Azacytidine

In certain embodiments, the methods herein comprise administering particular oral formulations provided herein to, e.g., overcome limitations associated with IV or SC administration of 5-azacytidine. For example, IV or SC administration may limit the ability to deliver 5-azacytidine for longer periods of time on a regular basis, thereby potentially limiting the maximal efficacy of 5-azacytidine. Due to the difficulties of complying with the rigors of a prolonged IV or SC dosing schedule, prolonged SC or IV exposure to 5-azacytidine may cause subjects (e.g., subjects with multiple cytopenias) to discontinue from the regimen. See, e.g., Lyons et al., Hematologic Response to Three Alternative Dosing Schedules of Azacitidine in Patients With Myelodysplastic Syndromes, *J. Clin. Oncol.* (2009) (DOI:10.1200/JCO.2008.17.1058). Accordingly, in certain embodiments, methods provided herein comprise administering an oral formulation provided herein to overcome these or other limitations associated with SC or IV 5-azacytidine administration.

Certain embodiments herein provide methods comprising administering oral formulations of 5-azacytidine provided herein comprising delivering 5-azacytidine (e.g., azacitidine) at a lower dose over a more prolonged period of time, as compared to IV or SC administration. In particular embodiments, such methods comprise managing dose-related cytopenias (including, e.g., dose-related cytopenias associated with azacytidine) by administering an oral formulation provided herein. In certain embodiments, methods provided herein comprise administering an oral formulation provided herein to achieve an improved safety profile as compared to an IV or SC dose comprising 5-azacytidine.

Embodiments herein encompass pharmaceutical formulations and compositions comprising 5-azacytidine, and a permeation enhancer, (or without a permeation enhancer), wherein the formulations and compositions are prepared for oral administration. Particular embodiments relate to the use 5-azacytidine for the preparation of pharmaceutical formulations and compositions for treating particular medical indications, as provided herein. The pharmaceutical formulations and compositions including 5-azacytidine provided herein are intended for oral delivery of 5-azacytidine in subjects in need thereof. Oral delivery formats include, but are not limited to, tablets, capsules, caplets, solutions, suspensions, and syrups.

Particular embodiments herein provide solid oral dosage forms that are tablets or capsules. In certain embodiments, the formulation is a tablet including 5-azacytidine. In certain embodiments, the formulation is a capsule including 5-azacytidine. In certain embodiments, the tablets or capsules provided herein comprise one or more excipients or do not need one or more excipients, such as, for example, glidants, diluents, lubricants, colorants, disintegrants, granulating agents, binding agents, polymers, and coating agents. In certain embodiments, embodiments herein encompass the use of 5-azacytidine, for the preparation of a pharmaceutical composition for treating a disease associated with abnormal cell proliferation, wherein the composition is prepared for oral administration.

B. At Least One Additional Therapeutic Agent

In particular embodiments, 5-azacytidine compositions provided herein further comprise one, two, three, or more other pharmacologically active substances (also termed herein "additional therapeutic agents," "second active agents," or the like). In some embodiments, the 5-azacytidine compositions are oral formulations. In some embodiments, the 5-azacytidine oral compositions with at least one additional therapeutic agent is used for treating any of the diseases or disorders disclosed herein. In particular embodiments, the oral formulations provided herein comprise the additional therapeutic agent(s) in a therapeutically effective amount.

Examples of additional therapeutic agents include but are not limited to gilteritinib, midostaurin, quizartinib, enasidenib, ivosidenib, and venetoclax.

Examples of additional therapeutic agents include but are not limited to FLT3 inhibitors, IDH2 inhibitors, IDH1 inhibitors, and BCL2 inhibitors. Examples of first generation FLT3 inhibitors include but are not limited to midostaurin, lestaurtinib, sunitinib (Sutent®), and sorafenib (Nexavar®). Examples of second generation FLT3 inhibitors include but are not limited to quizartinib, crenolanib, pexidartinib (PLX3397), and gilteritinib (ASP2215), are more potent and selective than the first-generation inhibitors. Examples of IDH inhibitors, including IDH1 and/or IDH2 inhibitors, include but are not limited to ivosidenib and enasidenib. Examples of BCL2 inhibitors include but are not limited to venetoclax (ABT-199), navitoclax (ABT-263), ABT-737 (4-[4-[[2-(4-chlorophenyl)phenyl]methyl]piperazin-1-yl]-N-[4-[[(2R)-4-(dimethylamino)-1-phenylsulfanylbutan-2-yl]amino]-3-nitrophenyl]sulfonylbenzamide), obatoclax mesylate (GX15-070), TW-37 (N-[4-(2-tert-butylphenyl)sulfonylphenyl]-2,3,4-trihydroxy-5-[(2-propan-2-ylphenyl)methyl]benzamide), AT101 ((R)-(−)-Gossypol), HA14-1 (2-Amino-6-bromo-α-cyano-3-(ethoxycarbonyl)-4H-1-benzopyran-4-acetic acid ethyl ester), and sabutoclax.

Examples of additional therapeutic agents include but are not limited to gilteritinib, midostaurin, quizartinib, enasidenib, ivosidenib, and venetoclax. An exemplary additional therapeutic agent is venetoclax.

C. Venetoclax as the at Least One Additional Therapeutic Agent

In some embodiments, an oral pharmaceutical composition comprising 5-azacytidine is used with venetoclax as the additional therapeutic agent. In some embodiments, the 5-azacytidine oral compositions is used with venetoclax for treating any of the diseases or disorders disclosed herein.

Venetoclax is a small molecule inhibitor of BCL-2 and is marketed as VENCLEXTA™, which is in the form of a tablet. Venetoclax is indicated: (i) for the treatment of adult patients with chronic lymphocytic leukemia (CLL) or small lymphocytic lymphoma (SLL); (ii) in combination with injectable 5-azacytidine' or decitabine or low-dose cytarabine for the treatment of newly-diagnosed acute myeloid leukemia (AML) in adults who are age 75 years or older, or who have comorbidities that preclude use of intensive induction chemotherapy.

Therapy with venetoclax is initiated according to a weekly ramp-up schedule over a specific period of several days or weeks to the recommended daily dose. For treating CLL and SLL, venetoclax is at administered at a daily dose of 20 mg for Week 1, a daily dose of 50 mg for Week 2, a daily dose of 100 mg for Week 3, a daily dose of 200 mg for Week 4, and a daily dose of 400 mg for Week 5 and beyond. For treating AML in combination therapy with another agent, such as injectable 5-azacytidine, venetoclax is at administered at a daily dose of 100 mg for Day 1, a daily dose of 200 mg for Day 2, and a daily dose of 400 mg for Days 3 and beyond. Injectable 5-azacytidine is administered in 28-day cycles, beginning on Day 1 of venetoclax treatment, at a dosage of 75 mg/m$^2$, IV or subcutaneously, on Days 1-7 of each cycle.

In some embodiments, the venetoclax is administered orally. In some embodiments, the venetoclax is administered in a form of a tablet. In some embodiments, the venetoclax is administered daily. In some embodiments, the venetoclax is administered at a dose of from about 20 mg to about 400 mg, such as about 20 mg, about 50 mg, about 100 mg, about 200 mg, or about 400 mg. In some embodiments, the venetoclax is administered at a dose of about 400 mg.

In some embodiments, 5-azacytidine and venetoclax are administered concomitantly. In some embodiments, 5-azacytidine and venetoclax are administered sequentially. In some embodiments, where the 5-azacytidine and venetoclax are administered sequentially, the 5-azacytidine is administered first. In some embodiments, 5-azacytidine and venetoclax are administered as separate dosage forms, such as injections suitable for intravenous or subcutaneous use and/ or tablets or capsules for oral use. In some embodiments, 5-azacytidine and venetoclax are co-formulated as a single dosage form, such as an injection suitable for intravenous or subcutaneous use or a tablet or capsule for oral use.

D. LSD-1 Inhibitor

Recent studies have shown that the survival of the leukemic stem cells (LSC) likely plays a major role in the mechanism of disease relapse and ultimately therapy resistance. Current treatments may spare LSCs that allow for tumor regeneration via premalignant or malignant clones. Accordingly, the eradication of LSCs may result in increased long-term survival. In addition, it has been shown that lysine-specific demethylase 1A (LSD1) activity is present and elevated in the LSC compartment, which suggests that inhibition of LSD1 activity could potentially eradicate the LSC compartment.

Treatment options for patients ineligible for intensive induction chemotherapy are limited and patients who are ineligible for intensive induction chemotherapy have worse survival outcomes as compared to those who are fit enough for standard intensive induction chemotherapy. Although combination regimens using azacytidine and another additional therapeutic agent, such as venetoclax, have improved response rates in this patient population as compared to prior regimens, the addition of a lysine specific demethylase-1 (LSD-1) inhibitor may selectively inhibit the aberrant expression of LSD1 implicated in the pathogenesis of AML and propagation of the AML stem cell population and produce deeper and more durable responses.

Accordingly, this disclosure is also directed to methods for using (i) a composition comprising 5-azacytidine with a lysine specific demethylase-1 (LSD-1) inhibitor and at least one additional therapeutic agent, such as venetoclax, to diseases and disorders including AML. In some embodiments, the subjects who are treated are treatment-naïve subjects with AML who are ≥75 years and/or who ≥60 to 74 years and have comorbidities that preclude the use of intensive induction chemotherapy.

In the embodiments described herein that include using a LSD-1 inhibitor, the LSD-1 inhibitor is a compound having the structure:

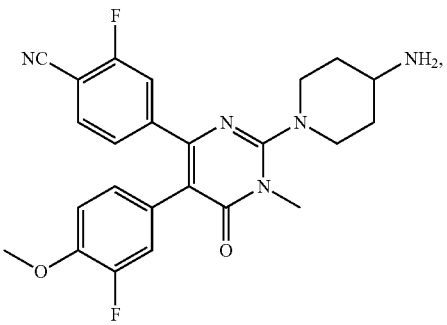 [SMILES: COc1ccc(-c2c(-c3ccc(C#N)c(F)c3)nc(N3CCC(N)CC3)n(C)c2=O)cc1F]

or a pharmaceutically acceptable salt thereof. The chemical name of the above compound is 4-[2-(4-Amino-piperidin-1-yl)-5-(3-fluoro-4-methoxy-phenyl)-6-oxo-1,6-dihydro-pyrimidin-4-yl]-2-fluoro-benzonitrile, with a chemical formula of $C_{23}H_{21}F_2N_5O_2$, molecular weight of 437.44, and CAS number of 1821307-10-1. 4-[2-(4-amino-piperidin-1-yl)-5-(3-fluoro-4-methoxy-phenyl)-1-methyl-6-oxo-1,6-dihydro-pyrimidin-4-yl]-2-fluoro-benzonitrile is described in U.S. Pat. No. 9,255,097.

In any of the embodiments described herein, the LSD-1 inhibitor can be administered orally. Oral doses can typically range from about 1.0 mg to about 1000 mg, one to four times or more per day. In some embodiments, the LSD-1 inhibitor is administered in about 20 mg, about 40 mg, or about 60 mg doses. In any of the embodiments described herein, the LSD-1 inhibitor can be administered in the form of a tablet or capsule. In any of the embodiments described herein, the LSD-1 inhibitor can be administered once a week. In any of the embodiments described herein, the LSD-1 inhibitor can be administered at a dose of about 60 mg.

IV. Methods of Treatment

As described herein, certain embodiments herein provide methods of treating a human subject having acute myeloid leukemia (AML), wherein the method comprises administering to the subject a combination of (i) a pharmaceutical composition comprising 5-azacytidine, (ii) at least one additional therapeutic agent, and (iii) a lysine specific demethylase-1 (LSD-1) inhibitor or a pharmaceutically acceptable salt thereof.

Subjects in need of treatment can be members of a patient population with an increased risk of AML. For example, several inherited genetic disorders and immunodeficiency states are associated with an increased risk of AML. These include disorders with defects in DNA stability, leading to random chromosomal breakage, such as Bloom's syndrome, Fanconi's anemia, Li-Fraumeni kindreds, ataxia-telangiectasia, and X-linked agammaglobulinemia.

In some embodiments, methods described herein may be used to treat specific types of AML. Illustrative types of AML, include but are not limited to, AML with recurrent genetic abnormalities, AML with myelodysplasia-related changes, therapy-related myeloid neoplasms, myeloid sarcoma, myeloid proliferations related to Down syndrome, blastic plasmacytoid dendritic cell neoplasm, and/or acute promyelocytic leukaemia.

In some embodiments, the AML is characterized by having any one of the following mutations: Fms-related tyrosine kinase 3 (FLT3), Kirsten rat sarcoma viral oncogene homolog (KRAS), neuroblastoma RAS viral (V-Ras) oncogene homolog (NRAS), proto-oncogene c-Kit (KIT), protein tyrosine phosphatase non-receptor type 11 (PTPN11), neurofibromin 1 (NF1), DNA methyltransferase 3A (DNMT3A), isocitrate dehydrogenase 1 (IDH1), isocitrate dehydrogenase 2 (IDH2), ten-eleven translocation-2 (TET2), additional sex comb-like 1 (ASXL1), enhancer of zeste homolog 2 (EZH2), mixed-lineage leukemia 1/histone-lysine N-methyltransferase 2A (MLL/KMT2A), nucleophosmin (NPM1), CCAAT enhancer binding protein alpha (CEBPA), runt-related transcription factor 1 (RUNX1), GATA-binding factor 2 (GATA2), tumor protein p53 (TP53), serine and arginine rich splicing factor 2 (SRSF2), U2 small nuclear RNA auxiliary factor 1 (U2AF1), splicing factor 3b subunit 1 (SF3B1), zinc finger (CCCH type), RNA-binding motif and serine/arginine rich 2 (ZRSR2), RAD21 cohesin complex component (RAD21), stromal antigen 1 (STAG1), stromal antigen 2 (STAG2), structural maintenance of chromosomes 1A (SMC1A), and structural maintenance of chromosomes protein 3 (SMC3).

In some embodiments, the AML is characterized as having a FLT3-ITD mutation. In some embodiments, the AML is resistant to treatment with the at least one additional therapeutic agent alone. In some embodiments, the 5-azacytidine is administered before the at least one additional therapeutic agent. In some embodiments, the AML is responsive to treatment with a FLT3 inhibitor. In some embodiments, the AML is characterized as having an overexpression of MCL-1.

In some embodiments, the 5-azacytidine primes the cancer cells for apoptosis mediated by the at least one additional therapeutic agent by downregulating the expression of MCL-1. In some embodiments, downregulating the expression of MCL-1 is mediated by caspase-dependent and independent mechanisms. In some embodiments, the 5-azacytidine and at least one additional therapeutic agent augments MCL-1 degradation.

V. Methods of Use with 5-Azacytidine, an Additional Therapeutic Agent, and a LSD-1 Inhibitor Provided in one aspect is a method of treating diseases and disorders including AML, using a pharmaceutical composition comprising 5-azacytidine in combination with a lysine specific demethylase-1 (LSD-1) inhibitor, or a pharmaceutically acceptable salt thereof, and at least one additional therapeutic agent, such as venetoclax. In some embodiments, the subject is not eligible for intensive induction chemotherapy.

In some embodiments, the 5-azacytidine and the at least one additional therapeutic agent are administered concomitantly. In some embodiments, the 5-azacytidine and the at least one additional therapeutic agent are administered sequentially. In some embodiments, the 5-azacytidine and the at least one additional therapeutic agent are co-formulated as a single dosage form. In some embodiments, the 5-azacytidine and the at least one additional therapeutic agent are administered concomitantly. In some embodiments, the 5-azacytidine and the at least one additional therapeutic agent are administered sequentially. In some embodiments, the at least one therapeutic agent, and the LSD-1 inhibitor, or a pharmaceutically acceptable salt thereof, are administered concomitantly. In some embodiments, the at least one therapeutic agent, and the LSD-1 inhibitor, or a pharmaceutically acceptable salt thereof, are administered sequentially. In some embodiments, the 5-azacytidine, the at least one additional therapeutic agent, and the LSD-1 inhibitor, or a pharmaceutically acceptable salt thereof, are administered concomitantly. In some embodiments, the 5-azacytidine, the at least one additional therapeutic agent, and the LSD-1 inhibitor, or a pharmaceutically acceptable salt thereof, are administered sequentially.

In some embodiments, the 5-azacytidine is administered subcutaneously. In some embodiments, the 5-azacytidine is administered intravenously. In some embodiments, the 5-azacytidine is administered at a dose of about 75 mg/m$^2$ to about 100 mg/m$^2$ subcutaneously or intravenously. In some embodiments, the 5-azacytidine is administered at a dose of about 75 mg/m$^2$ subcutaneously or intravenously. In some embodiments, the 5-azacytidine is administered subcutaneously or intravenously daily for the first 7 days of a 28 day cycle.

In some embodiments, the 5-azacytidine is administered orally. In some embodiments, the 5-azacytidine is administered at a dose of about 50 mg, about 60 mg, about 70 mg, about 80 mg, about 90 mg, about 100 mg, about 150 mg, about 200 mg, about 250 mg, about 300 mg, about 350 mg, about 400 mg, about 450 mg, about 500 mg, about 550 mg, or 600 mg orally. In some embodiments, the 5-azacytidine is administered at a dose of about 200 mg. In some embodiments, the 5-azacytidine is administered at a dose of about 300 mg. In some embodiments, 5-azacytidine is administered orally for the first seven, fourteen, or twenty-one days of a cycle. In some embodiments, the 5-azacytidine administered to the subject once or two times per day. In some embodiments, the 5-azacytidine is administered in the form of a capsule or a tablet. In some embodiments, the tablet is a non-enteric coated tablet.

In some embodiments, the additional therapeutic agent is selected from gilteritinib, midostaurin, quizartinib, enasidenib, ivosidenib, or venetoclax. In some embodiments, the additional therapeutic agent is venetoclax.

In some embodiments, the venetoclax is administered orally. In some embodiments, the venetoclax is administered in a form of a tablet. In some embodiments, the venetoclax is administered daily. In some embodiments, the venetoclax is administered at a dose of about 400 mg.

In some embodiments, the 5-azacytidine, the at least one additional therapeutic agent, and LSD-1 inhibitor, or a pharmaceutically acceptable salt thereof, provide a synergistic effect to treat the diseases disclosed herein. Synergy may be measured by using the highest single agent (HSA) model and Combenefit package (Di Veroli et al., *Bioinformatics*. 2016 Sep. 15; 32(18):2866-8.) A negative cell line is used as a control to determine whether there was a shift in $EC_{50}$ and/or an augmentation of the maximal inhibitory effect. In other words, the $EC_{50}$ and maximal inhibitory effect from the negative control cell line provide baseline potency results, and the shift in $EC_{50}$ and maximal inhibitory effect of the drug combination is compared to the results from the negative control cell line to determine whether the drug combination provided a synergistic effect. Specifically, the following steps are used to determine the synergistic interactions between two drugs: (a) a demonstration of shift in dose response curves determined from their $EC_{50}$ (i.e., a potency shift) and/or an augmentation of the maximal inhibitory effect compared to the results from the negative control cell line; (b) response surface analyses to visualize synergy, additivity or antagonism over a matrix of concentration between the two drugs; and (c) analyzing the combination index score (derived using a software application Combenefit). The limit of where the synergy index becomes significant (such that the drug combination exhibits synergistic effects) is determined empirically and is based on the variance in the data and a confirmation in a potency shift in $EC_{50}$. In other words, a combination index, without the clear shift in dose response curves would not constitute a synergistic interaction. As used herein, in some embodiments, the synergistic effect is defined as having an $EC_{50}$ shift at about greater than about 4 and/or a synergy index of greater than about 20 as measured by the HSA model and Combenefit package.

In some embodiments, the AML is characterized as having a FLT3-ITD mutation. In some embodiments, the AML is resistant to treatment with the at least one additional therapeutic agent alone. In some embodiments, the AML is resistant to treatment with the LSD-1 inhibitor, or a pharmaceutically acceptable salt thereof alone.

In some embodiments, the combination of the 5-azacytidine, the at least one additional therapeutic agent, LSD-1 inhibitor, and a pharmaceutically acceptable salt thereof, increases AML cell death as compared to the 5-azacytidine alone. In some embodiments, the combination of the 5-azacytidine, the at least one additional therapeutic agent, LSD-1 inhibitor, and a pharmaceutically acceptable salt thereof, increases AML cell death as compared to the 5-azacytidine alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of the 5-azacytidine, venetoclax, LSD-1 inhibitor, and a pharmaceutically acceptable salt thereof, increases AML cell death as compared to the 5-azacytidine alone. In some embodiments, the combination of the 5-azacytidine, venetoclax, LSD-1 inhibitor, and a pharmaceutically acceptable salt thereof, increases AML cell death as compared to the 5-azacytidine alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of the 5-azacytidine, the at least one additional therapeutic agent, LSD-1 inhibitor, and a pharmaceutically acceptable salt thereof, increases AML cell death as compared to at least one additional therapeutic agent alone. In some embodiments, the combination of the 5-azacytidine, the at least one additional therapeutic agent, LSD-1 inhibitor, and a pharmaceutically acceptable salt thereof, increases AML cell death as compared to the at least one additional therapeutic agent alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of the 5-azacytidine, venetoclax, LSD-1 inhibitor, and a pharmaceutically acceptable salt thereof, increases AML cell death as compared to venetoclax alone. In some embodiments, the combination of the 5-azacytidine, venetoclax, LSD-1 inhibitor, and a pharmaceutically acceptable salt thereof, increases AML cell death as compared to venetoclax alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof. In some embodiments, the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of 5-azacytidine, venetoclax, LSD-1 inhibitor, and a pharmaceutically acceptable salt thereof, increases AML cell death as compared to the LSD-1 inhibitor, or a pharmaceutically acceptable salt thereof. In some embodiments, the combination of 5-azacytidine, venetoclax, LSD-1 inhibitor, and a pharmaceutically acceptable salt thereof, increases AML cell death as compared to the LSD-1 inhibitor, or a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof. In some embodiments, the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique In some embodiments, the combination of 5-azacytidine, venetoclax, LSD-1 inhibitor, and a pharmaceutically acceptable salt thereof, increases AML cell death compared to the combination of any two of 5-azacytidine, venetoclax, LSD-1 inhibitor, and a pharmaceutically acceptable salt thereof. In some embodiments, the combination of 5-azacytidine, venetoclax, LSD-1 inhibitor, and a pharmaceutically acceptable salt thereof, increases AML cell death compared to the combination of any two of 5-azacytidine, venetoclax, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique In some embodiments, the 5-azacytidine administered orally and at least one additional therapeutic agent increases AML cell death as compared to 5-azacytidine administered intravenously or subcutaneously and at least one additional therapeutic agent. In some embodiments, the 5-azacytidine administered orally and at least one additional therapeutic agent increases AML cell death as compared to 5-azacytidine administered intravenously or subcutaneously and at least one additional therapeutic agent by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the 5-azacytidine administered orally and venetoclax increases AML cell death as compared to 5-azacytidine administered intravenously or subcutaneously and venetoclax. In some embodiments, the 5-azacytidine administered orally and venetoclax increases AML cell death as compared to 5-azacytidine administered intravenously or subcutaneously and venetoclax by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof. In some embodiments, the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the combination of the 5-azacytidine administered orally, venetoclax, LSD-1 inhibitor, and a pharmaceutically acceptable salt thereof, increases AML cell death compared to the combination of the 5-azacytidine administered intravenously or subcutaneously, venetoclax, LSD-1 inhibitor, and a pharmaceutically acceptable salt thereof. In some embodiments, the combination of the 5-azacytidine administered orally, venetoclax, LSD-1 inhibitor, and a pharmaceutically acceptable salt thereof, increases AML cell death compared to the combination of the 5-azacytidine administered intravenously or subcutaneously, venetoclax, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, as measured by any clinically recognized technique.

In some embodiments, the method of treatment is administered for one or more cycles, including one, two, three, four, and more. In some embodiments, one cycle is a period of about 7 days, about 14 days, about 21 days, or about 28 days. In some embodiments, one cycle is a period of about 28 days.

In some embodiments, 5-azacytidine is administered subcutaneously or intravenously to the subject once daily for the first about 7 days of an about 28 day cycle. In some embodiments, 5-azacytidine is administered subcutaneously or intravenously to the subject once daily on Days 1-7 of an about 28 day cycle. In some embodiments, 5-azacytidine is administered subcutaneously or intravenously to the subject once daily on seven consecutive days of an about 28 day cycle.

In some embodiments, the LSD-1 inhibitor is administered to the subject about once a week in an about 28 day cycle. In some embodiments, the LSD-1 inhibitor is administered to the subject on about Days 1, 8, 15, and 22 of an about 28 day cycle. In some embodiments, the LSD-1 inhibitor is administered to the subject on about Days 7, 14, 21, and 28 of an about 28 day cycle.

In some embodiments, the at least one additional therapeutic agent is administered to the subject once daily in an about 28 day cycle. In some embodiments, the at least one additional therapeutic agent is administered to the subject on about Days 1, 2, 3, 4, 5, 6, 7, 8, 9, 10, 11, 12, 13, 14, 15, 16, 17, 18, 19, 20, 21, 22, 23, 24, 25, 26, 27, and 28 in an about 28 day cycle. In some embodiments, the additional therapeutic agent is venetoclax.

In some embodiments, 5-azacytidine is administered at a dose of from about 75 mg/m$^2$ to about 100 mg/m$^2$, including about 75 mg/m$^2$, about 80 mg/m$^2$, about 85 mg/m$^2$, about 90 mg/m$^2$, about 95 mg/m$^2$, or about 100 mg/m$^2$, preferably subcutaneously or intravenously, once daily for the first seven days of an about 28 day cycle. In some embodiments, 5-azacytidine is administered at a dose of from about 75 mg/m$^2$ to about 100 mg/m$^2$, including about 75 mg/m$^2$, about 80 mg/m$^2$, about 85 mg/m$^2$, about 90 mg/m$^2$, about 95 mg/m$^2$, or about 100 mg/m$^2$, preferably subcutaneously or intravenously, once daily on 7 consecutive days of an about 28 day cycle.

In some embodiments, the LSD-1 inhibitor is administered to the subject at a dose of from about 20 mg to 60 mg, including about 20 mg, about 30 mg, about 40 mg, about 50 mg, or about 60 mg once a week of an about 28 day cycle. In some embodiments, the LSD-1 inhibitor is administered to the subject at a dose of from about 20 mg to 60 mg, including about 20 mg, about 30 mg, about 40 mg, about 50 mg, or about 60 mg, once a day on Days 1, 8, 15, and 22 of an about 28 day cycle. In some embodiments, the LSD-1 inhibitor is administered to the subject at a dose of from about 20 mg to 60 mg, including about 20 mg, about 30 mg, about 40 mg, about 50 mg, or about 60 mg, once a day on Days 7, 14, 21, and 28 of an about 28 day cycle.

In some embodiments, the at least one additional therapeutic agent (e.g., venetoclax) is administered to the subject at a dose of at least about 100 mg once daily in an about 28 day cycle. In some embodiments, the at least one additional therapeutic agent (e.g., venetoclax) is administered to the subject at a dose of at least about 100 mg once daily on about Days 1, 2, 3, 4, 5, 6, 7, 8, 9, 10, 11, 12, 13, 14, 15, 16, 17, 18, 19, 20, 21, 22, 23, 24, 25, 26, 27, and 28 in an about 28 day cycle.

In some embodiments, the at least one additional therapeutic agent (e.g., venetoclax) is administered to the subject at a dose of from about 100 mg to about 400 mg, including about 100 mg, about 150 mg, about 200 mg, about 250 mg, about 300 mg, about 350 mg, or about 400 mg, once daily in an about 28 day cycle. In some embodiments, the at least one additional therapeutic agent (e.g., venetoclax) is administered to the subject at a dose of from about 100 mg to about 400 mg, including about 100 mg, about 150 mg, about 200 mg, about 250 mg, about 300 mg, about 350 mg, and about 400 mg, once daily on about Days 1, 2, 3, 4, 5, 6, 7, 8, 9, 10, 11, 12, 13, 14, 15, 16, 17, 18, 19, 20, 21, 22, 23, 24, 25, 26, 27, and 28 in an about 28 day cycle. In some embodiments, the at least one additional therapeutic agent (e.g., venetoclax) is administered to the subject at a dose of about 400 mg once daily in an about 28 day cycle. In some embodiments, the at least one additional therapeutic agent (e.g., venetoclax) is administered to the subject at a dose of about 400 mg once daily on about Days 1, 2, 3, 4, 5, 6, 7, 8, 9, 10, 11, 12, 13, 14, 15, 16, 17, 18, 19, 20, 21, 22, 23, 24, 25, 26, 27, and 28 in an about 28 day cycle.

In some embodiments, the at least one additional therapeutic agent (e.g., venetoclax) is administered to the subject at a dose of about 100 mg on Day 1, a dose of about 200 mg on Day 2, a dose of about 300 mg on Day 3, and a dose of about 400 mg on about Days 4-28 of an about 28 day cycle.

In some embodiments, the method comprises: administering the 5-azacytidine subcutaneously or intravenously to the subject once daily for the first 7 days of a 28 day cycle; administering the at least one additional therapeutic agent to the subject once daily in a 28 day cycle; and administering the LSD-1 inhibitor, or a pharmaceutically acceptable salt thereof, to the subject once a week in a 28 day cycle.

In some embodiments, the method comprises: (a) administering the 5-azacytidine subcutaneously or intravenously to the subject on days 1, 2, 3, 4, 5, 6, and 7 days of a 28 day cycle; (b) administering the at least one additional therapeutic agent to the subject on days 1, 2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and (c) administering the LSD-1 inhibitor, or a pharmaceutically acceptable salt thereof, to the subject on days 1, 8, 15, and 22 of a 28 day cycle.

In some embodiments, the method further comprises: (a) administering the 5-azacytidine at a dose of about 75 mg/m² subcutaneously or intravenously every day for the first seven days of a 28 day cycle; and/or (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

In some embodiments, the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle. In some embodiments, the administering the at least one additional therapeutic agent comprises administering venetoclax.

In some embodiments, the method comprises: (a) administering the 5-azacytidine at a dose of about 75 mg/m² subcutaneously or intravenously every day for the first seven days of a 28 day cycle; and/or (b) administering the at least one additional therapeutic agent to the subject at a dose of about 400 mg orally every day of a 28 day cycle; and/or (c) administering the LSD-1 inhibitor to the subject at a dose of about 20 mg, about 40 mg or about 60 mg orally once a week of a 28 day cycle. In some embodiments, the administering the at least one additional therapeutic agent comprises administering venetoclax.

In some embodiments, method comprises: (a) administering the 5-azacytidine orally to the subject once daily for the first 14 days of a 28 day cycle; (b) administering the at least one additional therapeutic agent to the subject once daily in a 28 day cycle; and (c) administering the LSD-1 inhibitor, or a pharmaceutically acceptable salt thereof, to the subject once a week in a 28 day cycle.

In some embodiments, the method comprises: (a) administering the 5-azacytidine orally to the subject on days 1, 2, 3, 4, 5, 6, 7, 8, 9, 10, 11, 12, 13, and 14 of a 28 day cycle; (b) administering the at least one additional therapeutic agent to the subject on days 1, 2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and (c) administering the LSD-1 inhibitor, or a pharmaceutically acceptable salt thereof, to the subject on days 1, 8, 15, and 22 of a 28 day cycle.

In some embodiments the method further comprises: (a) administering the 5-azacytidine at a dose of about 300 mg every day for the first fourteen days of a 28 day cycle; and/or (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

In some embodiments the method further comprises: (a) administering the 5-azacytidine at a dose of about 200 mg every day for the first fourteen days of a 28 day cycle; and/or (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

In some embodiments, the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle. In some embodiments, administering the at least one additional therapeutic agent comprises administering venetoclax.

In some embodiments, the method comprises: (a) administering the 5-azacytidine at a dose of about 300 mg orally every day for the first fourteen days of a 28 day cycle; and/or (b) administering the at least one additional therapeutic agent to the subject at a dose of about 400 mg orally every day of a 28 day cycle; and/or (c) administering the LSD-1 inhibitor to the subject at a dose of about 20 mg, about 40 mg or about 60 mg orally once a week of a 28 day cycle. In some embodiments, administering the at least one additional therapeutic agent comprises administering venetoclax.

In some embodiments, the method comprises: (a) administering the 5-azacytidine at a dose of about 200 mg orally every day for the first fourteen days of a 28 day cycle; and/or (b) administering the at least one additional therapeutic agent to the subject at a dose of about 400 mg orally every day of a 28 day cycle; and/or (c) administering the LSD-1 inhibitor to the subject at a dose of about 20 mg, about 40 mg or about 60 mg orally once a week of a 28 day cycle. In some embodiments, administering the at least one additional therapeutic agent comprises administering venetoclax.

Also provided in another aspect is a method of treating a subject having acute myeloid leukemia (AML) who is not eligible for intensive induction chemotherapy, the method comprises administering to the subject: (i) in a first continuous 28-day cycle: (a) the 5-azacytidine subcutaneously or intravenously daily at a dose of about 75 mg/m² on Days 1 to 7; (b) the venetoclax orally at a dose of about 100 mg on Day 1; about 200 mg on Day 2, and about 400 mg daily on Days 3 to 28; and (c) a pharmaceutical composition comprising the besylate salt of the following compound:

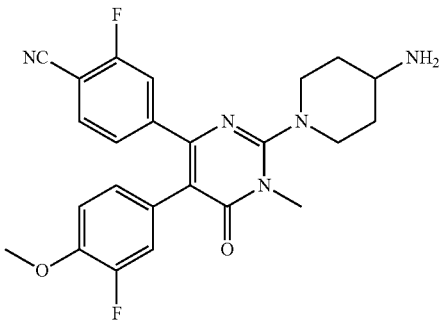 [SMILES: COc1ccc(-c2c(-c3ccc(C#N)c(F)c3)nc(N3CCC(N)CC3)n(C)c2=O)cc1F]

on Days 1, 8, 15, and 22; and (ii) in subsequent 28 day cycles: (d) the 5-azacytidine subcutaneously or intravenously daily at a dose of about 75 mg/m² on Days 1 to 7 of each subsequent cycle; (e) the venetoclax orally at a dose of about 400 mg on Days 1 to 28 of each subsequent cycle; and (f) a pharmaceutical composition comprising the besylate salt of the following compound

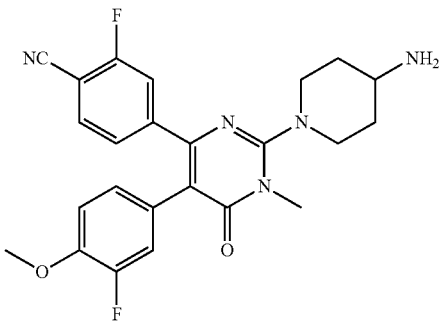 [SMILES: COc1ccc(-c2c(-c3ccc(C#N)c(F)c3)nc(N3CCC(N)CC3)n(C)c2=O)cc1F]

on Days 1, 8, 15, and 22 of each subsequent cycle.

In some embodiments, the pharmaceutical composition is administered at the dose of about 20 mg in the first continuous 28-day cycle and subsequent 28 day cycles. In some embodiments, the pharmaceutical composition is administered at the dose of about 40 mg in the first continuous 28-day cycle and subsequent 28 day cycles. In some embodiments, the pharmaceutical composition is administered at the dose of about 60 mg in the first continuous 28-day cycle and subsequent 28 day cycles.

In some embodiments, the pharmaceutical composition is administered at the dose of about 20 mg in the first continuous 28-day cycle and subsequent 28 day cycles. In some embodiments, if the dose of 20 mg is tolerated, then a second dose cohort will open where the pharmaceutical composition is administered at the dose of about 40 mg in the first continuous 28-day cycle and subsequent 28 day cycles.

In some embodiments, if the dose of 40 mg is tolerated, then a third dose cohort will open where the pharmaceutical composition is administered at the dose of about 40 mg in the first continuous 28-day cycle and subsequent 28 day cycles.

Incorporation By Reference: All disclosures (e.g., patents, publications, and web pages) referenced throughout this specification are incorporated by reference in their entireties. In addition, the following disclosures are also incorporated by reference herein in their entireties: (1) 2008 ASCO poster abstract by Skikne et al., *Leukemia*, 2008, 22, 1680-84.

VI. Definitions

Unless defined otherwise, all technical and scientific terms used herein have the same meaning as commonly understood by one of ordinary skill in the art. All publications and patents referred to herein are incorporated by reference herein in their entireties.

As used in the specification and the accompanying claims, the indefinite articles "a" and "an" and the definite article "the" include plural as well as singular referents, unless the context clearly dictates otherwise.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range.

As used herein, and unless otherwise specified, the terms "treat," "treating" and "treatment" refer to the eradication or amelioration of a disease or disorder, or of one or more symptoms associated with the disease or disorder. In certain embodiments, the terms refer to minimizing the spread or worsening of the disease or disorder resulting from the administration of one or more prophylactic or therapeutic agents to a subject with such a disease or disorder. In some embodiments, the terms refer to the administration of a compound or dosage form provided herein, with or without one or more additional active agent(s), after the onset of symptoms of the particular disease.

As used herein, and unless otherwise specified, the terms "prevent," "preventing" and "prevention" refer to the prevention of the onset, recurrence or spread of a disease or disorder, or of one or more symptoms thereof. In certain embodiments, the terms refer to the treatment with or administration of a compound or dosage form provided herein, with or without one or more other additional active agent(s), prior to the onset of symptoms, particularly to subjects at risk of disease or disorders provided herein. The terms encompass the inhibition or reduction of a symptom of the particular disease. Subjects with familial history of a disease in particular are candidates for preventive regimens in certain embodiments. In addition, subjects who have a history of recurring symptoms are also potential candidates for prevention. In this regard, the term "prevention" may be interchangeably used with the term "prophylactic treatment."

As used herein, and unless otherwise specified, the terms "therapeutically effective amount" and "effective amount" of a compound mean an amount sufficient to provide a therapeutic benefit in the treatment or management of a disease or disorder, or to delay or minimize one or more symptoms associated with the disease or disorder. A "therapeutically effective amount" and "effective amount" of a compound mean an amount of therapeutic agent, alone or in combination with one or more other agent(s), which provides a therapeutic benefit in the treatment or management of the disease or disorder. The terms "therapeutically effective amount" and "effective amount" can encompass an amount that improves overall therapy, reduces or avoids symptoms or causes of disease or disorder, or enhances the therapeutic efficacy of another therapeutic agent.

As used herein, and unless otherwise specified, a "prophylactically effective amount" of a compound is an amount sufficient to prevent a disease or disorder, or prevent its recurrence. A prophylactically effective amount of a compound means an amount of therapeutic agent, alone or in combination with one or more other agent(s), which provides a prophylactic benefit in the prevention of the disease. The term "prophylactically effective amount" can encompass an amount that improves overall prophylaxis or enhances the prophylactic efficacy of another prophylactic agent.

"Tumor," as used herein, refers to all neoplastic cell growth and proliferation, whether malignant or benign, and all pre-cancerous and cancerous cells and tissues. "Neoplastic," as used herein, refers to any form of dysregulated or unregulated cell growth, whether malignant or benign, resulting in abnormal tissue growth. Thus, "neoplastic cells" include malignant and benign cells having dysregulated or unregulated cell growth.

The terms "composition," "formulation," and "dosage form," as used herein are intended to encompass compositions comprising the specified ingredient(s) (in the specified amounts, if indicated), as well as any product(s) which result, directly or indirectly, from combination of the specified ingredient(s) in the specified amount(s). By "pharmaceutical" or "pharmaceutically acceptable" it is meant that any diluent(s), excipient(s) or carrier(s) in the composition, formulation, or dosage form are compatible with the other ingredient(s) and not deleterious to the recipient thereof. Unless indicated otherwise, the terms "composition," "formulation," and "dosage form" are used herein interchangeably.

The term "non-enteric-coated," when used herein, refers to a pharmaceutical composition, formulation, or dosage form that does not comprise a coating intended to release the active ingredient(s) beyond the stomach (e.g., in the intestine). In certain embodiments, a non-enteric-coated composition, formulation, or dosage form is designed to release the active ingredient(s) substantially in the stomach.

The term "subject" as defined herein is a human.

EXAMPLES

Example 1

Materials and Methods:
Cells, Culture Conditions and Reagents

AML cell lines were purchased from the American Tissue Culture Collection (ATCC) or were obtained from the Celgene master cell line bank. Cells were cultured in RPMI 1640 medium supplemented with 10% or 20% fetal bovine serum and 10 mM L-glutamine at 37° C. in a humidified atmosphere with 5% $CO_2$. BaF3-FLT3 wt, BaF3-FLT3ITD, BaF3-FLT3D538Y were generated by Kyinno (Beijing, China). Cells were grown in RPMI with 10% FBS with 0.5 ug/ml puromycin. Exponentially growing cells were used for all in vitro studies. 5-azacytidine (10 mM in DMSO) was obtained from the Celgene compound collection bank was obtained from the Celgene compound collection bank. Gilteritinib (ASP2215), Midostaurin (PKC412), venetoclax (ABT-199), quizartinib (AC220), the pan caspase inhibitor Z-VAD-FMK were purchased from Selleckchem (Houston, TX) and reconstituted as a 10 mM stock in DMSO.

Cell Viability Assay

Cells were plated in 384-well plates (Corning Cat #3764) at 2000 cells/well in 50 µl medium. Relative cell numbers, calculated as % DMSO control well, were measured using Cell Titer-Glow (Promega, Madison, WI)) according to the manufacturer's instructions. Luminescence values were quantified at the time indicated using an EnvVsion plate reader (PerkinElmer). Cells were treated daily with 5-azacytidine for three days and/or once with midostaurin, gilteritinib or venetoclax. Nine doses of 5-azacytidine titrated depending on sensitivity to 5-azacytidine were combined with six doses of the second drug evaluated, yielding 54 possible combinations, each evaluated in duplicate for every experiment. Prism version 7.03 (Prism Software Corporation) was used to calculate $EC_{50}$ values.

Data Analysis of Combination Effects

Cell survival was plotted as a function of drug concentration and used to calculate $EC_{50}$ values using GraphPad Prism software (San Diego, CA). Synergy indices were calculated by the highest single agent model and Combenefit software) Combenefit: an interactive platform for the analysis and visualization of drug combinations (Di Veroli et al., Bioinformatics. 2016 Sep. 15; 32(18):2866-8).

Western Blots

After treatment with 5-azacytidine and/or inhibitors at the indicated doses/times, protein was harvested using lysis buffer (Cell Signaling, #9803, Cell Signaling Technologies, Danvers, MA) containing 1 mM PMSF. Lysates were quantified using a bicinchoninic acid (BCA) kit (Piece/Thermo Fisher, Waltham, MA). 20 to 30 µg protein was resolved on a 4-12% SDS-PAGE gel, transferred to PVDF membranes (80V/90 minute by wet-transfer), and blocked with Oddysey TBS blocking buffer for 1 hour and then probed with appropriate primary antibodies overnight at 4° C. using dilution as recommended by manufacturer. Membranes were washed three times for a total of 30 minutes and then incubated with secondary antibodies at room temperature in the dark for 1 hour. After another three washes, Odyssey infrared imaging system and companion software (LI-COR biosciences, Lincoln, NE, USA) were used to scan immunoblot membranes and to quantify band intensity according to the manufacturer's instructions. The ratio of proteins of interest to loading control in treated samples was normalized to the corresponding ratio in untreated cells. Antibodies used for immunoblotting were purchased from the following sources: BCL-2 (sc-7382), MCL1- (sc-819) from Santa Cruz Biotechnology (Dallas, TX, USA, Bim (2819), caspase-3 (9664) from Cell Signaling Technology; beta-Actin (A2228) from Sigma-Aldrich; DNMTI (ab188453) from AbCam; TRDye 680 goat anti-rabbit and IRDye 800 goat anti-mouse secondary antibodies (#925-68073 and #925-32212) were purchased from Li-COR Biosciences (Lincoln, NE).

Flow Cytometry

PE mouse anti-human CD14 monoclonal antibody (clone M5E2, Cat. no. #301850, BioLegend, San Diego, CA), BV421-conjugated mouse anti-human CD11b monoclonal antibody (Clone M1/70, Cat. no. #101235, Biolegend), FITC-conjugated mouse anti-human CD86 monoclonal antibody (Clone 2331, Cat. no. #560958, BD Pharmingen, San Diego, CA) were used for FACS staining at 1:200 dilution. FACS samples were acquired using BD FACSCanto II. Cell viability was also examined by FACS analysis with Fixable Viability dye 780 (Thermofisher Scientific, Waltham, MA) according to the manufacturer's instructions. Briefly, $10^5$ cells were seeded in U bottom 96 well plate, next day treated with 9 doses of CC-90011 (started from 10 uM, 3-fold dilution down), cells were incubated at 37° C. for 6 days and harvested for staining. Cells were washed once with DPBS and stained with 1×FVS780 and washed twice with staining buffer. The samples were stained with 1:200 dilution surface antibodies. Results were then analyzed with FlowJo V10 software (TreeStar Inc., Ashland, OR). The percentage of live for all the positive surface markers was used to calculate $EC_{50}$ values, normalized to DMSO-treated samples as 100% for the curve control.

RNASeq Analysis

MV4-11 cells were treated with PBS or 1 µM of 5-azacytidine for 24 hrs or daily with 1 µM of 5-azacytidine for 48 hrs in triplicate. After treatment, cells were recovered, washed once in PBS, and flash frozen as cell pellets. Cell pellets were sent to Canopy Biosciences for RNA extraction and library preparation and sequencing. RNA was extracted using the Qiagen RNeasy Mini Kit according to manufacturer's instructions. A modified protocol was used to preserve miRNA species. Total RNA Seq libraries were prepared using 200 ng of total RNA and the NEBNext Ultra II Directional Library prep kit. rRNA depletion was performed using an RNase-H based method (New England Biolabs, Ipswich, MA). MCL1 RNA levels in other cell lines were quantified by RNASeq using standard methods.

Libraries were multiplexed and sequenced using Illumina HiSeq. All gene counts were then imported into the R/Bioconductor package EdgeR and TMM normalization size factors were calculated to adjust for samples for differences in library size. Ribosomal genes and genes not expressed in the smallest group size minus one samples greater than one count-per-million were excluded from further analysis. Differential expression analysis was then performed to analyze for differences between conditions and the results were filtered for only those genes with Benjamini-Hochberg false-discovery rate adjusted p-values less than or equal to 0.05. Global perturbations in known Gene Ontology (GO) terms and KEGG pathways were detected using the R/Bioconductor package GAGE to test for changes in expression of the reported log 2 fold-changes reported by Limma in each term versus the background log 2 fold-changes of all genes found outside the respective term. The R/Bioconductor package heatmap and Pathview was used to display heatmaps or annotated KEGG graphs across groups of samples for each GO term or KEGG pathway (respectively) with a Benjamini-Hochberg false-discovery rate adjusted p-value less than or equal to 0.05. To find differentially expressed genes, the raw counts were variance stabilized with the R/Bioconductor package DESeq2.

To validate ATF3 and SCD expression, MV4-11 cells were treated with PBS or 0.3 µM 5-azacytidine, 1 µM 5-azacytidine, or 3 µM 5-azacytidine for 24 hours and 48 hours. At this time, cells were recovered and RNA was extracted using Qiagen RNeasy kit according to manufacturer's instructions. Reverse transcription was performed using SuperScript VILO cDNA synthesis kit. Validated Taqman probes and Taqman Fast Advanced Master Mix was used with Viia 7 Real-Time PCR System (Invitrogen/ThermoFisher Scientific, Waltham, MA) to quantify transcripts of ATF3, SCD, and 18S mRNA.

Interfering RNA Gene Silencing

ATF3, SCD, or control Silencer Select siRNAs (16 nM siRNA, Invitrogen) were transfected into MV4-11 cells using Lipofectamine 2000 according to the manufacturer's suggested protocol. Untreated cells were mock transfected without siRNA. Cells were then treated with varying concentrations of 5-azacytidine daily for 3 days. At day 4, cells were treated with venetoclax, followed by examination of cell viability at day 7 using Cell Titer Glo according to manufacturer's protocol. Synergy was calculated using Combenefit and compared using Highest Single Agent analysis.

Confirmation of gene knockdown was performed on siRNA transfected cells at 72 hours after transfection (without 5-azacytidine or venetoclax treatment). RNA was extracted using Qiagen RNeasy kit, and reverse transcription was performed using SuperScript VILO cDNA synthesis kit. Validated Taqman probes and Taqman Fast Advanced Master Mix was used with Viia 7 Real-Time PCR System (Invitrogen/ThermoFisher Scientific, Waltham, MA) to quantify transcripts of ATF3, SCD, and 18S mRNA.

5-Azacytidine and at Least One Additional Therapeutic Agent Dual Combination Assay As used throughout the Examples, LEED refers to the delivery of 5-azacytidine at a low exposure for an extended duration (LEED) at 1 mg/kg, once daily for fifteen days (QD×15). To deliver the same cumulative dose of 5-azacytidine, the 5-azacytidine is administered at a high exposure for a limited duration (HELD), at 3 mg/kg, once daily for five days (QD×5). LEED models oral administration of AZA, while HELD models intravenous or subcutaneous administration of AZA.

Experiments were carried out at Charles River Laboratories (Morissville, NC) with female NOD/SCID mice (NOD.CB17-Prkdcscid/NcrCrl, Charles River) that were eight weeks old with a body weight (BW) range of 17.6 to 28.4 grams on Day 1 of the study. The animals were fed ad libitum water (reverse osmosis, 1 ppm Cl), and NIH 31 Modified and Irradiated Lab Diet® consisting of 18.0% crude protein, 5.0% crude fat, and 5.0% crude fiber. The mice were housed on irradiated Enrich-o'cobs™ Laboratory Animal Bedding in static microisolators on a 12-hour light cycle at 20-22° C. (68-72° F.) and 40-60% humidity.

Celgene provided LEED 5-azacytidine, HELD 5-azacytidine (midostaurin (MedChemExpress, Monmouth Junction, NJ), gilteritinib (Sigma Aldrich, St. Louis, MO), and venetoclax (ABT-199, Sigma Aldrich, St. Louis, MO). The vehicle used in this study was 6% Gelucire® 44/14 (Gattefossé, Paramus, NJ) in deionized (DI) water, which was a waxy solid that required a water bath heat to 44° C. for melting, dosed PO (per oral), and phosphate buffered saline (PBS), dosed IP (intraperitoneal). On each day of dosing, an appropriate amount of LEED or HELD 5-azacytidine was resuspended in PBS to yield a dosing suspension at 0.1 or 0.3 mg/mL, respectively. On each day of dosing, an appropriate amount of midostaurin was dissolved in 6% Gelucire 44/14 to yield a dosing solution at 10 mg/mL. On each day of dosing, an appropriate amount of gilteritinib was dissolved in 0.5% methylcellulose in DI water to yield a dosing solution at 0.4 mg/mL. Each week, an appropriate amount of venetoclax was dissolved in 10% ethanol:30% PEG400: 60% phosal 50 propylene glycol to yield a dosing solution at 10 mg/mL. Cells used for inoculation were harvested during log phase growth and resuspended at a concentration of $5 \times 10^7$ cells/mL in PBS. Each test mouse received $5 \times 10^6$ MOLM-13 cells or $10^7$ MV4-11 cells (0.2 mL cell suspension) by tail vein injection. Dosing was initiated three days after tumor cell inoculation, which was designated as Day 1 of the study. NOD/SCID mice (n=9-12/group) were randomized according to body weight and dosed. Phosphate buffered saline, LEED 5-azacytidine, and HELD 5-azacytidine were administered intraperitoneally (IP), while midostaurin, gilteritinib, and venetoclax were administered PO. Vehicle was administered both IP and PO. The dosing volume for all treatments was 10 mL/kg, scaled to the weight of each individual animal.

Animals were monitored individually for an endpoint of moribundity due to progression of the leukemia. Full hind limb paralysis, severe ocular proptosis, or moribundity was considered sufficient for euthanasia due to tumor progression. Moribund animals were defined as sick animals unable to reach food and water. These deaths were classified as death on survival study. The time to endpoint (TTE), in days, was recorded for each mouse that died of its disease or was euthanized due to extensive tumor progression. Animals that did not reach the endpoint were euthanized at the end of the study and were assigned a TTE value equal to the last day. An animal classified as having died from treatment-related (TR) causes was assigned a TTE value equal to the day of death. An animal classified as having died from non-treatment-related (NTR) causes, or used for sampling before endpoint, was excluded from TTE calculations and all further analyses. The median TTE value was calculated for each group. The median TTE of treated mice was expressed as a percentage of the median TTE of the control mice (% T/C), and the increase in life span (ILS) was calculated as: ILS=% T/C−100%, where T=median TTE treated, and C=median TTE control. Thus, if T=C, ILS=0%.

Animals were weighed daily on Days 1-5, then twice per week until the completion of the study. The mice were observed frequently for overt signs of any adverse, treatment-related (TR) side effects, and clinical signs were recorded when observed. Individual body weight loss was monitored as per protocol and any animal that exceeded the limits for acceptable body weight loss was euthanized. Group mean body weight loss also was monitored as per protocol. Dosing was suspended in any group that exceeded the limits for acceptable mean body weight loss. If mean body weight recovered, then dosing may be resumed in that group, but at a lower dosage or less frequent dosing schedule. Acceptable toxicity for the maximum tolerated dose was defined as a group mean body-weight loss of less than 20% during the study and not more than one TR death among ten treated animals. A death was classified as TR if attributable to treatment side effects as evidenced by clinical signs and/or necropsy or may also be classified as TR if due to unknown causes during the dosing period or within 14 days of the last dose. A death was classified as NTR if there was no evidence that death was related to treatment side effects or tumor progression. Non-treatment-related deaths may be further characterized based on cause of death. A death may be classified as NTRa if it resulted from an accident or human error. A death may be classified as NTRu if the cause of death is unknown and there is no available evidence of death related to treatment side effects, metastasis, accident or human error, although death due to these etiologies cannot be excluded. Survival was analyzed by the Kaplan-Meier method, based on TTE values. The logrank (Mantel-Cox) and Gehan-Breslow-Wilcoxon tests determined the significance of the difference between the overall survival experiences (survival curves) of two groups, based on TTE values.

Combinations of 5-Azacytidine with Venetoclax Results

Figure 2:
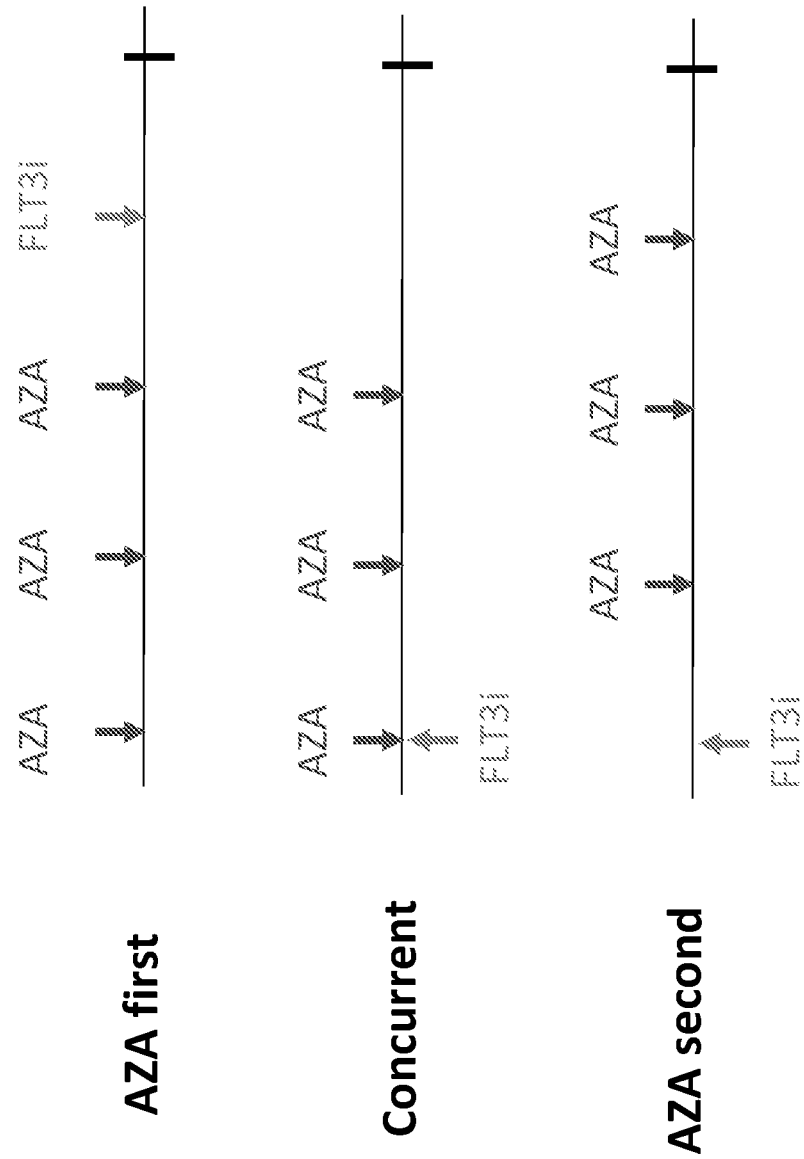
FIG. 2 represents the three different dosing schedules of (i) 5-azacytidine (AZA) administered first at intervals before the FLT3 inhibitor (FLT3i); (ii) the two agents (5-azacytidine and FLT3i) administered concurrently; and (iii) 5-azacytidine administered second at intervals after the FLT3i is administered. The FLT3 inhibitor may be any suitable FLT3 inhibitor, including midostaurin, or gilteritinib.
Figure 3:
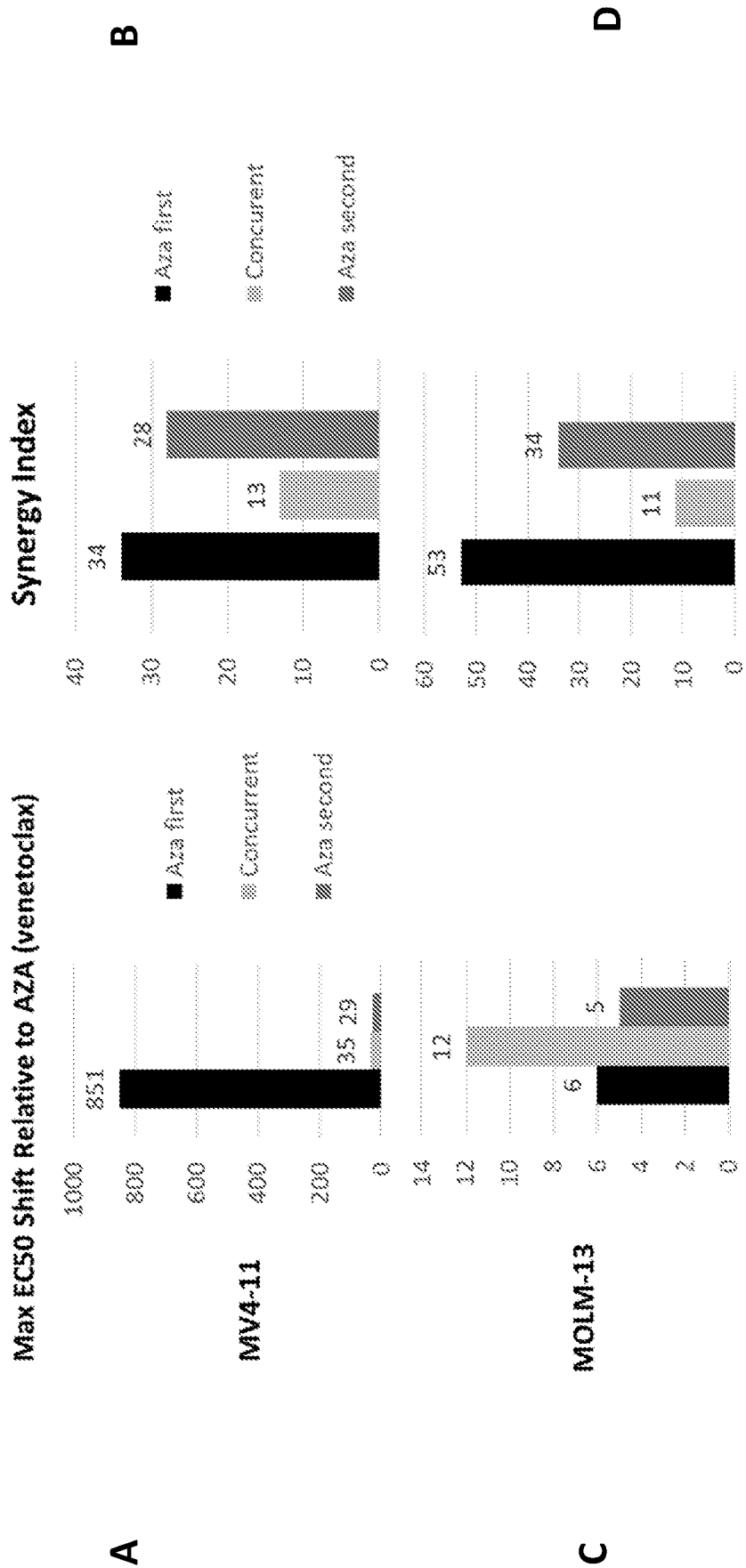
FIGS. 3A-D represent the maximum $EC_{50}$ fold shift of 5-azacytidine in combination with venetoclax with cell lines MV4-11 (FIG. 3A) and MOLM-13 (FIG. 3C). The results from three different dosing schedules are shown, as indicated in the legend: (i) 5-azacytidine administered first (black bar); (ii) the two agents administered concurrently (light gray bar); and (iii) 5-azacytidine administered second (medium gray bar). A synergy index is also shown for 5-azacytidine administered in combination with venetoclax with cell lines MV4-11 (FIG. 3B) and MOLM-13 (FIG. 3D) for the three different dosing schedules.
Figure 4:
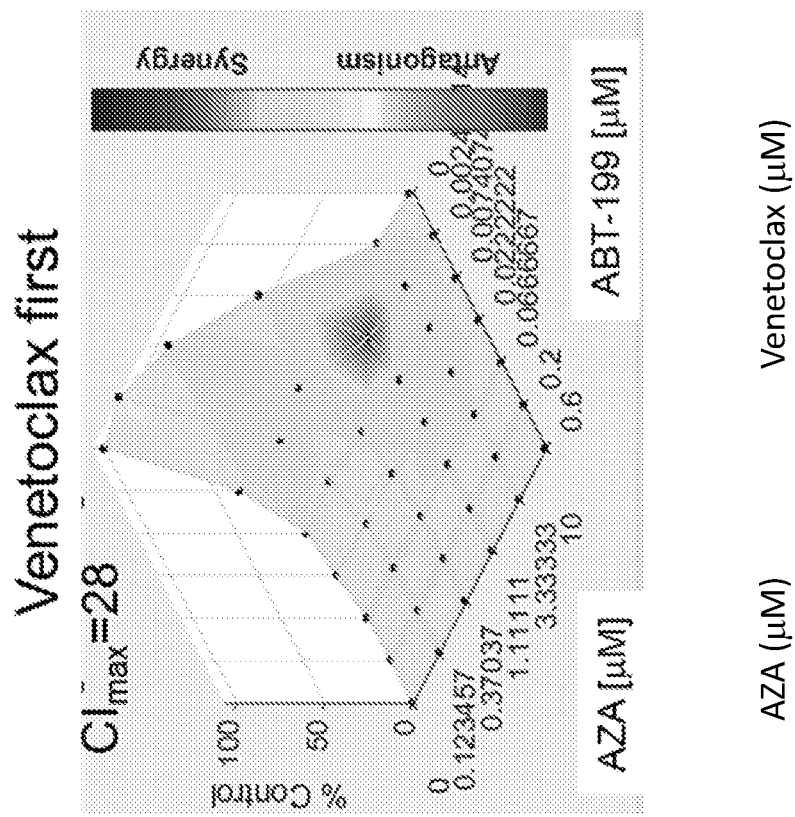
FIGS. 4A-C represent Response Surface Analyses showing synergistic effects of 5-azacytidine with venetoclax in MV4-11 cells when 5-azacytidine is administered first (FIG. 4A), the relatively lower synergy with simultaneous administration (FIG. 4B), and synergy with venetoclax administered first (FIG. 4C). RResponse surface methodology (RSM) is a well-known statistical method to explore the relationships between several explanatory variables and one or more response variables. RSM uses a sequence of designed experiments to obtain an optimal response, which in the present case is the synergistic effects of 5-azacytidine with venetoclax.

FIGS. 1-7 provide various information and data regarding the experiment. For example, FIG. 1 is a bar graph representing the maximum $EC_{50}$ fold shift of 5-azacytidine in combination with gilteritinib, and 5-azacytidine in combination with midostaurin, both with cell lines MV4-11 and MOLM-13. The results from three different dosing schedules are shown: (i) 5-azacytidine administered first (black bar); (ii) the two agents administered concurrently (light gray bar); and (iii) 5-azacytidine administered second (medium gray bar). FIG. 2 represents the three different dosing schedules of (i) 5-azacytidine (AZA) administered first at intervals before the FLT3 inhibitor (FLT3i); (ii) the two agents (5-azacytidine and FLT3i) administered concurrently; and (iii) 5-azacytidine administered second at intervals after the FLT3i is administered; where the FLT3i may be any suitable FLT3 inhibitor, such as midostaurin or gilteritinib. FIGS. 3A-D represent the maximum $EC_{50}$ fold shift of 5-azacytidine in combination with venetoclax with cell lines MV4-11 (FIG. 3A) and MOLM-13 (FIG. 3C). Three different dosing schedules are shown, (i) 5-azacytidine administered first (black bar); (ii) the two agents administered concurrently (light gray bar); and (iii) 5-azacytidine administered second (medium gray bar). A synergy index is also shown for 5-azacytidine administered in combination with venetoclax with cell lines MV4-11 (FIG. 3B) and MOLM-13 (FIG. 3D) for the three different dosing schedules.

FIGS. 4A-C represent Response Surface Analyses showing synergy of 5-azacytidine with venetoclax in MV4-11 cells when 5-azacytidine is administered first (FIG. 4A), the relatively lower synergy with simultaneous administration (FIG. 4B), and synergy with venetoclax administered first (FIG. 4C). Response surface methodology (RSM) explores the statistical relationships between several explanatory variables and one or more response variables. RSM uses a sequence of designed experiments to obtain an optimal response, which in the present case is the synergistic effects of 5-azacytidine with venetoclax.

Figure 5:
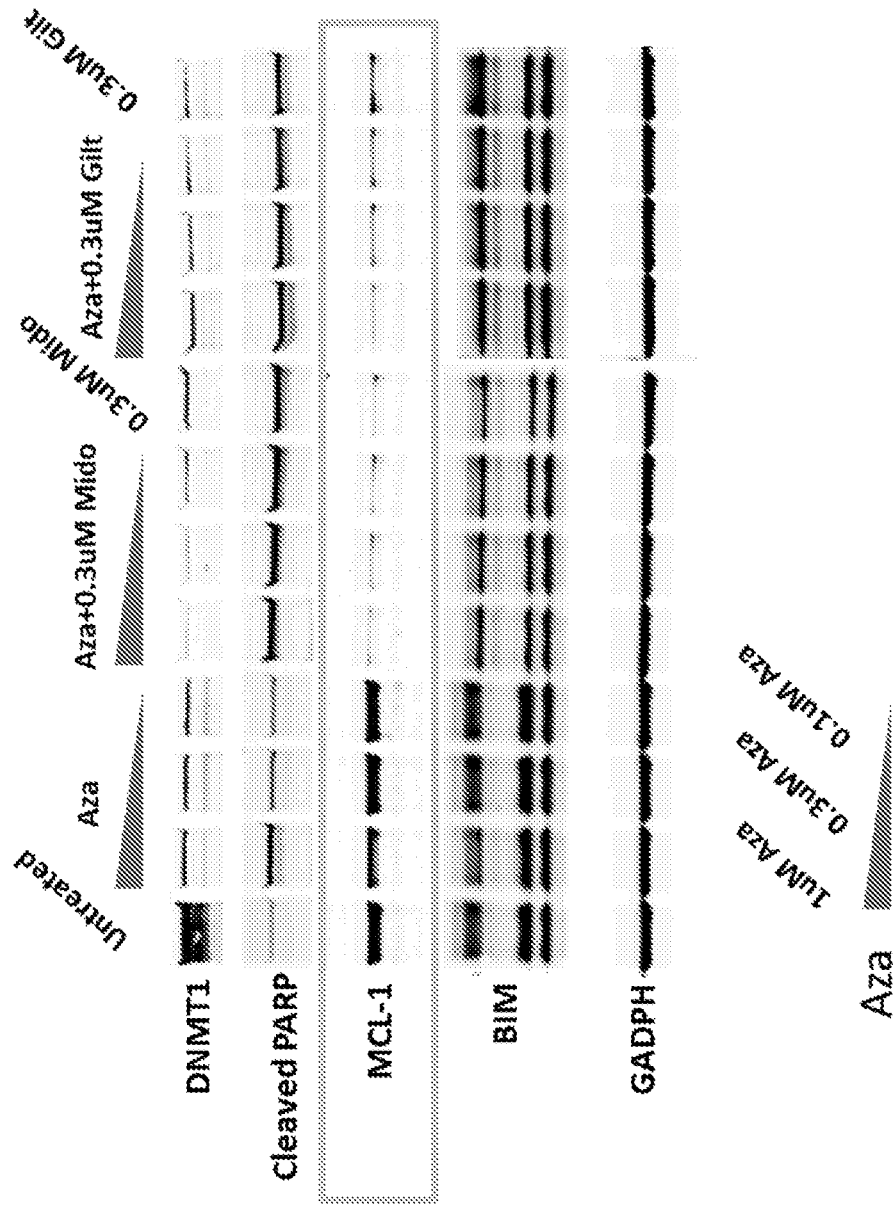
FIG. 5 depicts a western blot showing that (a) 5-azacytidine and midostaurin ("aza+0.3 µM Mido") and (b) 5-azacytidine and gilteritinib ("aza+0.3 µM Gilt") augment MCL-1 degradation in MV4-11 cell lines.

FIG. 5 depicts a western blot showing that (a) 5-azacytidine and midostaurin ("aza+0.3 µM Mido") and (b) 5-azacytidine and gilteritinib ("aza+0.3 µM Gilt") augment MCL-1 degradation in MV4-11 cell lines.

Figure 6:
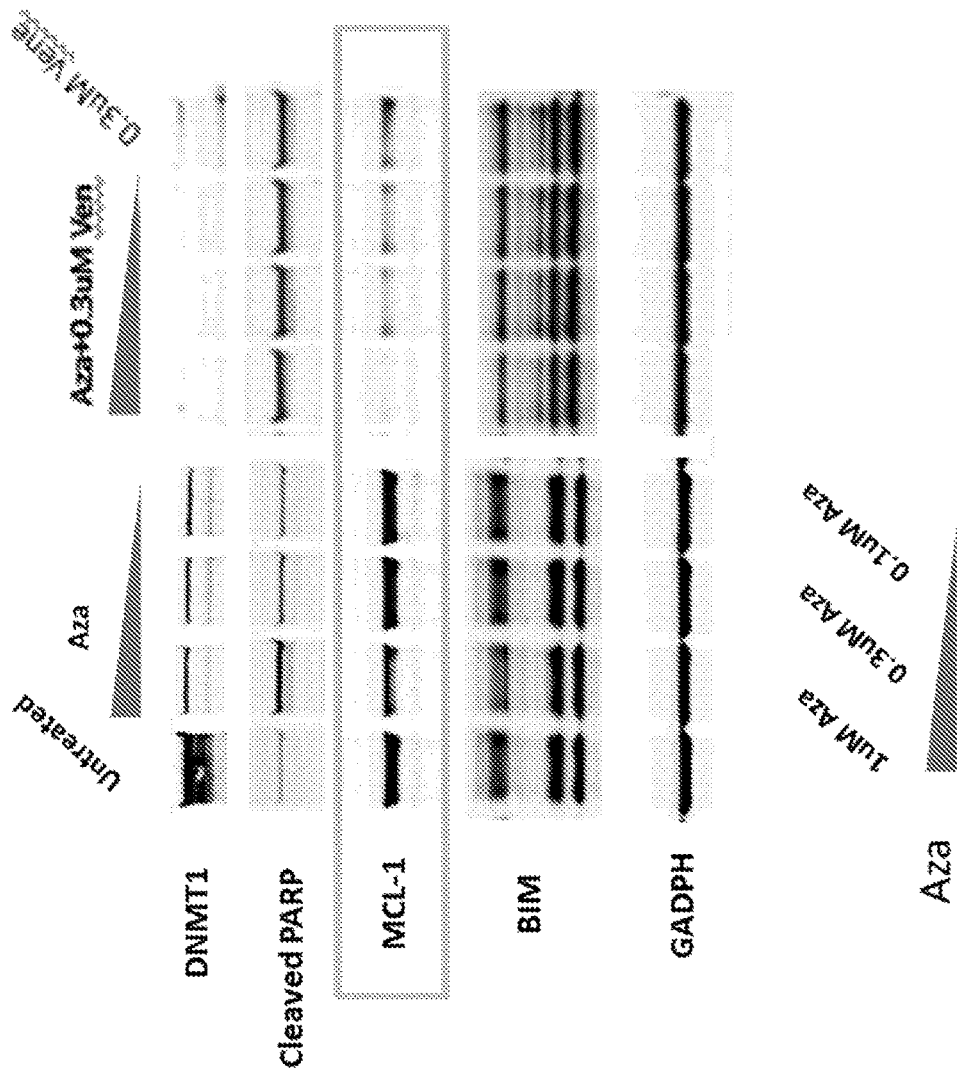
FIG. 6 depicts a western blot showing that 5-azacytidine and venetoclax treatment decreases MCL-1 levels in FLT3ITD MV4-11 cells.

In addition, FIG. 6 depicts a western blot showing that 5-azacytidine and venetoclax treatment decreases MCL-1 Levels in FLT3ITD MV4-11 cells.

Finally, FIGS. 7A-C depict in vivo assessments of 5-azacytidine combinations in a MOLM-13 xenograft model, with a graph of percent survival (y-axis) vs day 0 to 70 (x-axis). Dosing for the experiments shown in FIGS. 7A-C was as follows: (i) 5-azacytidine (low exposure, extended duration, LEED): 1 mg/kg interperitoneally (IP), once daily for five days, three times (qdx 5×3); (ii) 5-azacytidine (high exposure, limited duration, HELD): 3 mg/kg interperitoneally (IP), once daily for five days (qdx5); (iii) Midaustaurin (100 mg/kg orally (PO), once daily for twenty-one days (qdx21)); (iv) Gilteritinib (4 mg/kg orally (PO), once daily for twenty-one days (qdx21)); and (v) Venetoclax (100 mg/kg orally (PO), once daily for twenty-one days (qdx21)). P-value (relative to best single agent) *P<0.05; P<0.001; *P<0.0001. FIG. 7A shows the results of the combination of 5-azacytidine and midostaurin, FIG. 7B shows the results of 5-azacytidine combined with venetoclax, and FIG. 7C shows the results of the combination of 5-azacytidine and gilteritinib. For FIG. 7A, the compositions tested were vehicle, 5-azacytidine (low exposure, extended duration, LEED, schedule of 1 mg/kg 5-azacytidine, once daily for fifteen days (qdx15)), 5-azacytidine (high exposure, limited duration, HELD, schedule of 3 mg/kg 5-azacytidine, once daily for five days (qdx5)), midostaurin (100/kg, once daily for twenty-eight days (qdx28)), LEED+midostaurin, and HELD+midostaurin. For FIG. 7B, the compositions tested were vehicle, 5-azacytidine (LEED), 5-azacytidine (HELD), venetoclax, LEED+venetoclax, and HELD+venetoclax. For FIG. 7C, the compositions tested were vehicle, 5-azacytidine (LEED), 5-azacytidine (HELD), gilteritinib, LEED+gilteritinib, and HELD+gilteritinib. Both LEED and HELD 5-azacytidine dosing caused statistically significantly increases in survival compared to vehicle alone (LEED vs vehicle, p=0.003 by Gehan-Breslow-Wilcoxon test; HELD vs vehicle, p=0.003 by Gehan-Breslow-Wilcoxon test). Midostaurin alone and in combination with LEED or HELD 5-azacytidine significantly increased survival compared to vehicle alone (Midostaurin vs vehicle, p=0.027; LEED+midostaurin vs vehicle, p=0.012; HELD+midostaurin vs vehicle, p=0.003). HELD 5-azacytidine dosing in combination with midostaurin significantly increased survival compared to LEED or HELD 5-azacytidine, respectively (LEED+midostaurin vs LEED, p=0.028; HELD+midostaurin vs HELD, p=0.039). No significant changes in survival were observed between LEED or HELD in combination with midostaurin compared to midostaurin treatment alone. Median survival was increased with LEED or HELD 5-azacytidine in combination with midostaurin compared to vehicle or single agents (LEED+midostaurin=45 days, HELD+midostaurin=43 days, vehicle=19 days, midostaurin=34 days, LEED=36 days, HELD=32 days, (FIG. 7A). Gilteritinib alone and in combination with LEED or HELD 5-azacytidine significantly increased survival compared to vehicle alone (gilteritinib vs vehicle, p=0.003; LEED+gilteritinib vs vehicle, p=0.003; HELD+gilteritinib vs vehicle, p=0.003). Low exposure, extended duration or HELD 5-azacytidine dosing in combination with gilteritinib significantly increased survival compared to either LEED or HELD 5-azacytidine alone (LEED+gilteritinib vs LEED, p=0.019; LEED+gilteritinib vs HELD, p=0.004; HELD+gilteritinib vs LEED, p=0.008; HELD+gilteritinib vs HELD, p=0.003. Furthermore, LEED or HELD 5-azacytidine dosing in combination with gilteritinib significantly increased survival compared to gilteritinib alone (LEED+gilteritinib vs gilteritinib, p<0.001; HELD+gilteritinib vs gilteritinib, p<0.001). Venetoclax alone and in combination with LEED or HELD 5-azacytidine significantly increased survival compared to vehicle alone (venetoclax vs vehicle, p=0.003; LEED+venetoclax vs vehicle, p=0.002; HELD+venetoclax vs vehicle, p=0.004) (FIG. 7B). Low exposure, extended duration or HELD 5-azacytidine dosing in combination with venetoclax significantly increased survival compared to either LEED or HELD 5-azacytidine alone (LEED+venetoclax vs LEED, p=0.001; LEED+venetoclax vs HELD, p<0.001; HELD+venetoclax vs LEED, p=<0.001; HELD+venetoclax vs HELD, p=<0.001. Furthermore, LEED or HELD 5-azacytidine dosing in combination with venetoclax significantly increased survival compared to venetoclax alone (LEED+venetoclax vs venetoclax, p<0.001; HELD+venetoclax vs venetoclax, p<0.001). Low exposure, extended duration in combination with venetoclax was not significantly different than HELD in combination with venetoclax. Median survival was increased with LEED or HELD 5-azacytidine in combination with venetoclax compared to vehicle or single agents (LEED+venetoclax=46 days, HELD+venetoclax=45 days, vehicle=19 days, venetoclax=29 days, LEED=36 days, HELD=32 days). Median survival was increased with LEED or HELD 5-azacytidine in combination with gilteritinib compared to vehicle or single agents (LEED+gilteritinib=45 days, HELD+gilteritinib=43 days, vehicle=19 days, gilteritinib=34 days, LEED=36 days, HELD=32 days, (FIG. 7C).

Figure 8A:
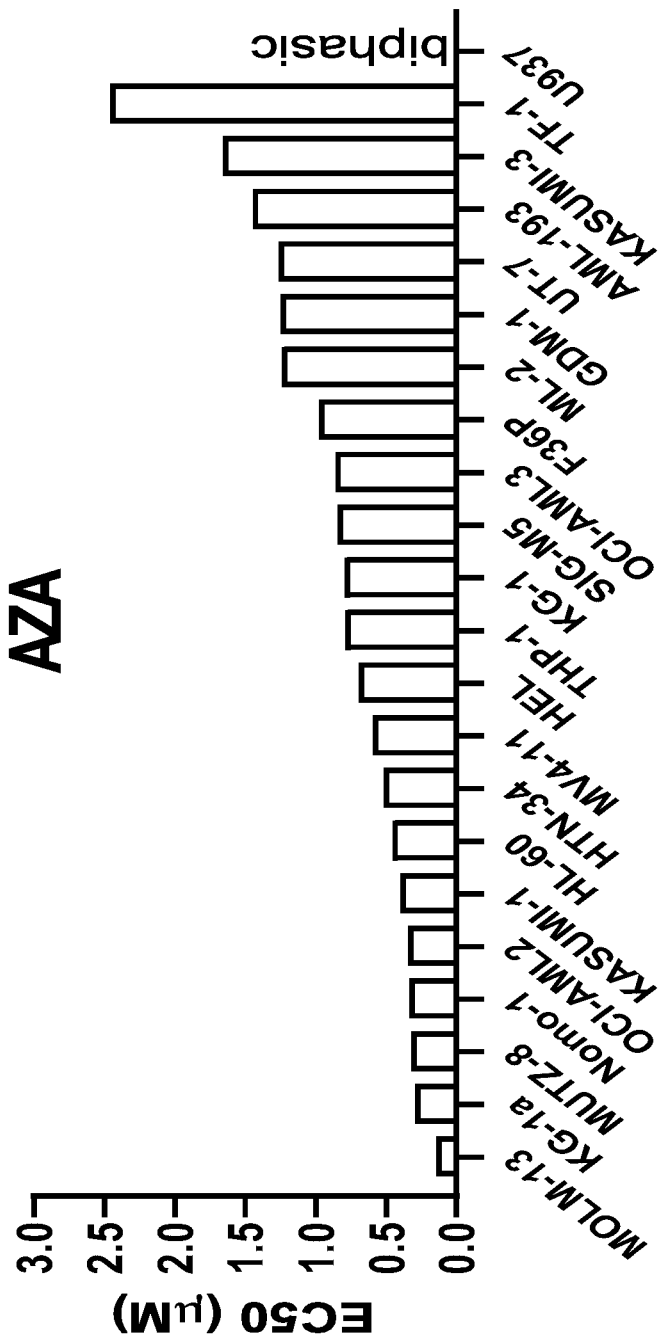
Figure 8B:
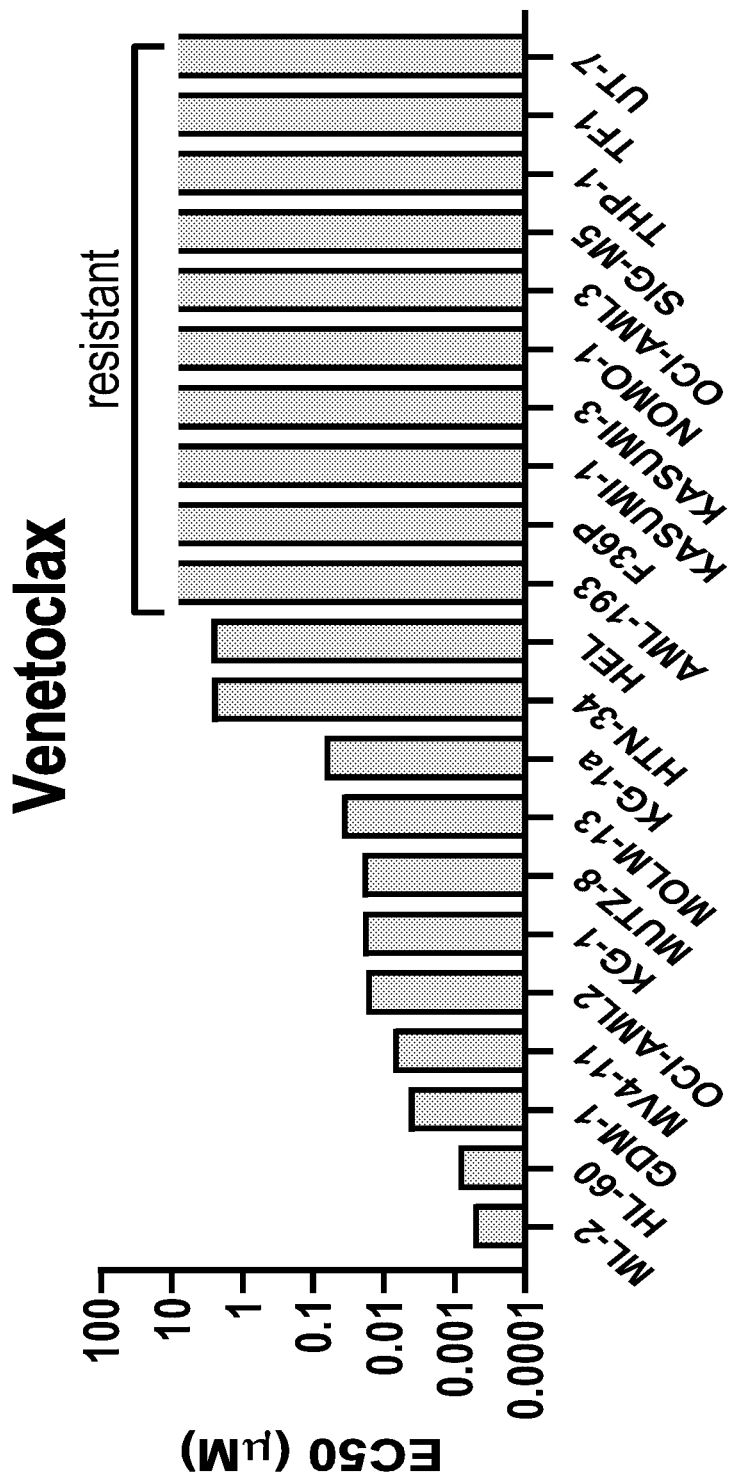

FIGS. 8A, 8B, and 8C show the sensitivity of 22 AML cell lines to 5-azacytidine (AZA) and venetoclax as single agents and the combination of 5-azacytidine and venetoclax. FIG. 8A shows that 5-azacytidine showed cytotoxic effects in most cell lines, with $EC_{50}$ values ranging from 0.15 µM to 2.5 µM. In contrast, FIG. 8B shows that 11/22 of the ANIL cell lines examined were sensitive to venetoclax ($EC_{50}$<10 µM). FIG. 8C shows the combinatorial activity of 5-azacytidine with venetoclax using surface response analysis and highest single agent model, where 10/22 cell lines showed synergistic activity above the arbitrary threshold of 20. Notably, three cell lines that were resistant to venetoclax (Kasumi-1, Kasumi-2 and NOMO-1) showed reversal of venetoclax resistance with co-treatment with 5-azacytidine. Cell lines that carried FLT3-ITD, a recurrent mutation in AML, also showed synergistic activity with 5-azacytidine and venetoclax.

These results surprisingly demonstrate that the combination of 5-azacytidine with venetoclax provides a synergistic effect in AML cell lines, and in particular AML cell lines that are resistant to venetoclax.

Figure 9D:
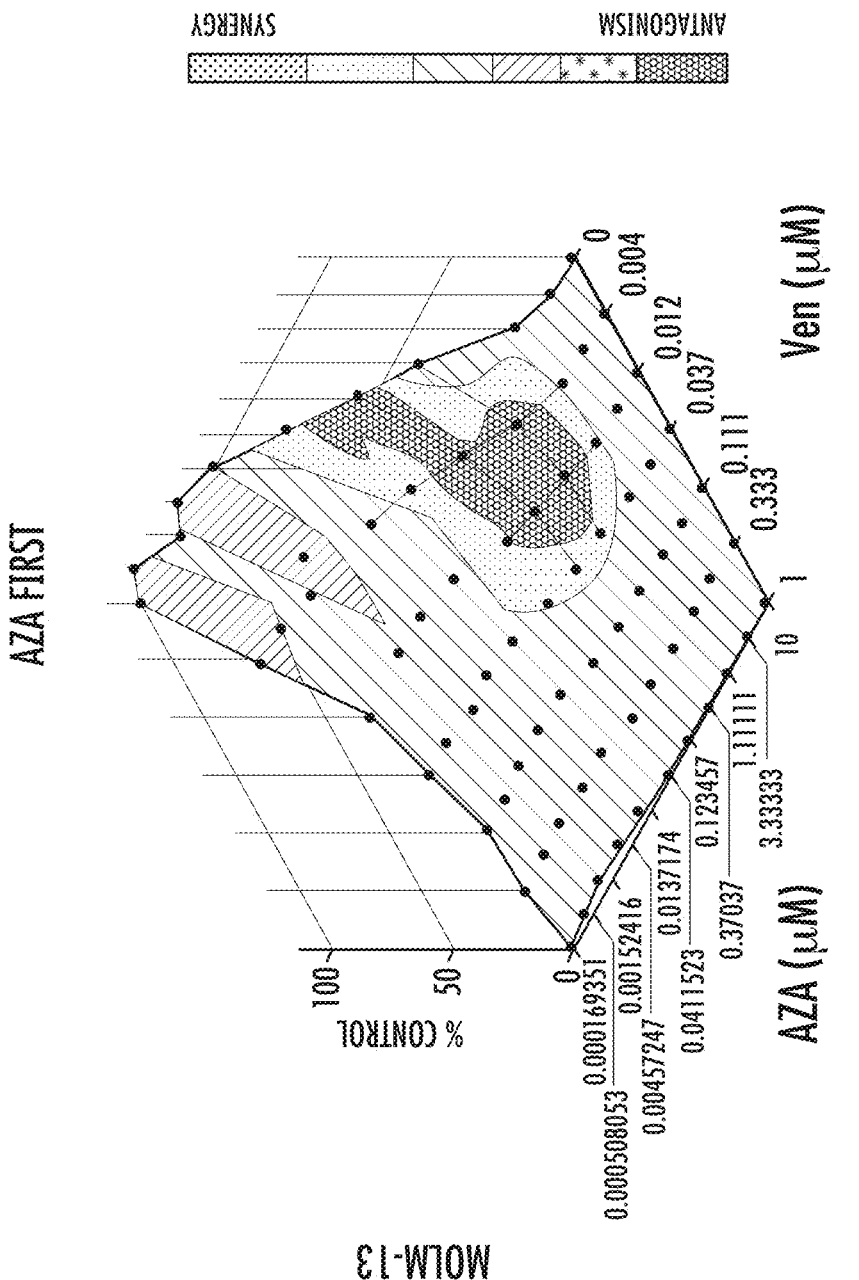
Figure 9E:
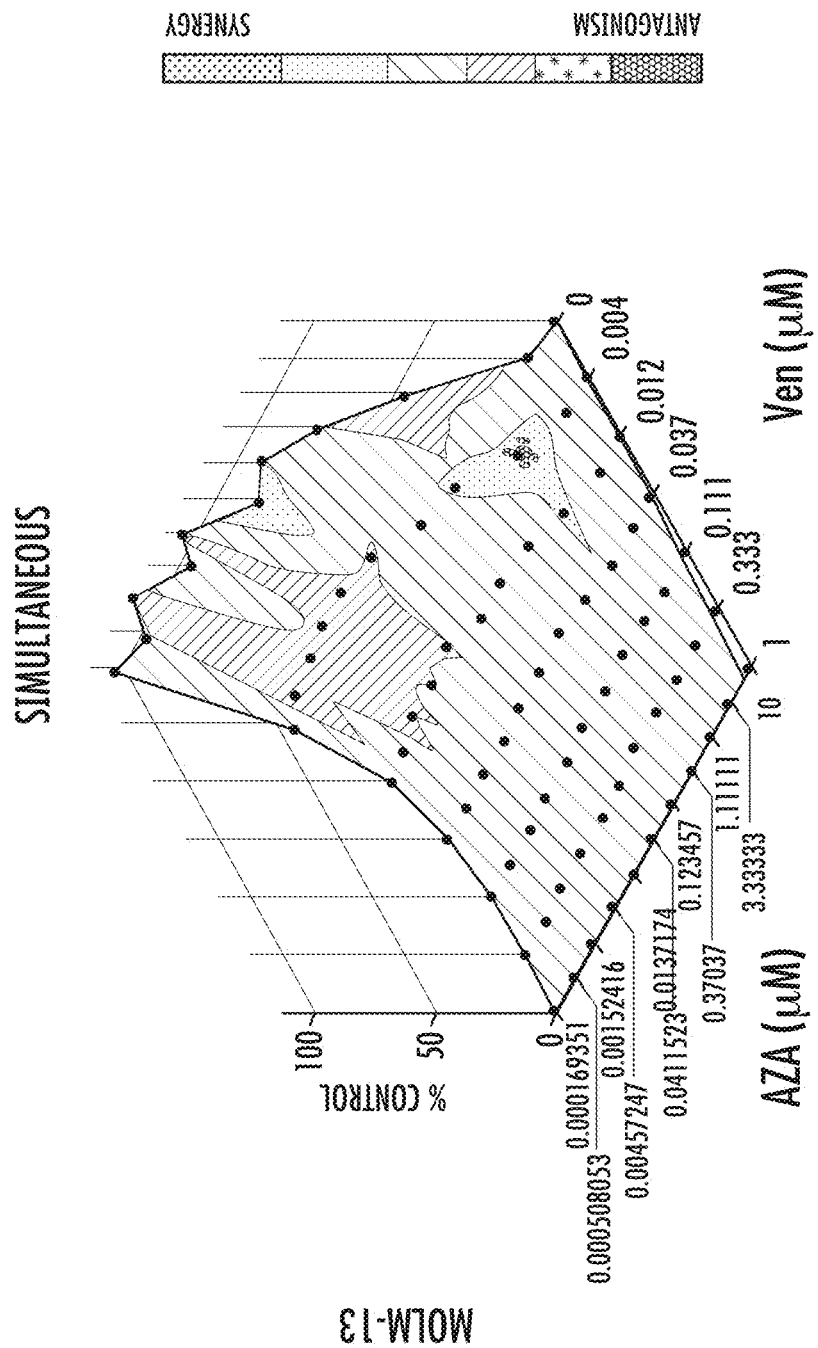
Figure 9F:
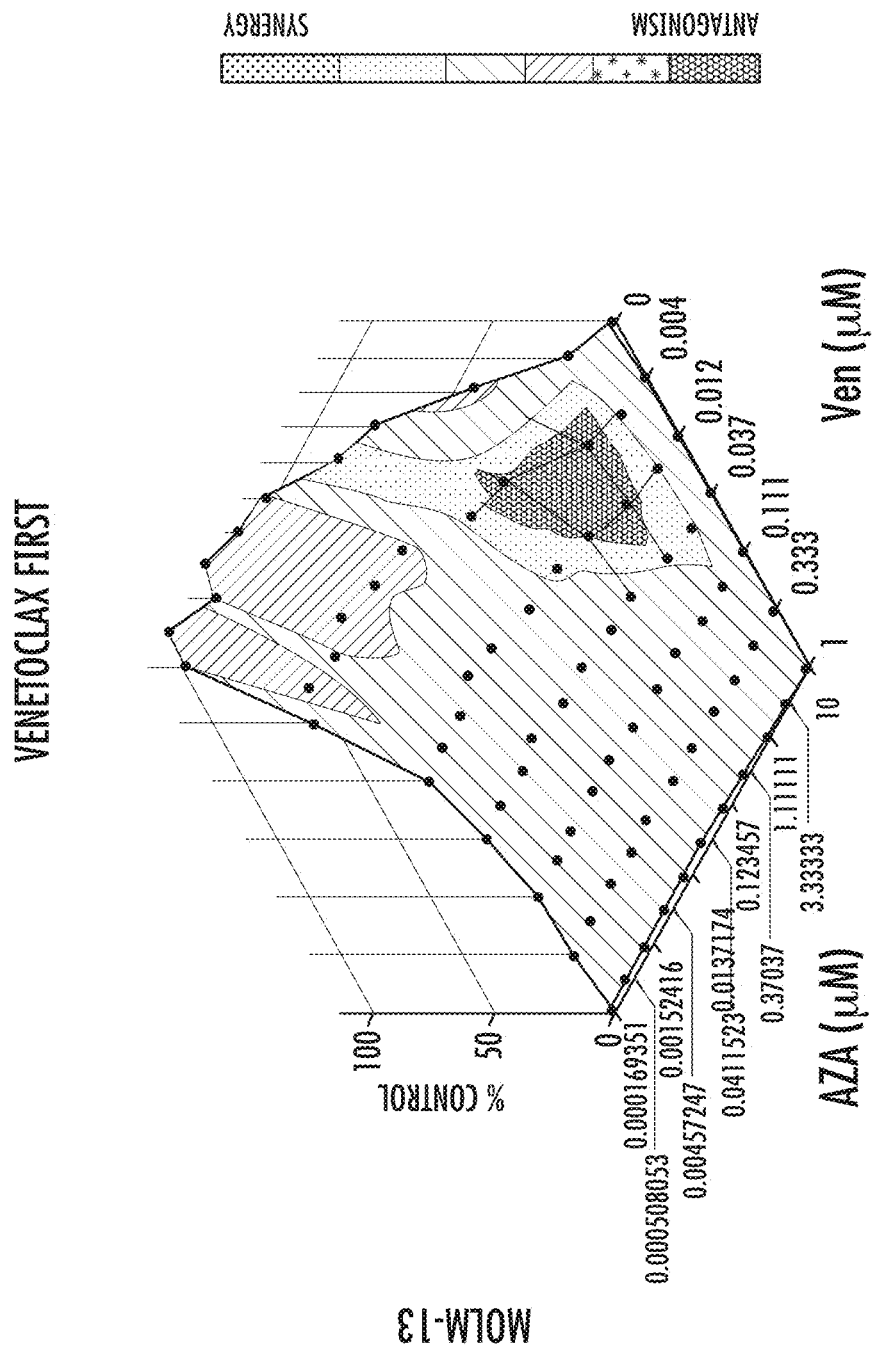

Whether the specific schedule of 5-azacytidine and venetoclax administration has an influence on the synergistic effect provided by 5-azacytidine and venetoclax was also investigated. FIGS. 9A-F show the cell survival of MV4-11 cells (FIGS. 9A-C) and MOLM-13 cells (FIGS. 9D-F) after the start of treatment with 5-azacytidine and venetoclax. The following schedules were tested: 5-azacytidine administration on Days 1, 2 and 3, followed by venetoclax administration on Day 4 (5-azacytidine (AZA) First) (FIGS. 9A and 9D); 5-azacytidine and venetoclax co-administration on Day 1, followed by 5-azacytidine administration on Days 2 and 3 (Simultaneous) (FIGS. 9B and 9E); and venetoclax administration on Day 1, followed by 5-azacytidine on Days 2, 3 and 4 (venetoclax first) (FIGS. 9C and 9F). As reflected by the synergy indexes (SI) shown, the results show that for both cell lines, the regimen where 5-azacytidine was administered first provided the maximal synergistic effects. These results suggest that 5-azacytidine that may prime AML cells for venetoclax activity.

One of the factors for venetoclax resistance is the expression of the apoptotic regulator MCL-1, which is upregulated in FLT3 mutated AML and is downregulated after 5-azacytidine treatment. To examine whether MCL-1 levels correlate with the degree of the synergistic effect of the 5-azacytidine-venetoclax combination, a panel of engineered BaF3 cell lines expressing either wild-type FLT3, FLT3-ITD or FLT3 (D835Y) mutations was examined. Engineered BaF3 cell lines also proliferated independently of IL-3. FIG. 10A shows that these engineered BaF3 cell lines were resistant to venetoclax ($EC_{50}$>1 µM), but sensitive to FLT3 inhibitors, such as gilteritinib, midostaurin and quizartinib. The data shown in FIG. 10A is also shown in Table 1, below.

TABLE 1

| | BaF3 cells expressing various FLT3 (EC50, nM) | | |
| --- | --- | --- | --- |
| | BaF-FLT3(WT) | BaF-FLT3-ITD | BaF-FLT3(D835Y) |
| AZA | 189 | 598 | 456 |
| Gilteritinib | 4 | 1.8 | 1.8 |
| Midostaurin | 23 | 5.5 | 5.4 |
| Quizartinib | 3 | 0.008 | 9.5 |
| Venetoclax | >10000 | >10000 | 4332 |

Figure 10B:
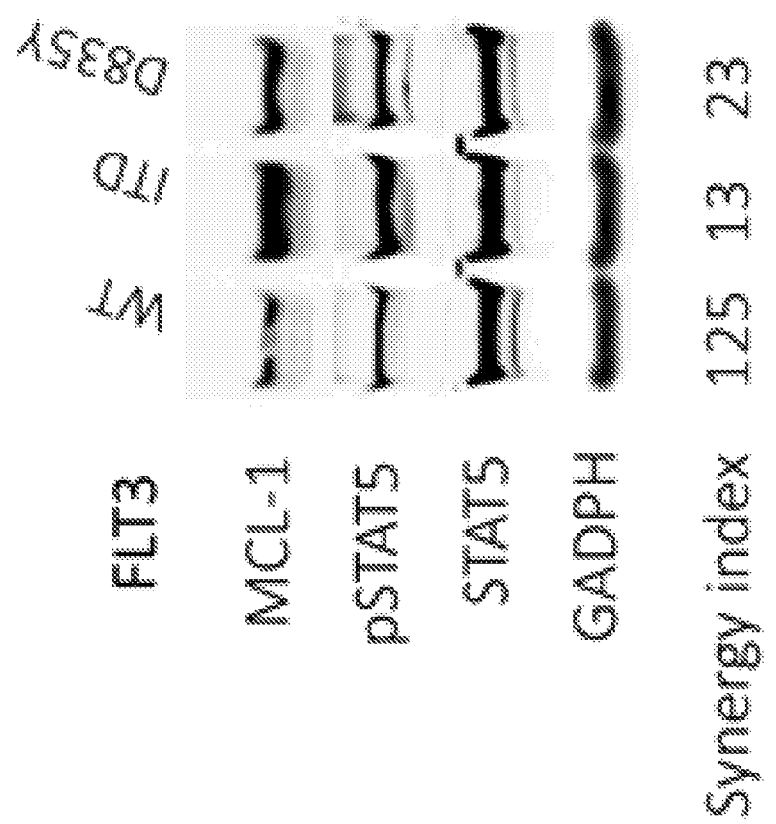
Figure 10C:
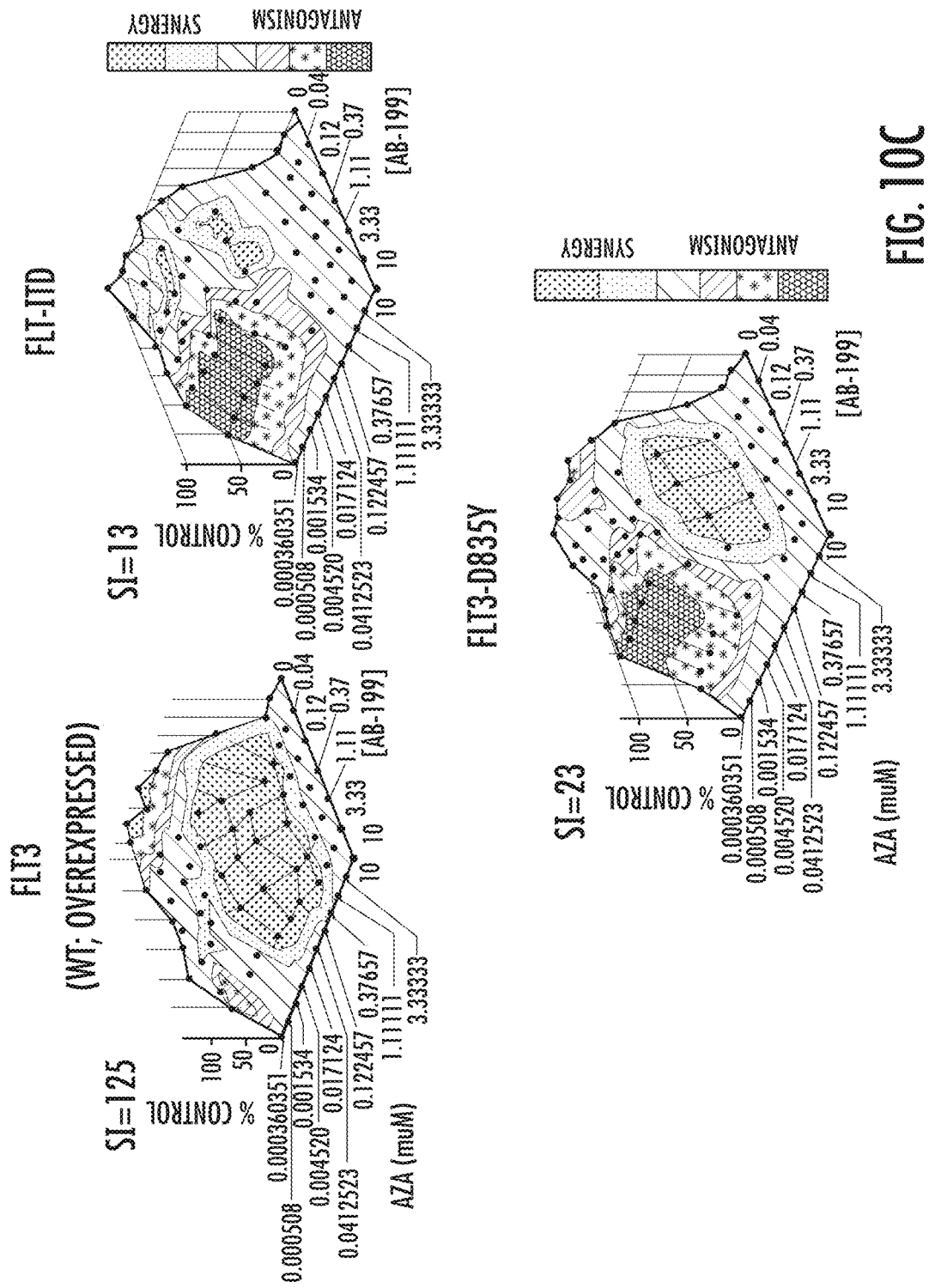

FIG. 10B shows that MCL-1 was detected in all lines, with the highest expression levels observed in the FLT-ITD mutant line, followed by FLT3 (D835Y). The combination of 5-azacytidine with venetoclax showed a synergistic effect, with the highest synergy index observed in FLT3 (wildtype), expressing the lowest levels of MCL-1, followed by FLT3 (D835Y) (intermediate MCL-1 levels) and FLT3-ITD (highest MCL-1) (FIG. 10C). These results suggests that MCL-1 expression may be a determinant factor for the 5-azacytidine-venetoclax synergy.

Figure 11:
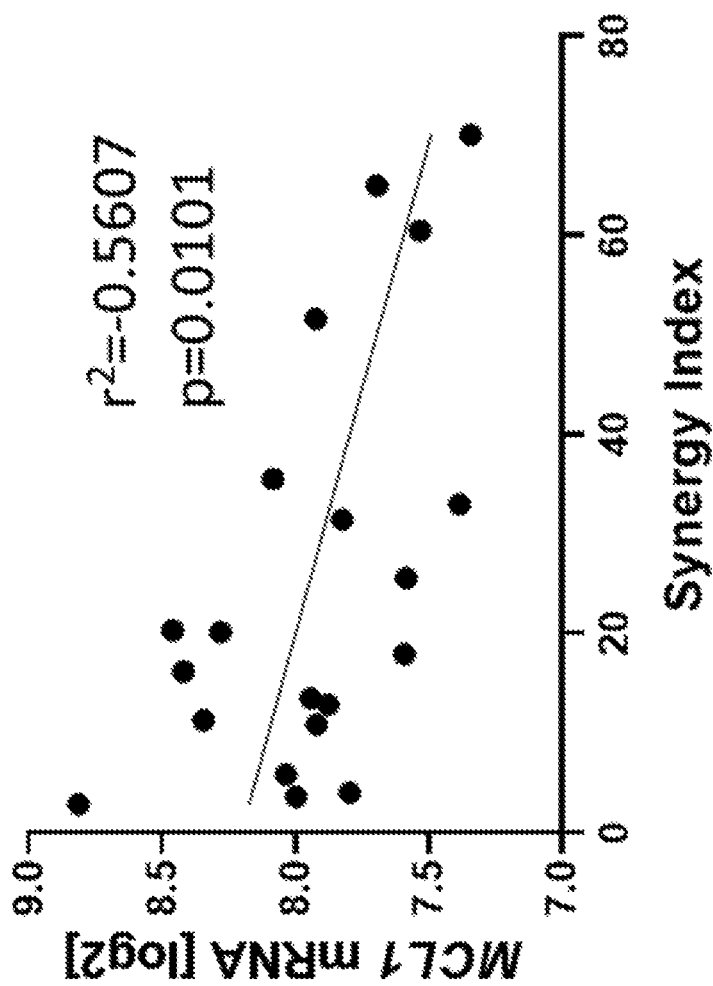
FIG. 11 depicts the correlation of MCL1 RNA level, as measured by RNASeq, with the synergy index ($r^2=-0.5607$, p=0.0101) in a panel of 20 AML cell lines.

To further explore the relationship between MCL-1 and 5-azacytidine-venetoclax synergy further, the relationship between MCL1 RNA levels and 5-azacytidine-venetoclax synergy indices was examined explored in a panel of 20 AML cell lines. FIG. 11 shows that MCL1 RNA levels correlated directly with the synergy index ($r^2=-0.5607$, $p=0.0101$) in a panel of 20 AML cell lines. These results show that MCL-1 may be a key regulator for AZA priming for venetoclax-induced apoptosis, specifically 5-azacytidine may lower MCL-1 below a certain threshold to allow venetoclax-mediated apoptosis.

Figures 12A, 12B, 12C, 12D:
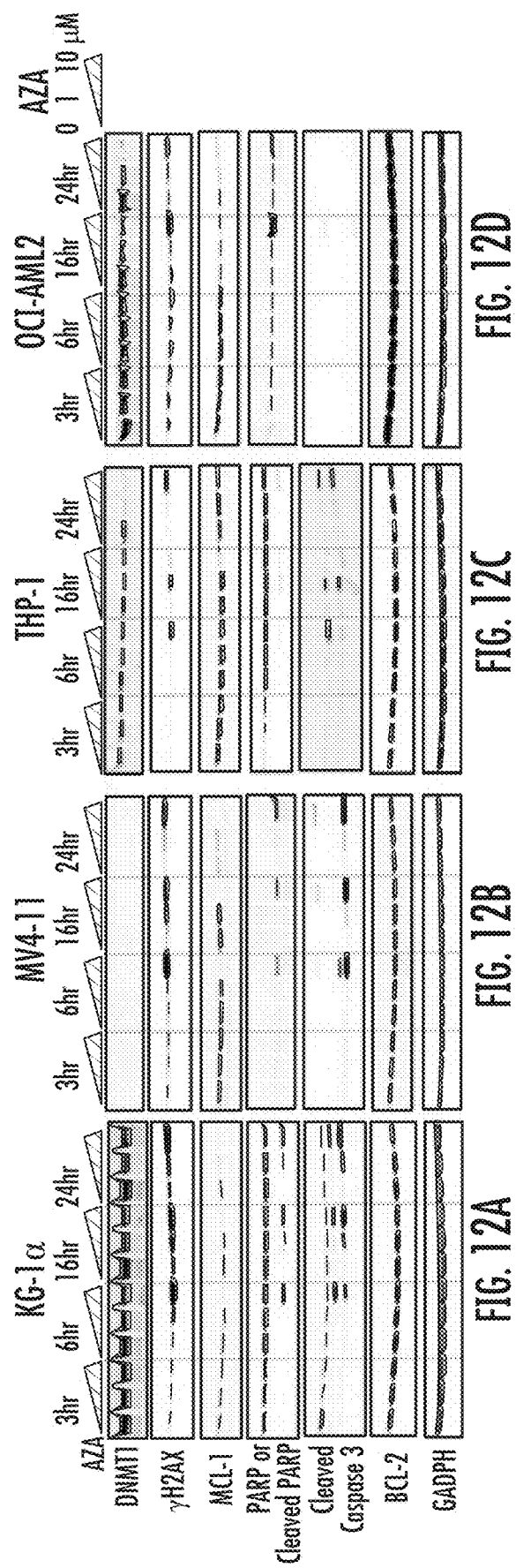
FIGS. 12A-H depict the extent of 5-azacytidine-mediated MCL-1 degradation in four different AML cell lines: KG1α (FIG. 12A), MV4-11 (FIG. 12B), THP-1 (FIG. 12C), and OCI-AML2 (FIG. 12D). The results showed 5-azacytidine-venetoclax synergistic activity with KG1α (FIG. 12E) and MV4-11 (FIG. 12F) cell lines (synergy index (SI) of 70 and 35.5, respectively) and very little or no synergistic activity with THP-1 (FIG. 12G) and OCI-AML-2 (FIG. 12H) cell lines (SI of 20.2 and 10.8, respectively). For the KG1α (FIG. 12A) and MV4-11 (FIG. 12B) cell lines, where 5-azacytidine-venetoclax had the greatest synergistic effect (FIGS. 12E and 12F), 5-azacytidine led to MCL-1 degradation the fastest, starting 6 hours after treatment. In contrast, for THP-1 (FIG. 12G), where 5-azacytidine-venetoclax only provided minor synergistic activity showed 5-azacytidine-mediated MCL-1 degradation later, starting at 16 hours, with incomplete degradation by 24 hours (FIG. 12C). For OCI-AML2 (FIG. 12D), where 5-azacytidine-venetoclax had the lowest synergistic effect (FIG. 12H), 5-azacytidine treatment did not lead to any degradation of MCL-1.
Figure 12E:
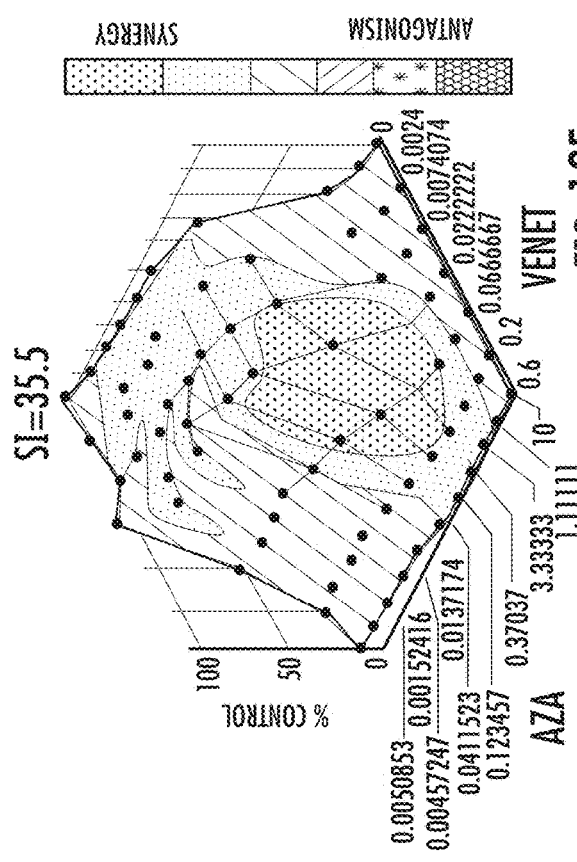
Figure 12F:
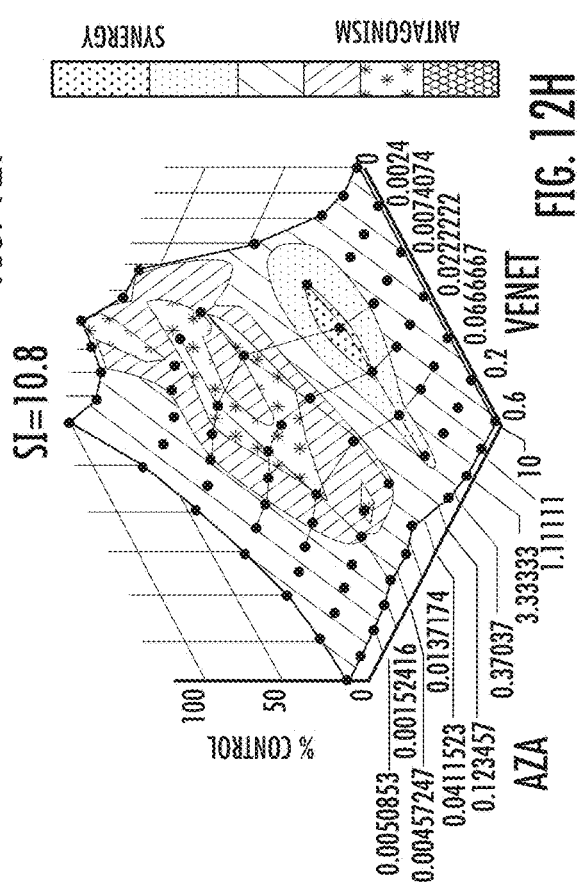
Figure 12G:
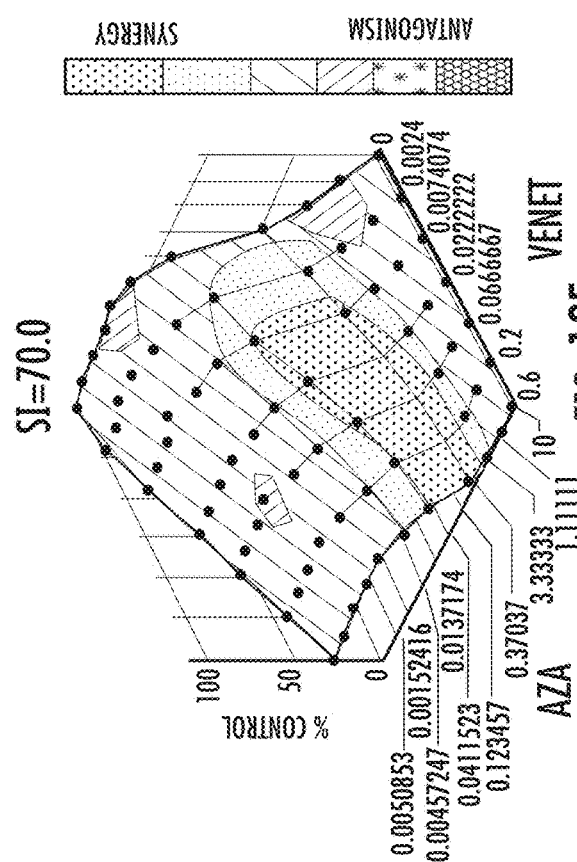
Figure 12H:
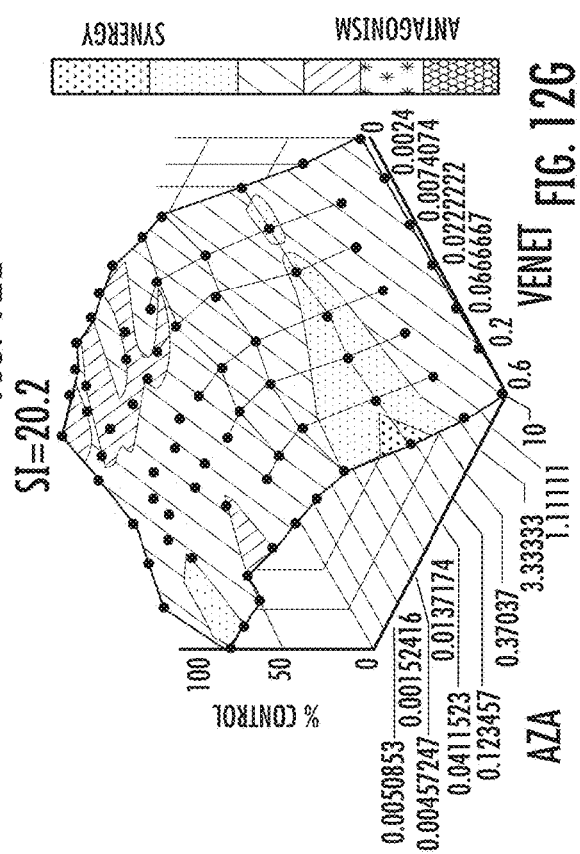

Next, the extent of 5-azacytidine-mediated MCL-1 degradation in four different AML cell lines was explored KG1α (FIG. 12A), MV4-11 (FIG. 12B), THP-1 (FIG. 12C) and OCI-AML-2 (FIG. 12D). The results showed 5-azacytidine-venetoclax synergistic activity with KG1α (FIG. 12E) and MV4-11 (FIG. 12F) cell lines (synergy index (SI) of 70 and 35.5, respectively) and very little or no synergistic activity with THP-1 (FIG. 12G) and OCI-AML-2 (FIG. 12H) cell lines (SI of 20.2 and 10.8, respectively). For the KG1α (FIG. 12A) and MV4-11 (FIG. 12B) cell lines, where 5-azacytidine-venetoclax had the greatest synergistic effect (FIGS. 12E and 12F), 5-azacytidine led to MCL-1 degradation the fastest, starting 6 hours after treatment. In contrast, for THP-1 (FIG. 12C), where 5-azacytidine-venetoclax only provided minor synergistic activity showed 5-azacytidine-mediated MCL-1 degradation later, starting at 16 hours, with incomplete degradation by 24 hours (FIG. 12G). For OCI-AML2 (FIG. 12D), where 5-azacytidine-venetoclax the lowest synergistic effect (FIG. 12H), 5-azacytidine treatment did not lead to any degradation of MCL-1. These results support the hypothesis that 5-azacytidine primes cells for venetoclax-mediated apoptosis by lowering MCL-1 levels.

Figure 13:
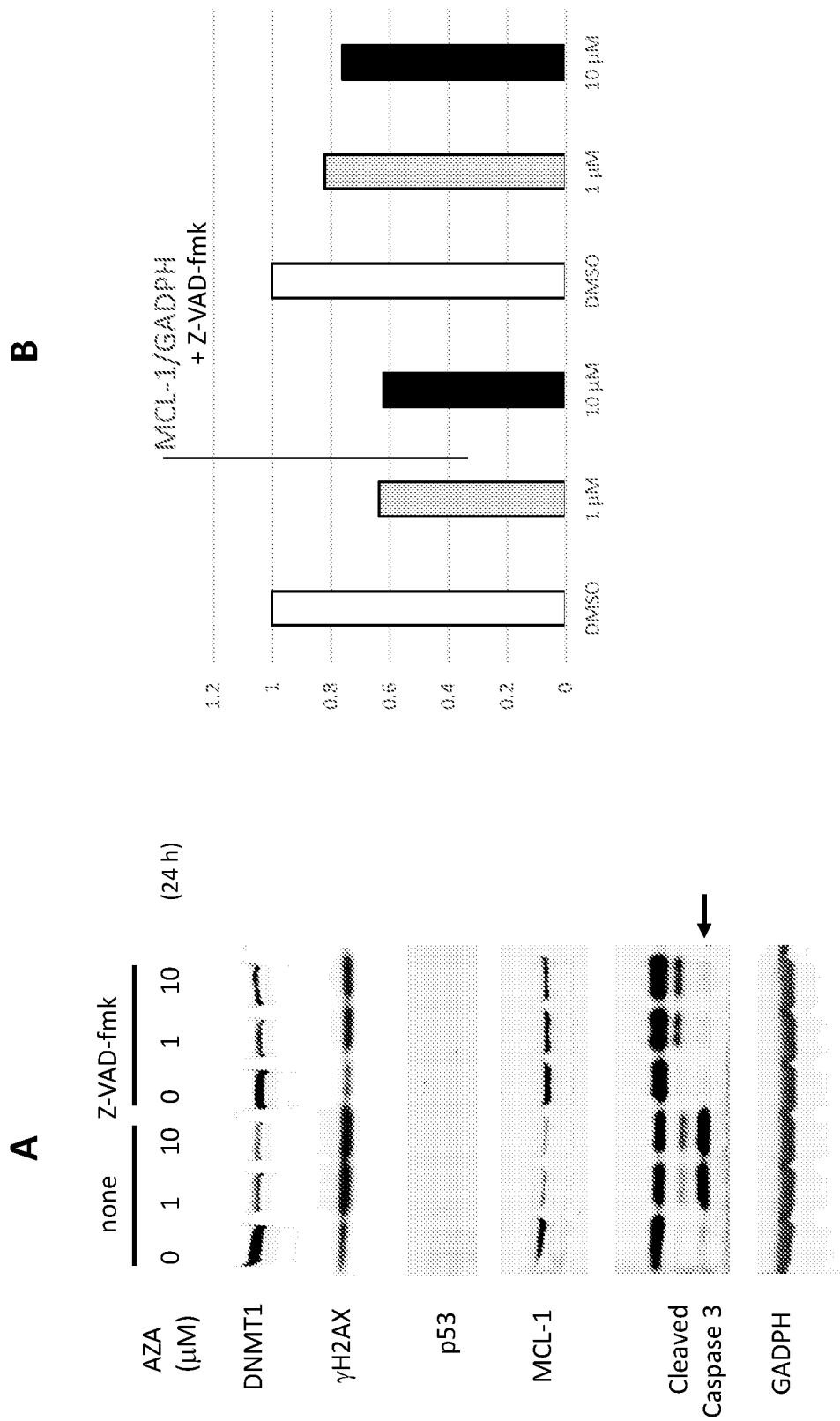
FIG. 13A depicts a western blot evaluating the degradation of caspase 3. Cells were treated with Z-VAD-FMK, a pan-caspase inhibitor, and the extent of MCL-1 degradation by 5-azacytidine was measured.
FIG. 13B shows a bar graph of MCL-1 degradation by 5-azacytidine, where cells were treated with 20 µM Z-VAD-FMK for 1 hour before 5-azacytidine treatment for another 16 hours. Caspase inhibition partially ablated MCL-1 degradation by 5-azacytidine in MV4-11 cells, which suggested additional, caspase-independent mechanisms of MCL-1 degradation.

One possible mechanism by which 5-azacytidine downregulates MCL-1 is by inducing caspase activation. Caspase activation can be assayed by evaluating the degradation of caspase 3 in a western blot (FIG. 13A). To find out whether this effect is caspase-dependent, the cells were treated with Z-VAD-FMK, a pan-caspase inhibitor, and the extent of MCL-1 degradation by 5-azacytidine was measured (FIG. 13B). In particular, FIG. 13B shows a bar graph of MCL-1 degradation by 5-azacytidine, where cells were treated with 20 μM Z-VAD-FMK for 1 hours before 5-azacytidine treatment for another 16 hours. Caspase inhibition partially ablated MCL-1 degradation by 5-azacytidine in MV4-11 cells, suggesting additional, caspase-independent mechanisms of MCL-1 degradation. It was found that Z-VAD-FMK partially ablated the ability of 5-azacytidine to degrade MCL-1, suggesting this process is mediated by caspase-dependent and independent mechanisms.

Figures 14A, 14B:
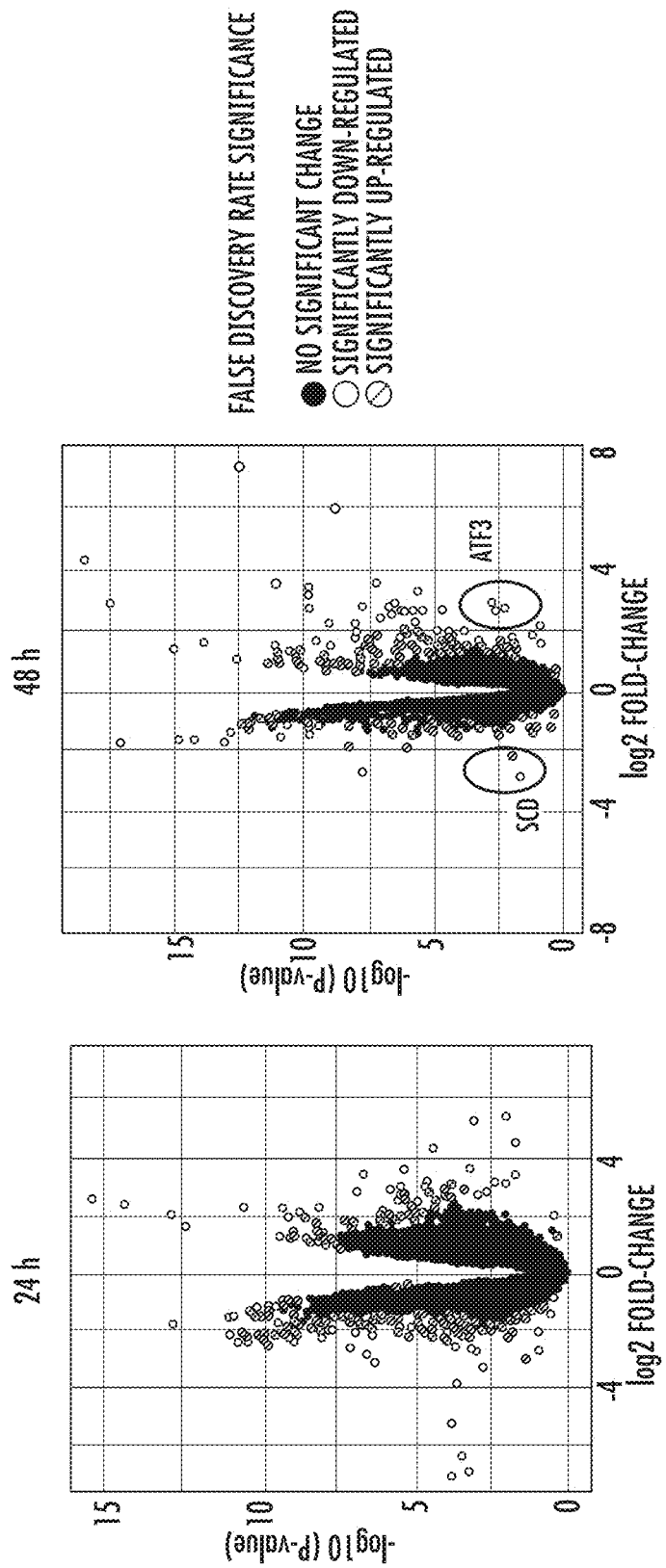
FIGS. 14A and B depict the results of an RNAseq performed on MV4-11 cells treated with PBS (vehicle), 1 µM 5-azacytidine for 24 hours (FIG. 14A), or with 1 µM 5-azacytidine for 48 hours (FIG. 14B).

To further understand how 5-azacytidine primes venetoclax for acute apoptosis, RNAseq was performed on MV4-11 cells treated with PBS (vehicle), 1 μM AZA for 24 hours (FIG. 14A), or with 1 μM AZA for 48 hours (FIG. 14B). Table 2 is the pathway analysis for RNASeq data in FIG. 14A and shows the analysis after 5-azacytidine treatment, which was the categorization of genes that were significantly induced or repressed by 5-azacytidine based on KEGG pathways.

TABLE 2

Significant Kegg pathways at 24 h (none significant at 48 h)

| Pathway | Mean logFC | p-value | Adjusted p value |
| --- | --- | --- | --- |
| Ribosome | −10.50 | 10.49547 | 5.44E−21 |
| Oxidative phosphorylation | −7.32 | 7.315598 | 2.01E−12 |
| Metabolic pathways | −5.79 | 5.788892 | 4.06E−09 |
| Cell cycle | −5.75 | 5.746475 | 1.43E−08 |
| Protein processing in endoplasmic reticulation | −4.96 | 4.958095 | 6.26E−07 |
| DNA replication | −4.45 | 4.450573 | 1.83E−05 |
| Proteasome | −4.41 | 4.410196 | 2.17E−05 |
| Phagosome | −4.13 | 4.134259 | 2.49E−05 |
| Spliceasome | −4.10 | 4.100521 | 2.90E−05 |
| Necroptosis | −3.78 | 3.779974 | 9.92E−05 |
| Fatty acid metabolism | −3.43 | 3.425249 | 4.51E−04 |
| Antigen processing and presentation | −3.39 | 3.393502 | 5.03E−04 |
| Carbon metabolism | −3.35 | 3.354515 | 4.75E−04 |
| Biosynthesis of unsaturated fatty acids | −3.26 | 3.260586 | 1.11E−03 |
| Protein export | −3.19 | 3.191372 | 1.46E−03 |
| RNA transport | −3.08 | 3.081532 | 1.15E−03 |
| Mismatch repair | −2.98 | 2.975621 | 2.43E−03 |
| Fatty acid elongation | −2.87 | 2.867612 | 3.26E−03 |
| Lysasome | −2.82 | 2.816473 | 2.65E−03 |
| Cellular senescence | −2.69 | 2.691944 | 3.78E−03 |
| Cardiac muscle contraction | −2.61 | 2.614268 | 5.21E−03 |
| Terpenoid backbone biosynthesis | −2.48 | 2.481832 | 9.05E−03 |
| Regulation of actin cytoskeleton | −2.46 | 2.456262 | 7.30E−03 |
| Taste transduction | −2.44 | 2.436918 | 8.81E−03 |
| p53 signaling pathway | −2.42 | 2.419681 | 8.46E−03 |

No significant differences were observed in KEGG pathways regulated by 5-azacytidine after 48 hours of treatment. However, the top KEGG pathways differentially regulated after 24 hours of 5-azacytidine treatment were "Ribosome", "Oxidative Phosphorylation", "Metabolic Pathways", and "Cell Cycle". These results support the hypothesis that 5-azacytidine has a role in altering cell metabolism, causing cell cycle arrest, suppressing oxidative phosphorylation, which was previously observed in patients treated with 5-azacytidine+venetoclax combination.

Volcano plots of significantly modified genes at 24 hours (FIG. 14A) and 48 hours (FIG. 14B) show 5-azacytidine induced 133 differentially expressed genes at 24 hours and 226 differentially expressed genes at 48 hours. Upon further analysis of the 5-azacytidine-induced differentially expressed genes, two genes were identified that have previously been shown to regulate MCL1 expression: activating transcription factor 3 (ATF3) and stearoyl-CoA desaturase (SCD). ATF3 is a stress responsive transcription factor that was shown to regulate MCL-1, as well as immune and metabolic genes. ATF3 expression was increased two-fold 48 hours after 5-azacytidine treatment. On the other hand, the expression of SCD, a regulator of lipid metabolism and MCL1, was decreased 2.5-fold by 5-azacytidine treatment at 48 hours. Alterations in ATF3 (FIG. 14C) and SCD (FIG. 14D) expression were validated in a separate experiment using real-time PCR. ATF3 expression was increased in a time- and concentration-dependent manner, as 0.3 μM 5-azacytidine treatment was not sufficient to induce ATF3 expression at either 24 or 48 hours (FIG. 14C). Similarly, SCD expression was decreased rapidly within 24 hours when treated with 3 μM 5-azacytidine, although it was not affected by low concentrations of 5-azacytidine at this timepoint (FIG. 14D).

Figure 15A:
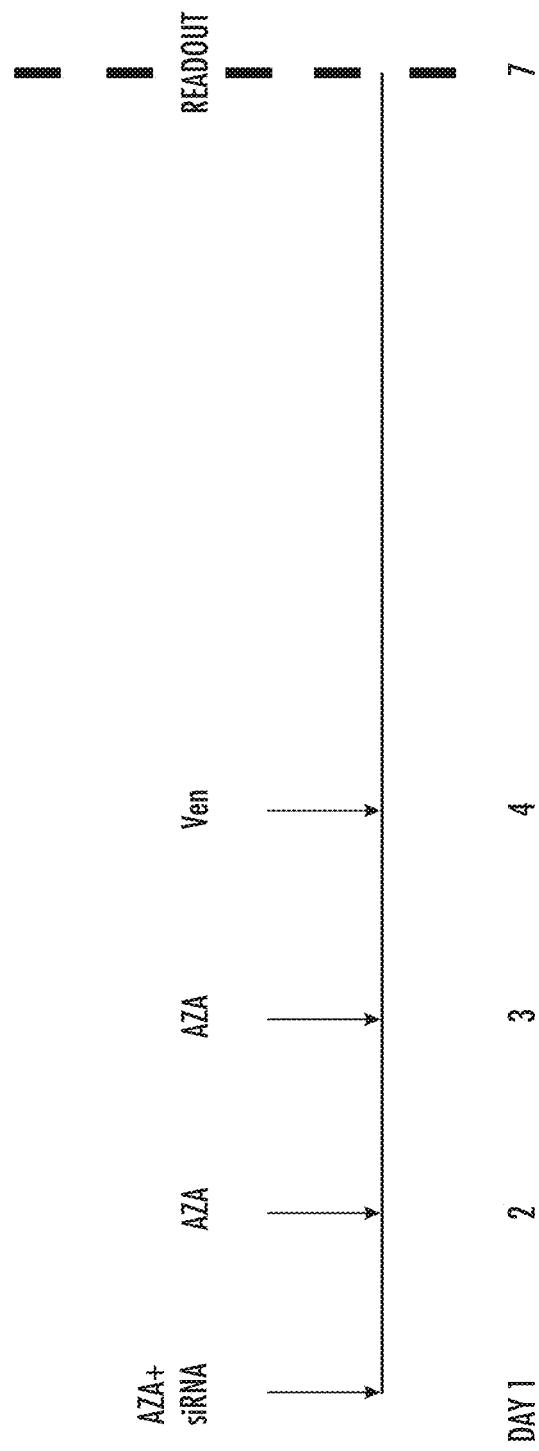
FIGS. 15A-C shows the results of siRNA knockdown of ATF3 and/or SCD genes in MV4-11 cells to assess their function in synergy. MV4-11 cells were left untransfected or transfected with ATF3, SCD, or control (scrambled) siRNA. As a control, cells were transfected with siRNA and collected for RNA and qPCR 72 hours after transfection (FIG. 15A). In cells treated with scramble siRNA, no changes in ATF3 (FIG. 15B) or SCD (FIG. 15C) expression were seen. Following transfection, cells were treated with various concentrations of 5-azacytidine daily for Days 1-3. At Day 4, cells were dosed with venetoclax, followed by cell viability test using CellTiter-Glo® 7 after treatment initiation. 5-azacytidine-venetoclax synergy was calculated using Combenefit and Highest Single Agent analysis (FIG. 15D-G).
Figure 15C:
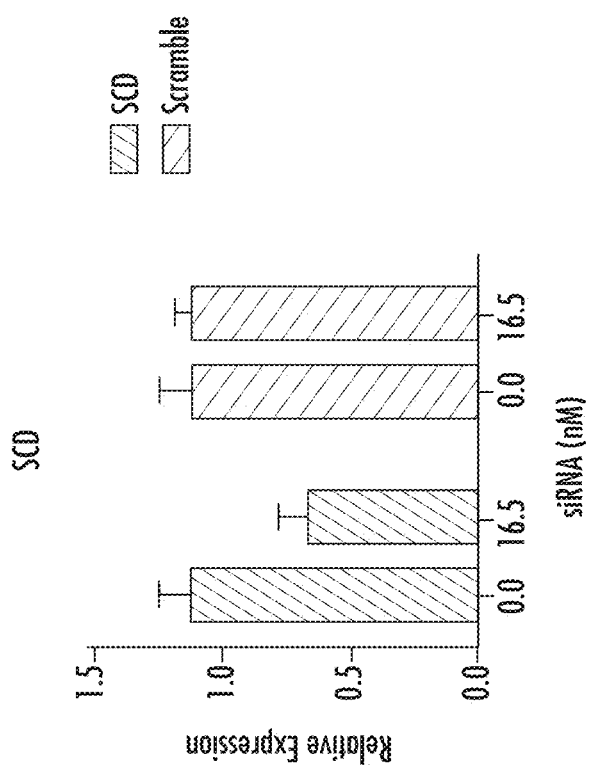
Figure 15B:
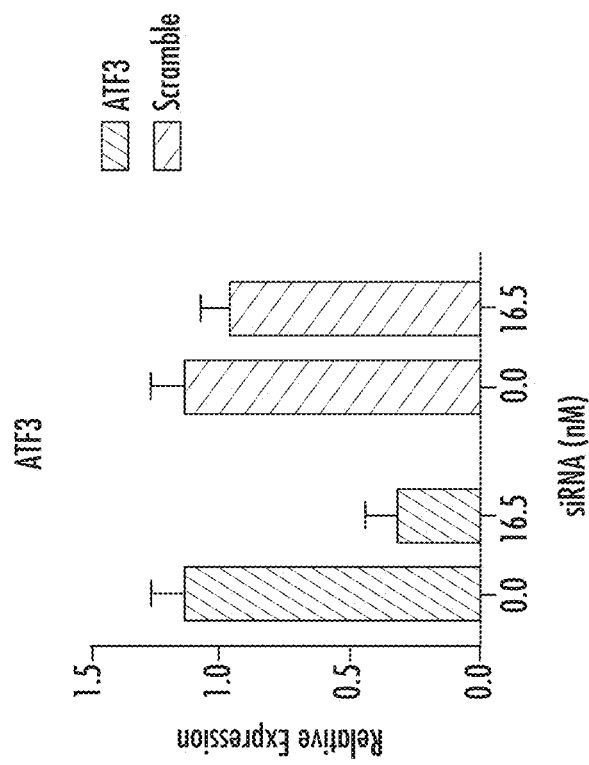
Figures 15D, 15E:
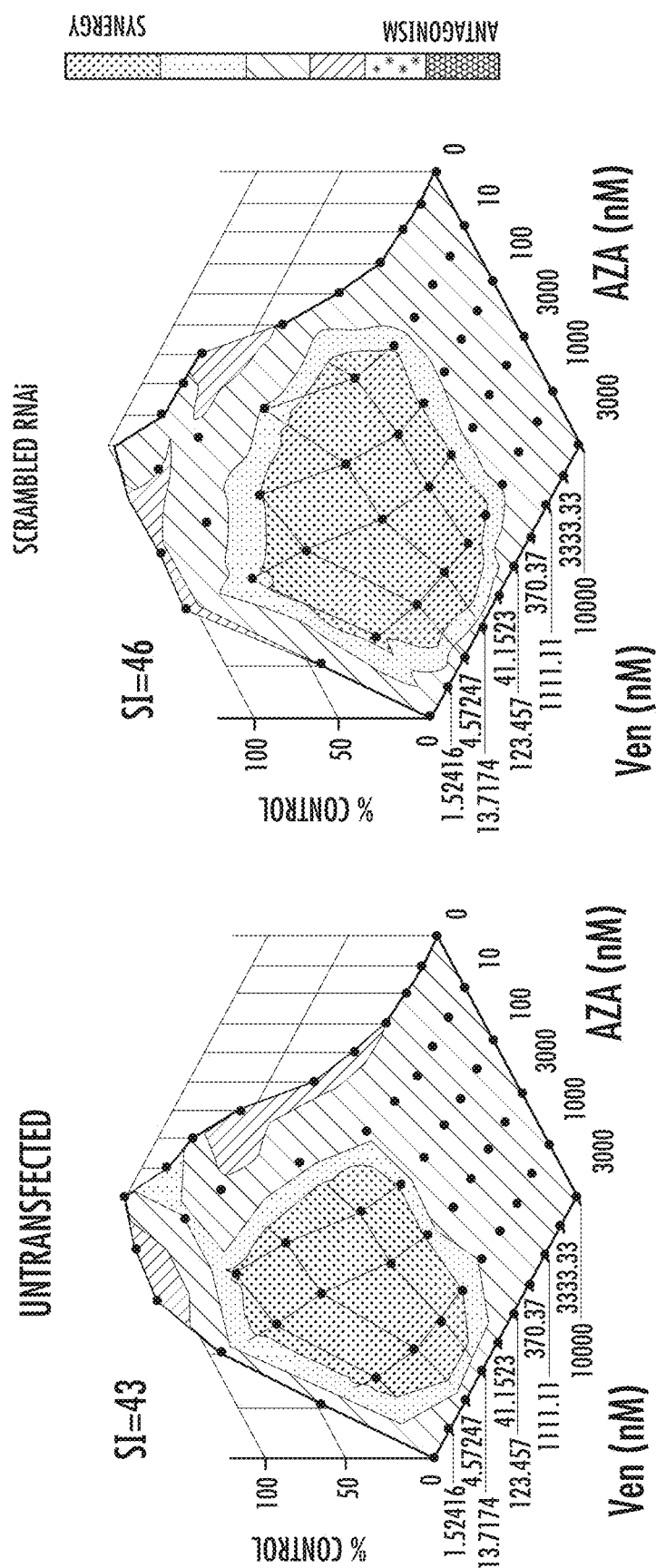
FIG. 15D=untransfected cells.
FIG. 15E=scrambled RNAi.

Given their connection with regulating MCL1 expression, it was hypothesized that ATF3 and/or SCD may contribute to 5-azacytidine-venetoclax synergy. To explore this further, siRNA knockdown of these genes was utilized in MV4-11 cells to assess their function in synergy. MV4-11 cells were left untransfected or transfected with ATF3, SCD, or control (scrambled) siRNA. As a control, cells were transfected with siRNA and collected for RNA and qPCR 72 hours after transfection. (FIG. 15A) This confirmed that siRNA knockdown decreased, but did not completely ablate, mRNA expression of ATF3 or SCD when cells were transfected with ATF3 or SCD siRNA, respectively. Furthermore, in cells treated with scramble siRNA, no changes in ATF3 (FIG. 15B) or SCD (FIG. 15C) expression were seen. Following transfection, cells were treated with various concentrations of 5-azacytidine daily for Days 1-3. At Day 4, cells were dosed with venetoclax, followed by cell viability test using CellTiter-Glo® 7 after treatment initiation. 5-Azacytidine-venetoclax synergy was calculated using Combenefit and Highest Single Agent analysis (FIGS. 15D-G). 5-Azacytidine-venetoclax synergy was confirmed in cells that were not transfected (Synergy Index=43) (FIG. 15D), and the synergy was not affected by transfection itself, as cells transfected with scramble siRNA (FIG. 15E) had a synergy index of 46. When ATF3 was knocked down (FIG. 15F), 5-azacytidine-venetoclax had decreased synergy (Synergy Index=19). On the other hand, when SCD was knocked down (FIG. 15G), 5-azacytidine-venetoclax had increased synergy (Synergy Index=60). This data suggests that 5-azacytidine-induced increases in ATF3 and decreases in SCD play at least a partial role in 5-azacytidine-venetoclax synergy.

Figure 16A:
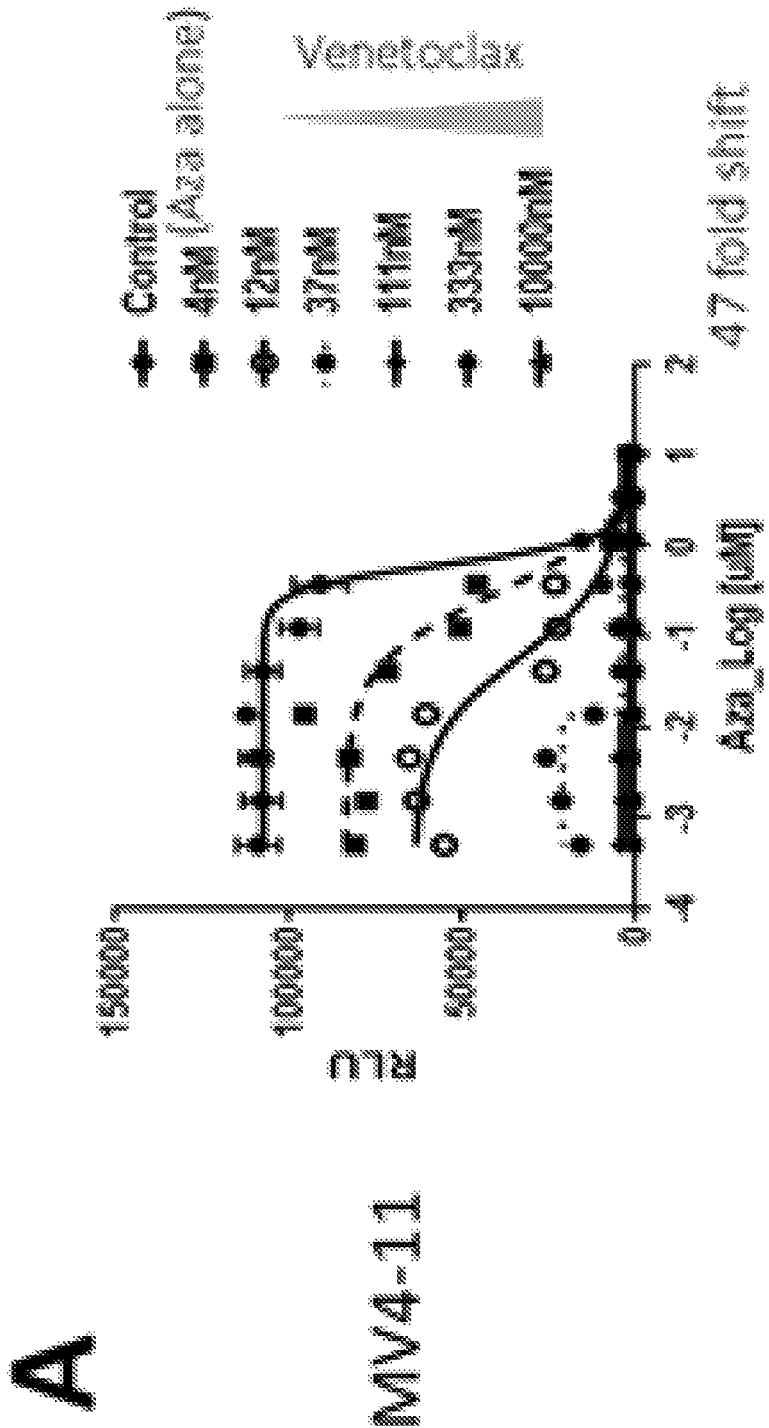
FIGS. 16A, 16B, 16C, 16D, 16E, and 16F depict the results of an evaluation as to whether 5-azacytidine and venetoclax have synergistic activity in vivo at doses and schedules corresponding to injectable 5-azacytidine (HELD) or oral 5-azacytidine (LEED). MV4-11 (FIGS. 16A-C) and MOLM-13 (FIGS. 16D-F), two cell lines that showed 5-azacytidine-venetoclax synergy, were to used to generate disseminated AML xenograft mice in immunodeficient animals. In vitro, venetoclax sensitized both cell lines to venetoclax (FIGS. 16A and 16D) and synergized with 5-azacytidine (FIGS. 16B and 16E). To model oral 5-azacytidine (LEED) regimens, mice were treated with 1 mg/kg 5-azacytidine for 15 days (low exposure, extended duration). Alternatively, to use the same cumulative dose but with an injectable 5-azacytidine (HELD) regimen, mice were treated with 3 mg/ml 5-azacytidine for 5 days (high exposure, limited duration).
Figure 16B:
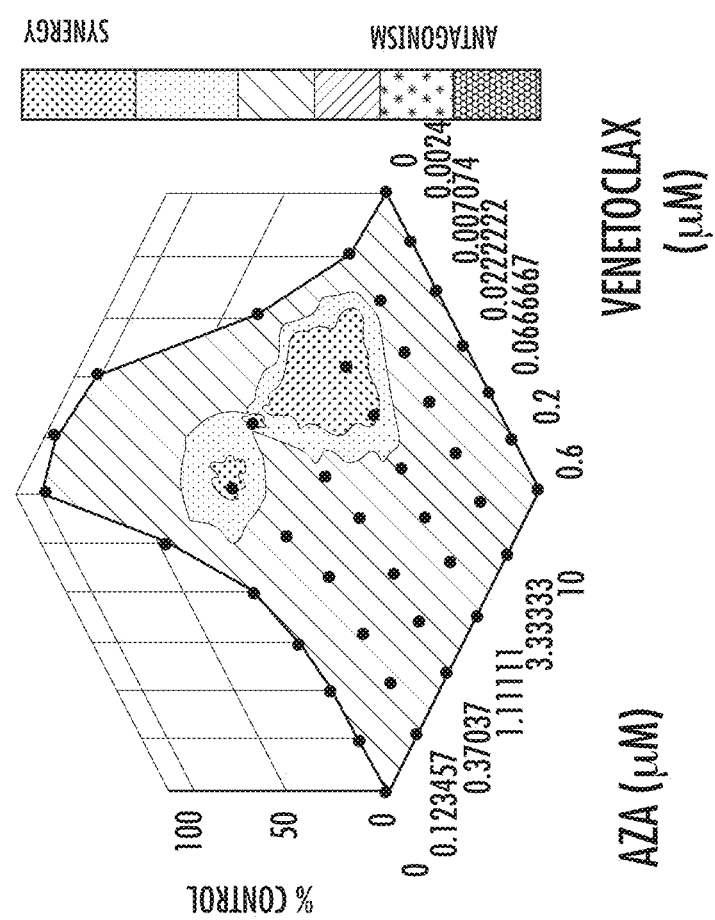
Figure 16C:
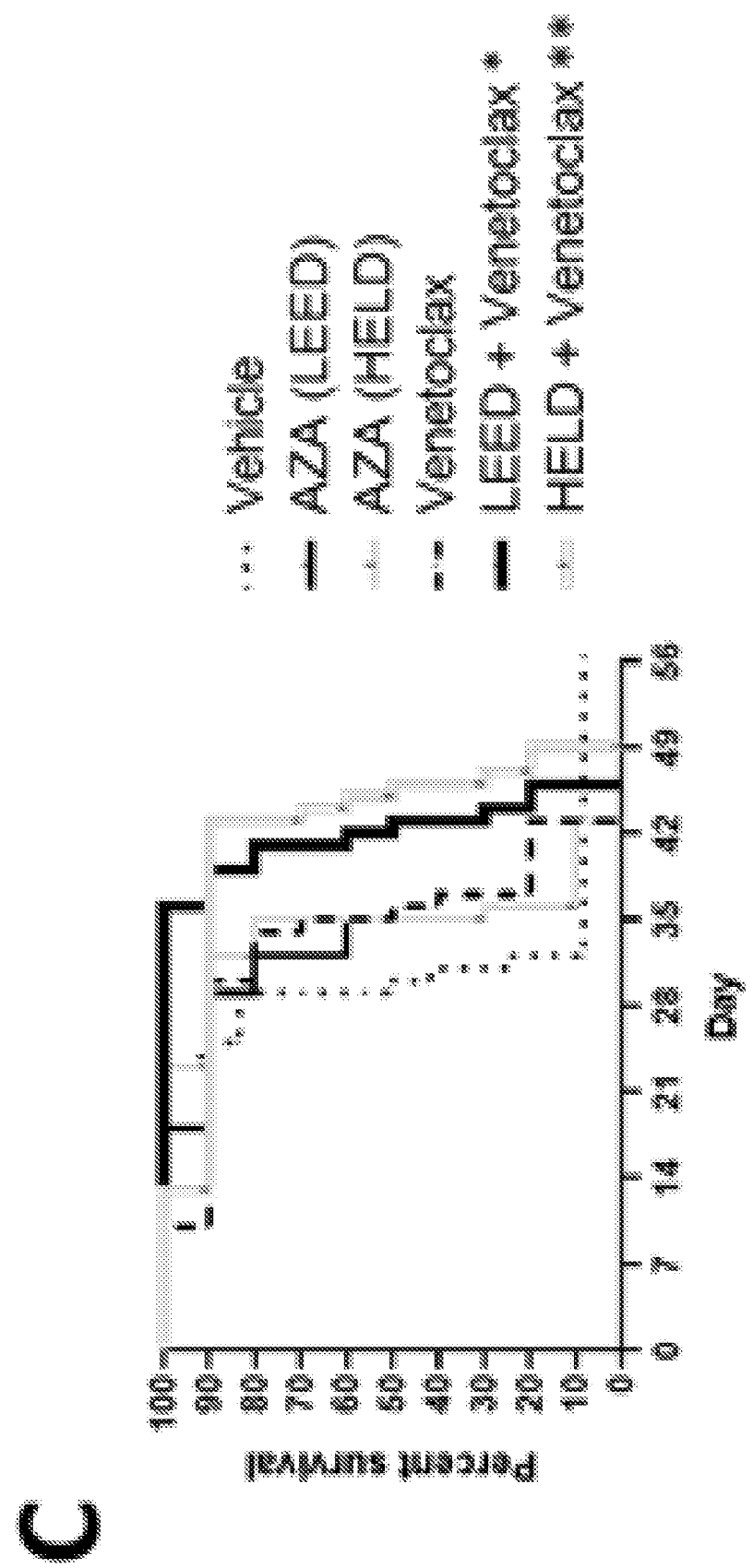
Figure 16D:
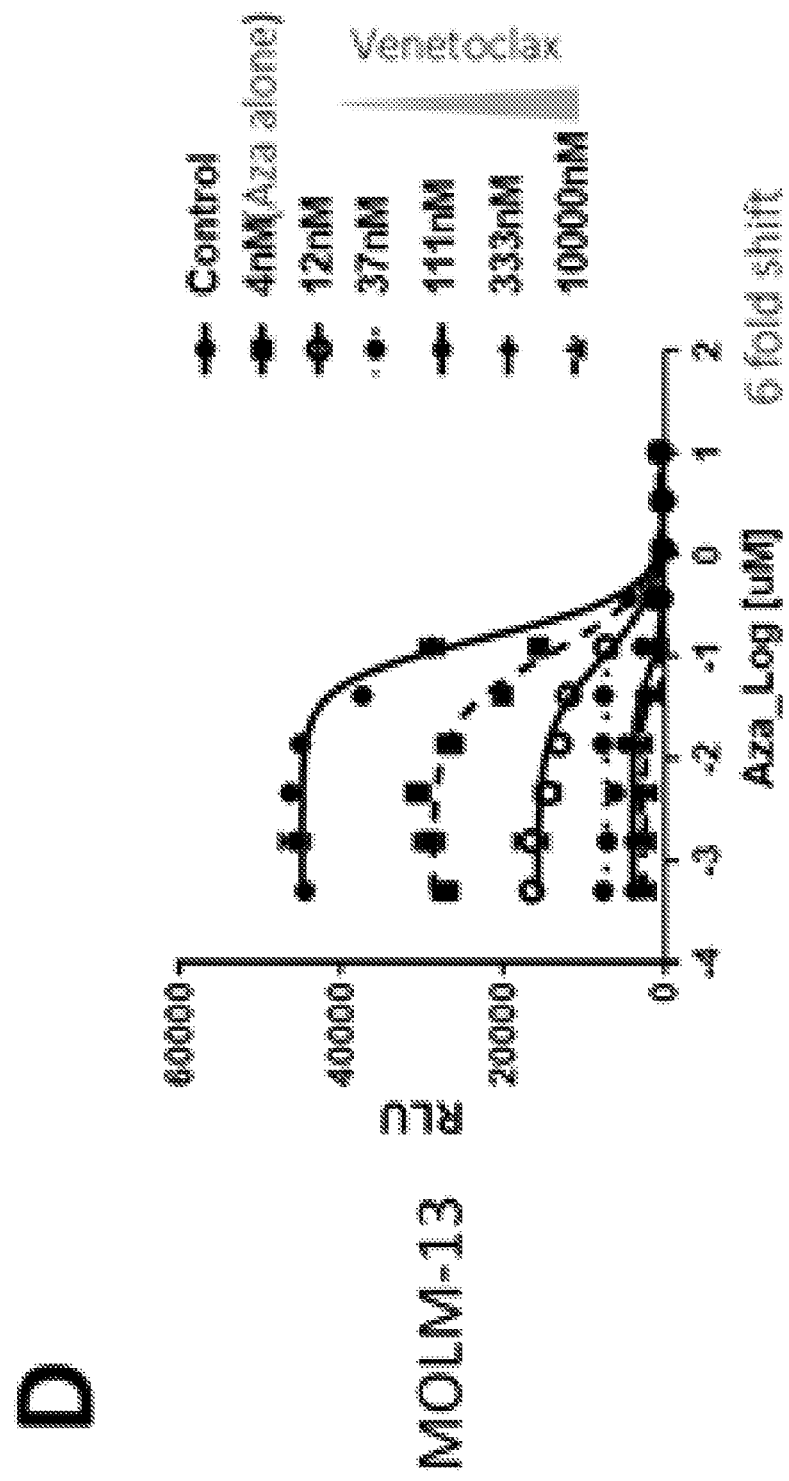
Figure 16E:
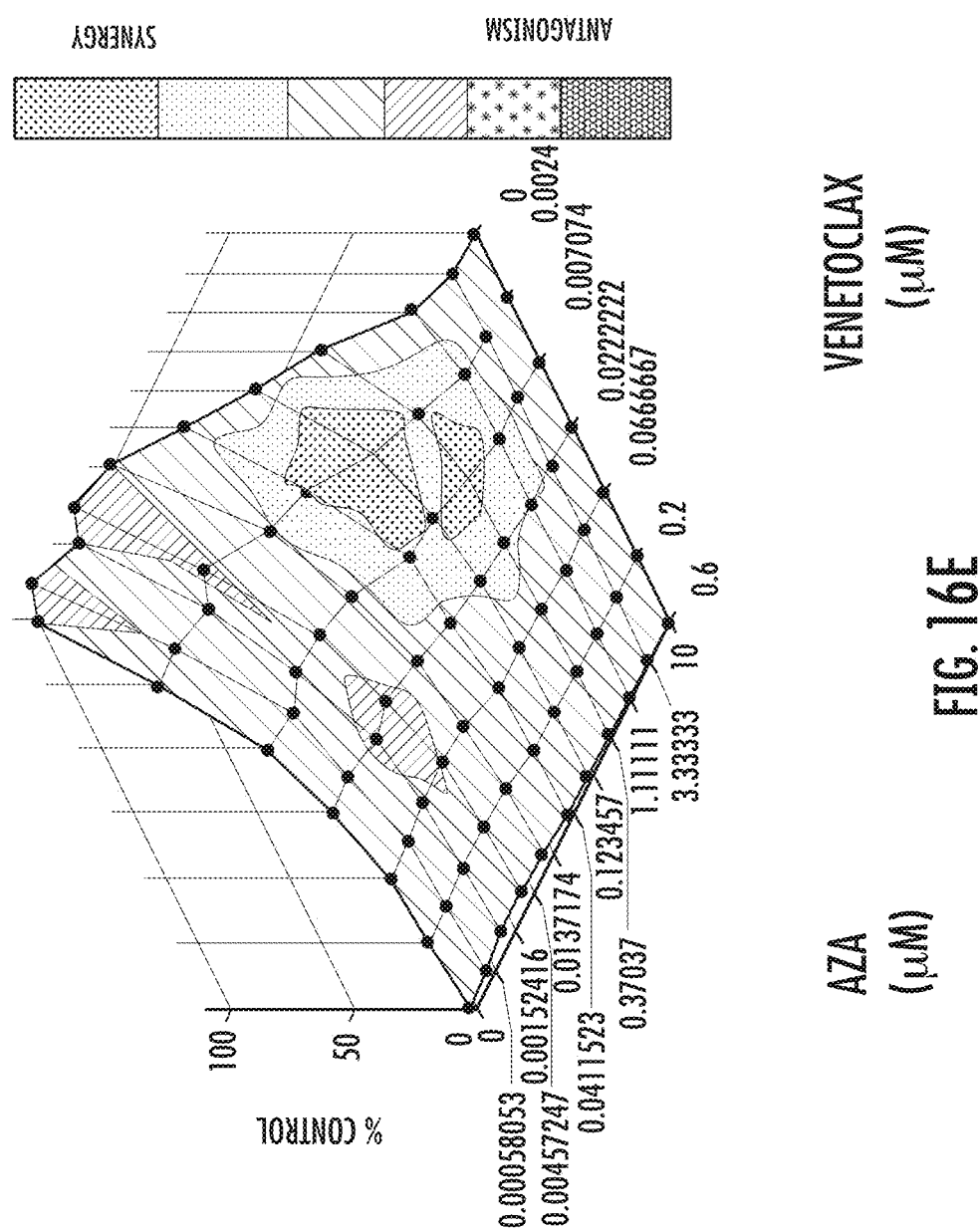

Whether 5-azacytidine and venetoclax have synergistic activity in vivo at doses and schedules corresponding to injectable 5-azacytidine (HELD) or oral 5-azacytidine (LEED) was next evaluated. MV4-11 (FIG. 16A-C) and MOLM-13 (FIGS. 16D-F), two cell lines that showed 5-azacytidine-venetoclax synergy (FIG. 8C), were used to generate disseminated AML xenograft mice in immunodeficient animals. In vitro, venetoclax sensitized both cell lines to venetoclax (FIGS. 16A and 16D) and synergized with 5-azacytidine (FIGS. 16B and 16E). To model oral 5-azacytidine (LEED) regimes, mice were treated with 1 mg/kg 5-azacytidine for 15 days (low exposure, extended duration). Alternatively, to use the same cumulative dose but with an injectable 5-azacytidine (HELD) regime, mice were treated with 3 mg/ml 5-azacytidine for 5 days (high exposure, limited duration).

For MV4-11 implantation, female NCG mice were injected via tail vein with $1 \times 10^7$ cells in 0.2 mL cell suspension. Day 1 was designated as fourteen days after implantation. On Day 1, mice were sorted into treatment groups based on body weight and dosing was initiated as follows: mice treated with vehicle, high dose 5-azacytidine (HELD, 3 mg/kg once daily for five days (qd×5)), low dose 5-azacytidine (LEED, 1 mg/kg once daily for five days, three times (qd×5×3)), venetoclax (100 mg/kg, qd×21), HELD+venetoclax, or LEED+venetoclax. Mice were monitored for body weight loss and moribundity for up to 56 days after initial treatment to determine when mice succumbed to tumor burden. Venetoclax alone or in combination with LEED or HELD 5-azacytidine significantly increased survival compared to vehicle alone (venetoclax vs vehicle, p=0.0493; LEED+venetoclax vs vehicle, p=0.0123; HELD+venetoclax vs vehicle, p=0.04). LEED or HELD 5-azacytidine in combination with venetoclax significantly increased survival compared to 5-azacytidine alone (LEED+venetoclax vs LEED, p=0.001; HELD+venetoclax vs HELD, p=0.0004). However, only LEED+5-azacytidine was significantly better than venetoclax alone (LEED+venetoclax vs venetoclax, p=0.0378). Furthermore, LEED or HELD 5-azacytidine combination with venetoclax did increase median survival compared to single agents (LEED+venetoclax=38, HELD+venetoclax=37, vehicle=29.5, HELD=35, LEED=35, venetoclax=35.5). (FIG. 16C)

Figure 16F:
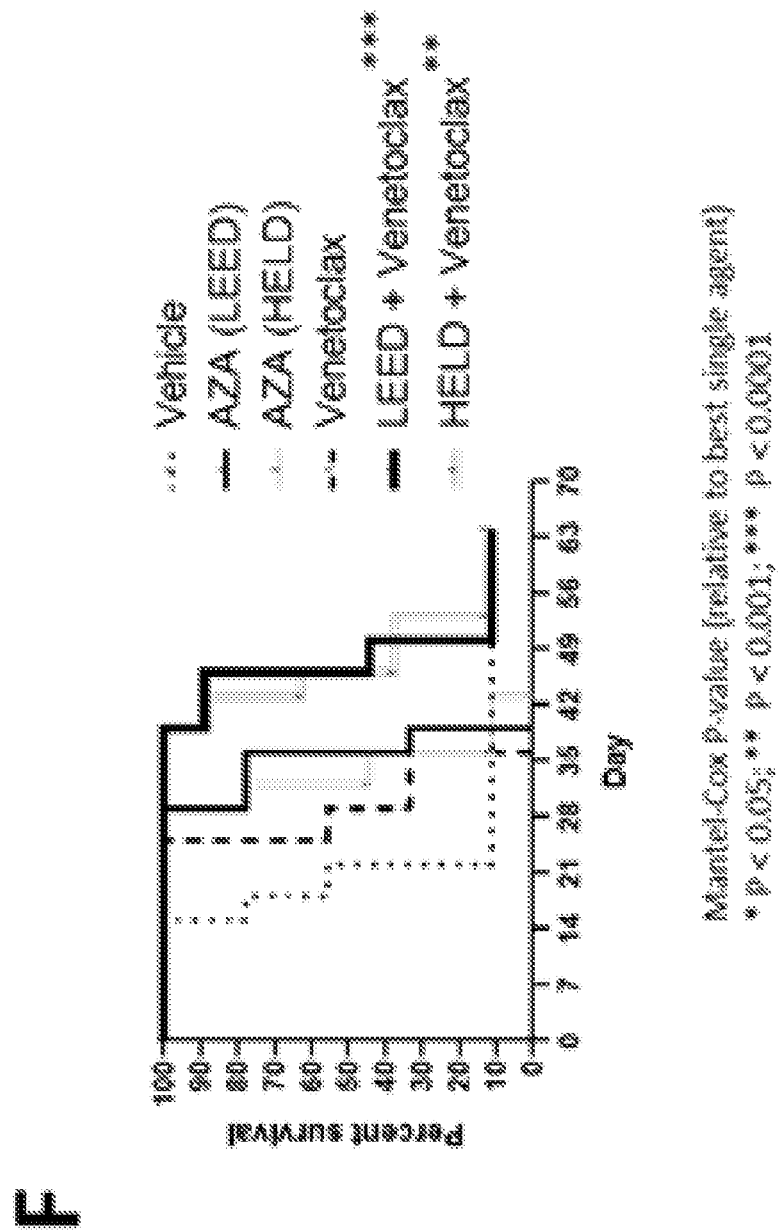

These experiments were repeated with a second FLT3-ITD cell line, MOLM-13. Briefly, $5 \times 10^6$ MOLM-13 cells were injected into 12 NOD/SCI mice per group. Three days after tumor cell inoculation, mice were treated with the same dosing regimen as MV4-11 cells. Mice were monitored for body weight loss and moribundity for up to 70 days after initial treatment to determine when mice succumbed to disease burden. Venetoclax alone and in combination with LEED or HELD 5-azacytidine significantly increased survival compared to vehicle alone (venetoclax vs vehicle, p=0.003; LEED+venetoclax vs vehicle, p=0.002; HELD+venetoclax vs vehicle, p=0.004). Low exposure, extended duration or HELD 5-azacytidine dosing in combination with venetoclax significantly increased survival compared to either LEED or HELD 5-azacytidine alone (LEED+venetoclax vs LEED, p=0.001; LEED+venetoclax vs HELD, p<0.001; HELD+venetoclax vs LEED, p=<0.001; HELD+venetoclax vs HELD, p=<0.001. Furthermore, LEED or HELD 5-azacytidine dosing in combination with venetoclax significantly increased survival compared to venetoclax alone (LEED+venetoclax vs venetoclax, p<0.001; HELD+venetoclax vs venetoclax, p<0.001). Median survival was increased with LEED or HELD 5-azacytidine in combination with venetoclax compared to vehicle or single agents (LEED+venetoclax=46 days, HELD+venetoclax=45 days, vehicle=19 days, venetoclax=29 days, LEED=36 days, HELD=32 days). (FIG. 16F).

Altogether, these results show that subjects with FLT3-ITD mutations may benefit from AZA+Ven combination therapy.

Combinations of 5-Azacytidine with FLT-3 Inhibitors
Results

Figure 17A:
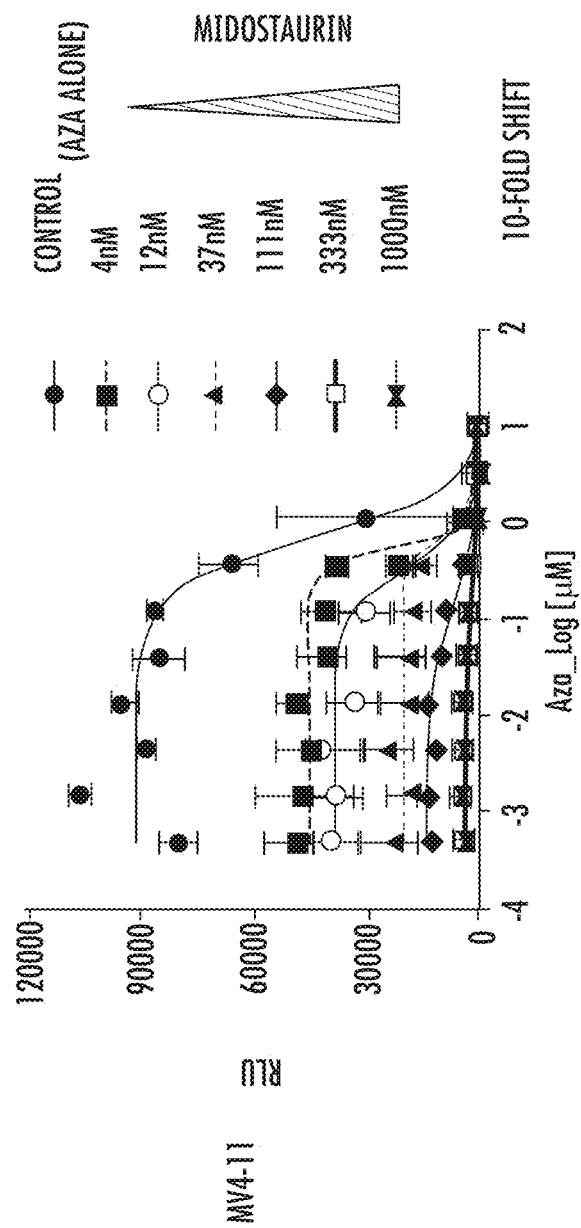
FIGS. 17A, 17B, 17C, 17D, 17E, 17F, 17G, 17H, 17I, 17J, and 17K depict the results of an investigation as to whether co-treatment with 5-azacytidine and FLT3 inhibitors have a synergistic effect in AML cells.
Figure 17B:
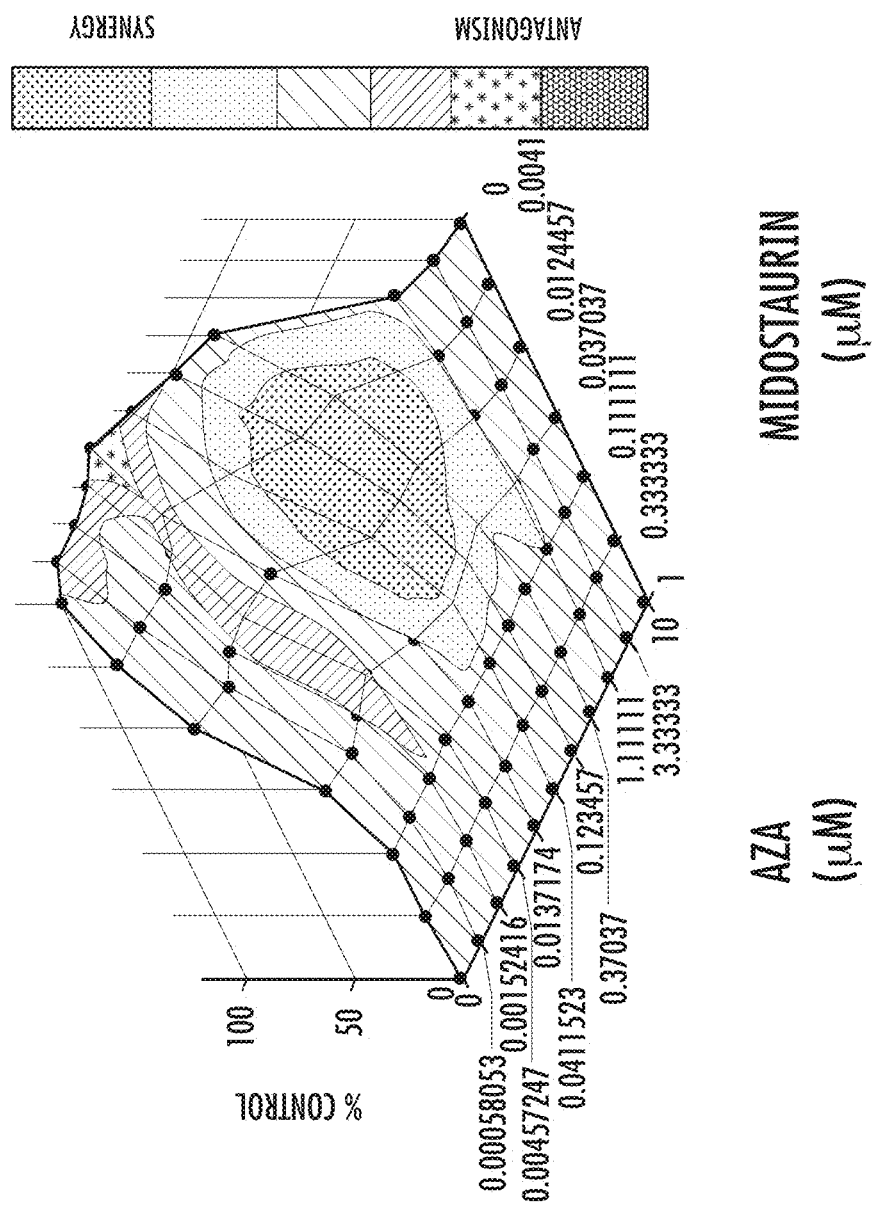
Figure 17C:
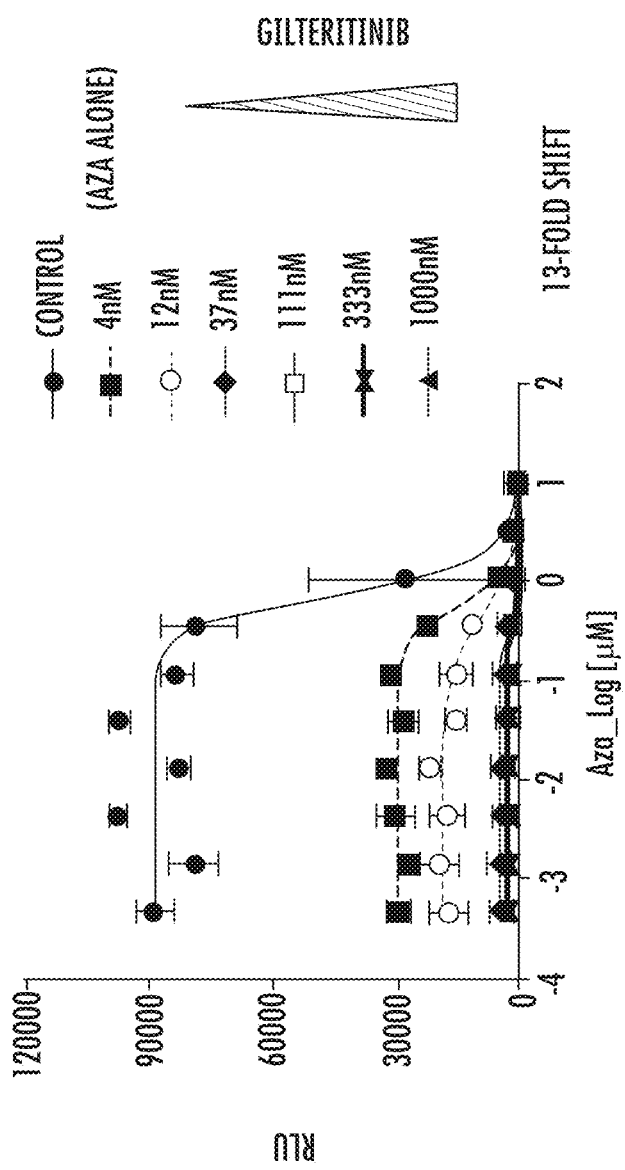
Figure 17D:
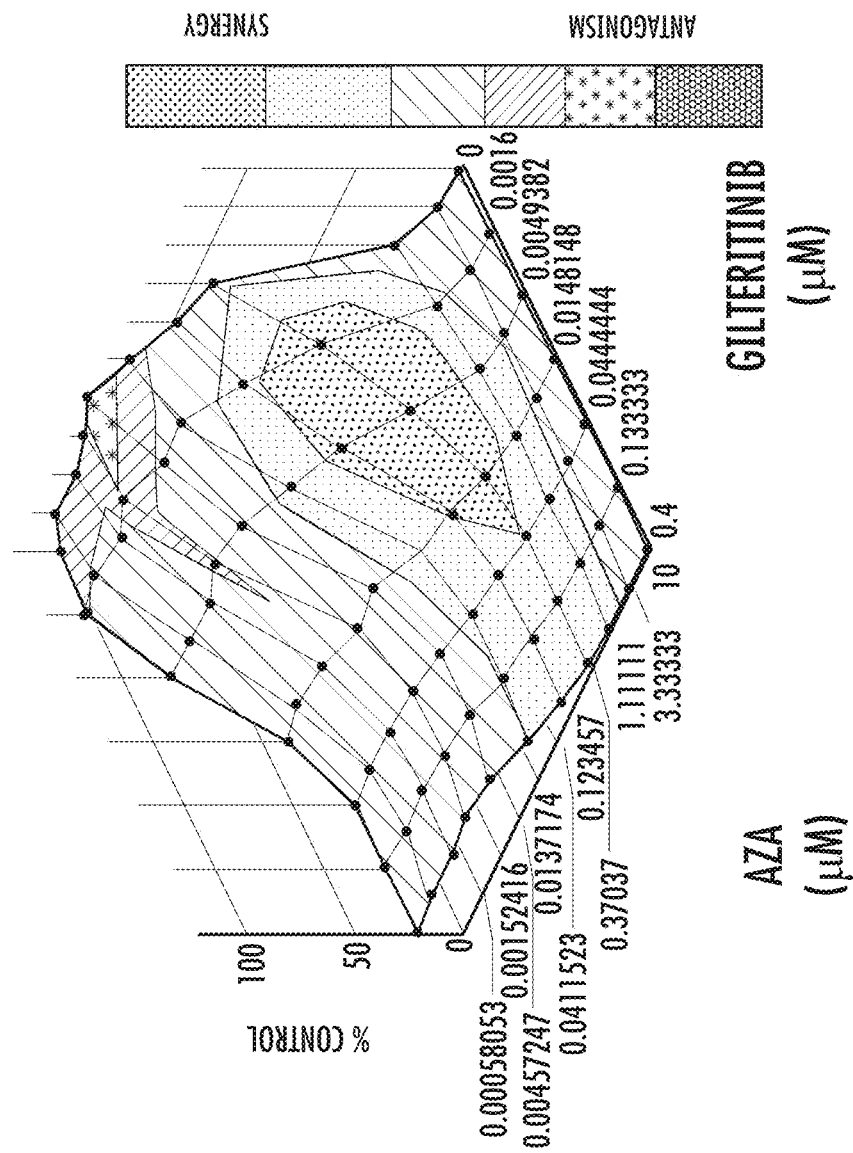
Figure 17E:
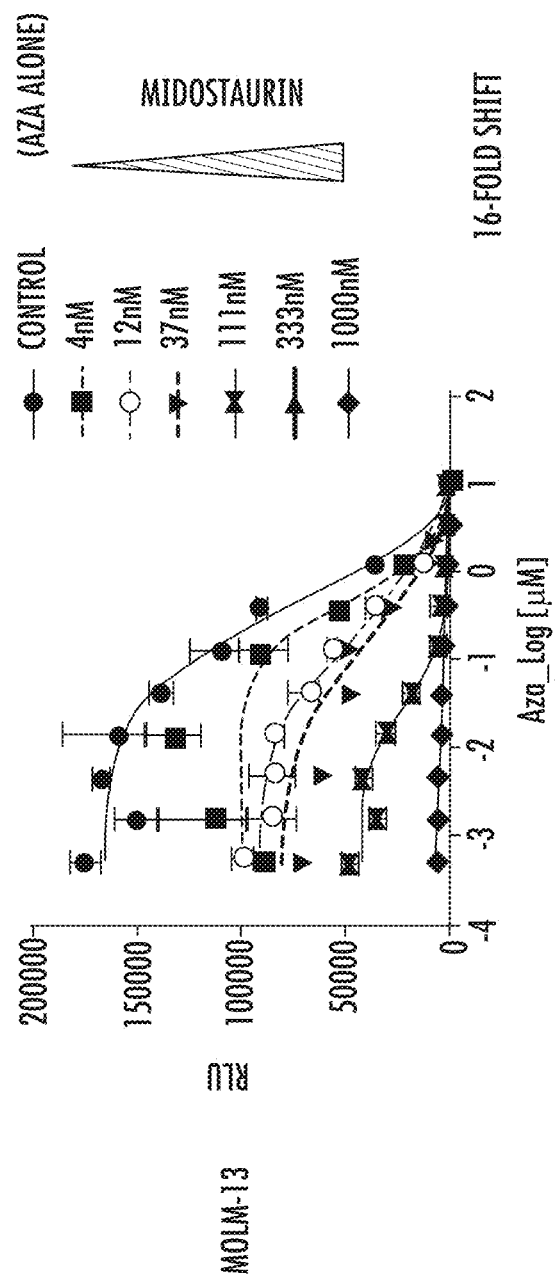
Figure 17F:
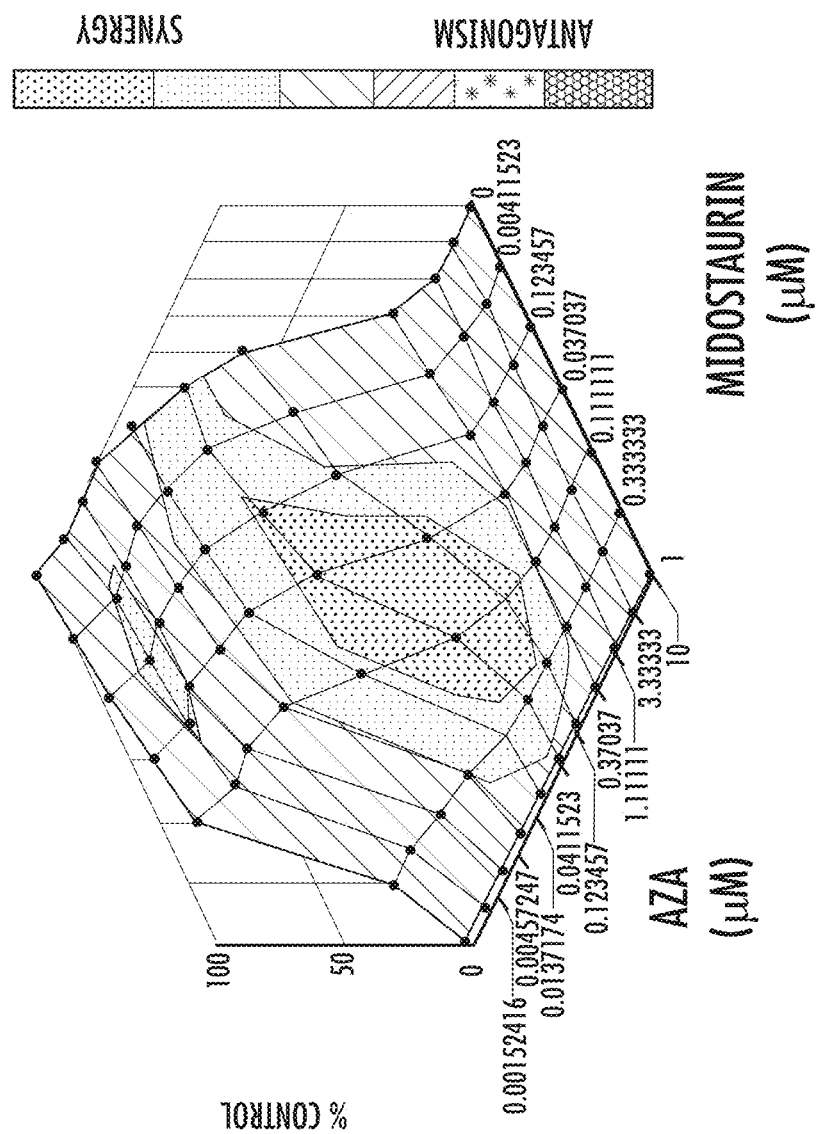
Figure 17G:
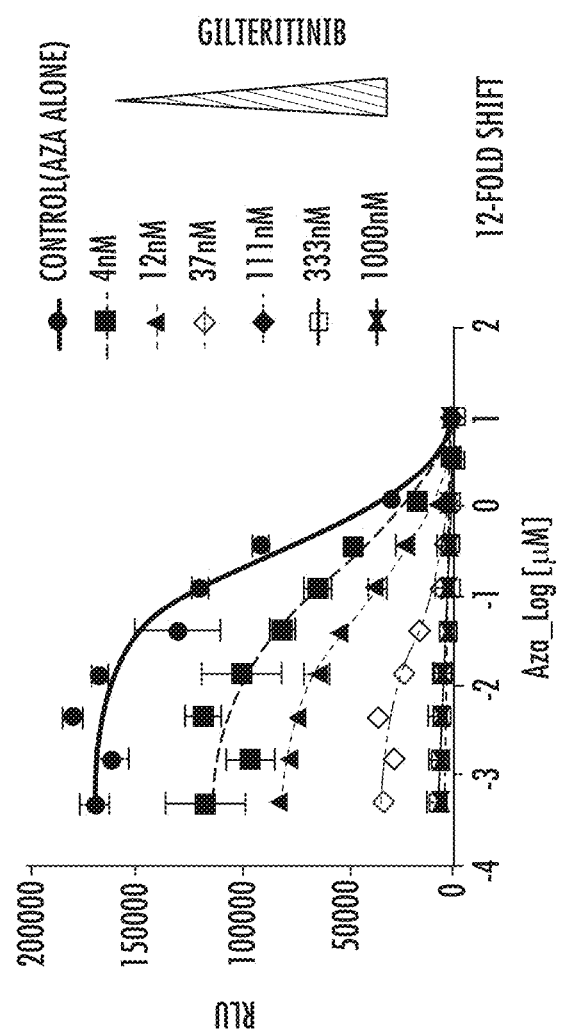
Figure 17H:
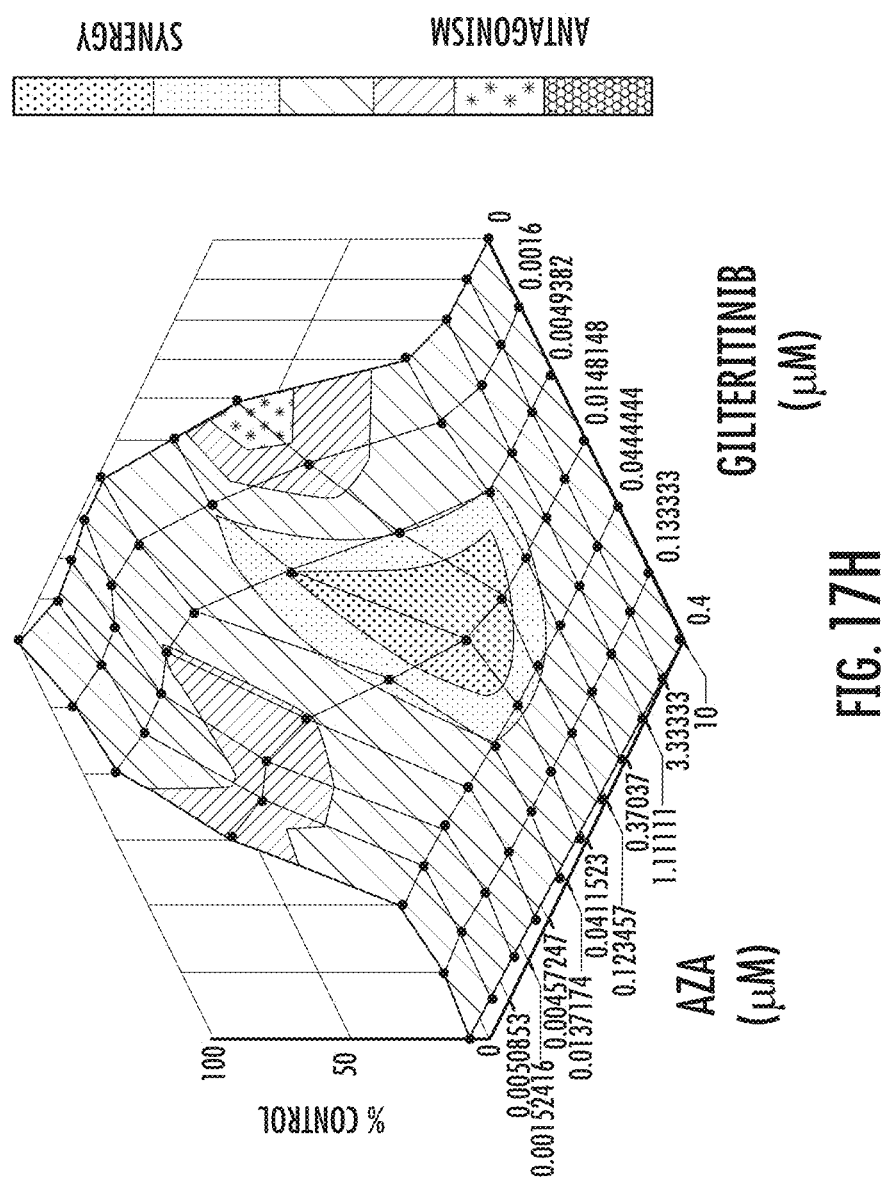

FLT3 mutations occur in ~30% of AML patients and have been associated with poor prognosis. The broad-acting FLT-3 inhibitor midostaurin and the selective FLT3 inhibitor, gilteritinib, have been approved for the treatment of AML. To investigate whether co-treatment with 5-azacytidine and FLT3 inhibitors have a synergistic effect in AML cells, two FLT3-ITD cell lines, MV4-11 and MOLM-13 cells were treated with 5-azacytidine+midostaurin or 5-azacytidine+gilteritinib. Cells were treated with daily doses of 5-azacytidine on Day 1-3, and then treated with a FLT-3 inhibitor (midostaurin or gilteritinib) at Day 4. Cells were collected on Day 7 and cell viability was assessed by CellTiter-Glo® assay. Midostaurin sensitized MV4-11 to 5-azacytidine (FIG. 17A) and showed synergistic activity with 5-azacytidine (FIG. 17B). Similar effects were observed in MV4-11 cells treated with 5-azacytidine and gilteritinib (FIGS. 17C and 17D), as well as in MOLM-13 cells treated with 5-azacytidine and midostaurin (FIGS. 17E and 17F) or gilteritinib (FIGS. 17G and 17 H).

Figure 17I:
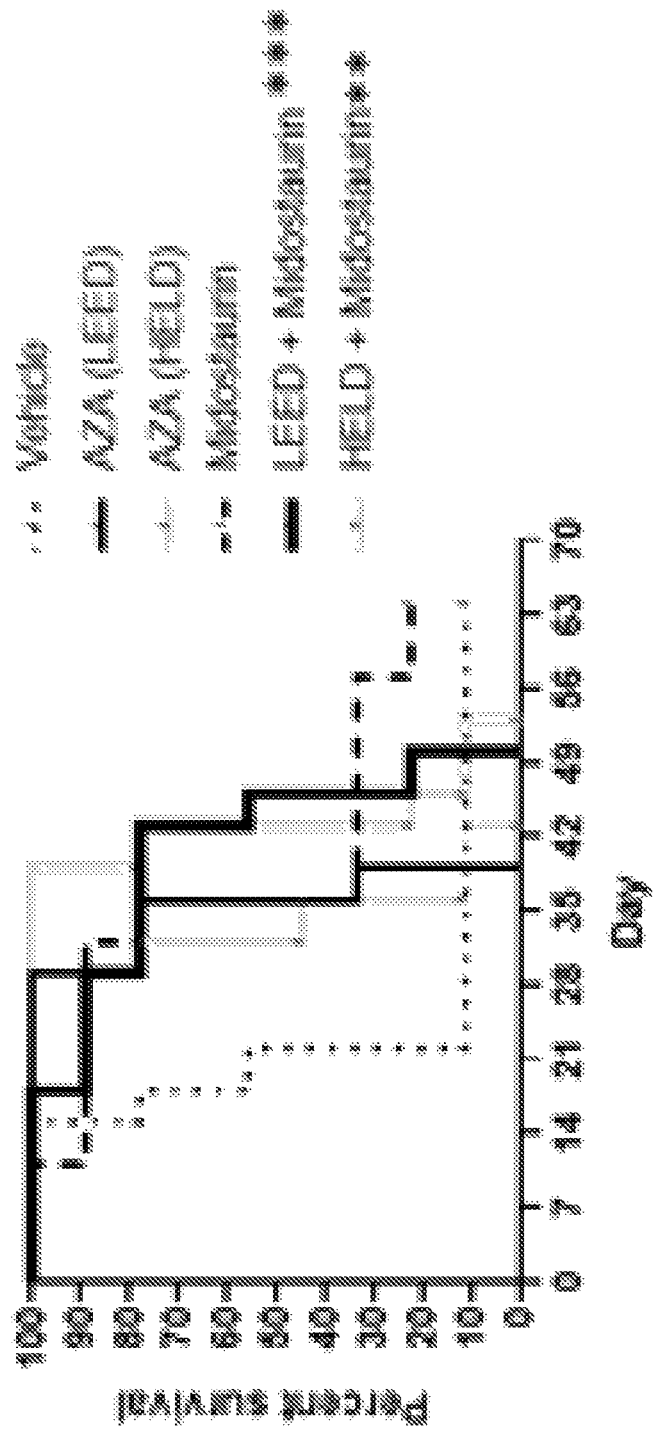

Next synergistic activity between FLT3 inhibitors and 5-azacytidine administered using a dose and schedule similar to injectable (high exposure, limited duration, or HELD regimen) or oral (low exposure, extended duration, LEED) was examined. Two disseminated xenograft models of AML based on MOLM-13 and MV4-11 cell lines were used. Mice were treated with 5-azacytidine using a HELD regimen (3 mg/kg, daily for 5 days) or LEED (1 mg/kg, once daily for fifteen days (qd×15)). FLT3 inhibitors midostaurin at 100 mg/kg daily for 21 days and gilteritinib at 4 mg/kg, qd×21 were administered as single agents or with HELD or LEED 5-azacytidine regimens. In MOLM-13 xenograft models, midostaurin alone and in combination with LEED or HELD 5-azacytidine significantly increased survival compared to vehicle alone (midostaurin vs vehicle, p=0.027; LEED+midostaurin vs vehicle, p=0.012; HELD+midostaurin vs vehicle, p=0.003) (FIG. 17I). Low exposure, extended duration or HELD 5-azacytidine dosing in combination with midostaurin significantly increased survival compared to LEED or HELD 5-azacytidine, respectively (LEED+midostaurin vs LEED, p=0.028; HELD+midostaurin vs HELD, p=0.039). No significant changes in survival were observed between LEED or HELD in combination with midostaurin compared to midostaurin treatment alone. Median survival was increased with LEED or HELD 5-azacytidine in combination with midostaurin compared to vehicle or single agents (LEED+midostaurin=45 days, HELD+midostaurin=43 days, vehicle=19 days, midostaurin=34 days, LEED=36 days, HELD=32 days) (FIG. 17I).

Figure 17J:
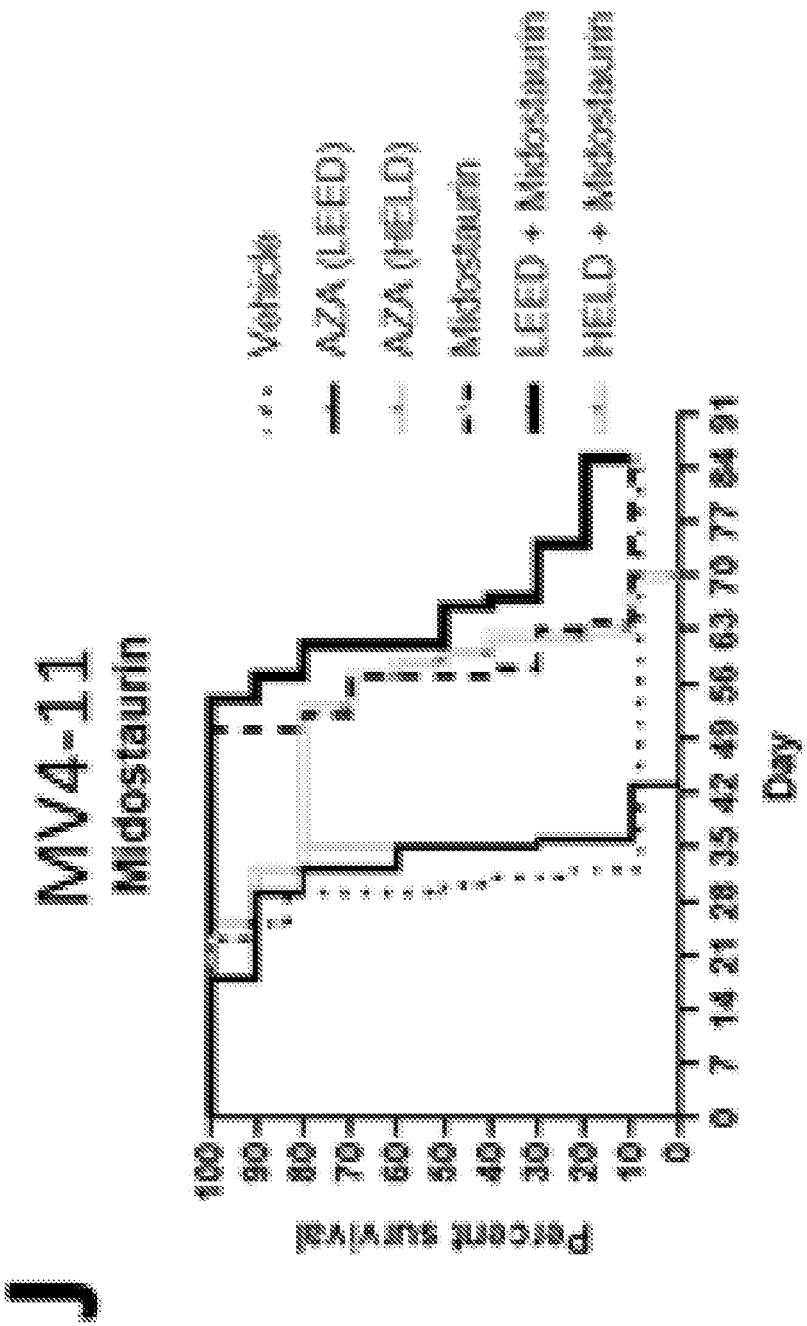

In MV4-11 xenograft models, midostaurin alone and in combination with LEED or HELD 5-azacytidine increased survival compared to vehicle alone (Midostaurin vs vehicle, p=0.0067; LEED+midostaurin vs vehicle, p=0.0084; HELD+midostaurin vs vehicle, p=0.0625). LEED or HELD 5-azacytidine dosing in combination with midostaurin significantly increased survival compared to either LEED or HELD 5-azacytidine alone (LEED+midostaurin vs LEED, p=<0.0001; HELD+midostaurin vs HELD, p=0.0015). Furthermore, LEED or HELD 5-azacytidine in combination with midostaurin did not significantly increase survival compared to midostaurin alone (LEED+midostaurin vs midostaurin, p=0.1704; HELD+midostaurin vs midostaurin, p=0.8308). Median survival was increased with LEED or HELD 5-azacytidine in combination with midostaurin compared to vehicle or single agents HELD or LEED (LEED+midostaurin=64.5, HELD+midostaurin=59.5, vehicle=29.5, LEED=35, HELD=35, midostaurin=57) (FIG. 17J).

Figure 17K:
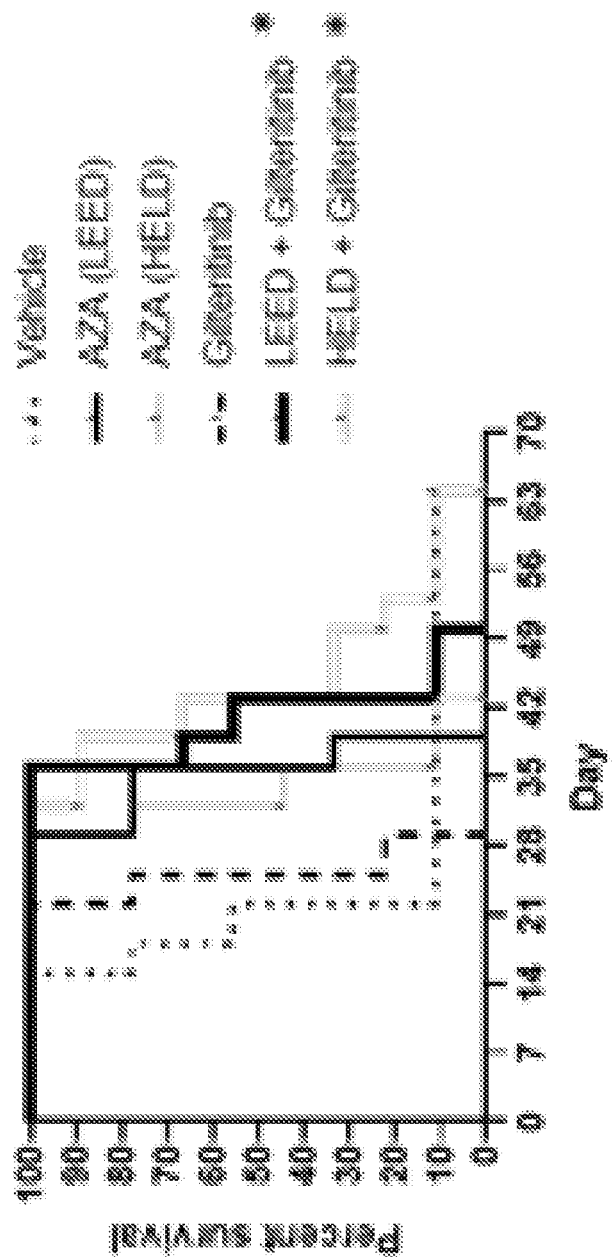

In MOLM-13 xenograft models, gilteritinib alone and in combination with LEED or HELD 5-azacytidine significantly increased survival compared to vehicle alone (gilteritinib vs vehicle, p=0.003; LEED+gilteritinib vs vehicle, p=0.003; HELD+gilteritinib vs vehicle, p=0.003). Low exposure, extended duration or HELD 5-azacytidine dosing in combination with gilteritinib significantly increased survival compared to either LEED or HELD 5-azacytidine alone (LEED+gilteritinib vs LEED, p=0.019; LEED+gilteritinib vs HELD, p=0.004; HELD+gilteritinib vs LEED, p=0.008; HELD+gilteritinib vs HELD, p=0.003. Furthermore, LEED or HELD 5-azacytidine dosing in combination with gilteritinib significantly increased survival compared to gilteritinib alone (LEED+gilteritinib vs gilteritinib, p<0.001; HELD+gilteritinib vs gilteritinib, p<0.001). Median survival was increased with LEED or HELD 5-azacytidine in combination with gilteritinib compared to vehicle or single agents (LEED+gilteritinib=45 days, HELD+gilteritinib=43 days, vehicle=19 days, gilteritinib=34 days, LEED=36 days, HELD=32 days) (FIG. 17K).

Altogether, these results suggest that LEED or HELD 5-azacytidine in combination with a FLT3 inhibitor is significantly more effective at killing AML cells as compared to single agent 5-azacytidine or FLT3 inhibitor alone.

5-Azacytidine/Venetoclax/CC-90011 Triple Combination Assays

As used in the following example, CC-90011 refers to 4-[2-(4-amino-piperidin-1-yl)-5-(3-fluoro-4-methoxy-phenyl)-1-methyl-6-oxo-1,6-dihydro-pyrimidin-4-yl]-2-fluoro-benzonitrile, including the besylate salt.

CC-90011 (30 mM in DMSO) was obtained from Celgene compound collection bank, diluted with DMSO into 10 mM stock and aliquoted and stored in −80° C. AML cell lines were seeded at 2,000 cells per well in 384-well plates and then were treated in a matrix format with 6 concentrations of CC-90011 at day 0 and 9 concentrations of a mixture of 5-azacytidine and venetoclax, at a ratio corresponding to that of $EC_{50}$ for each compound. 5-Azacytidine was administered daily on Days 1, 2 and 3, while venetoclax was administered on day 4. Cell viability was subsequently determined using CellTiter-Glo® reagent according to the manufacturer's instructions (Promega Inc.). The effective concentration ($EC_{50}$) that induce 50% cell death were determined by nonlinear regression algorithms using Prism 7.03 (GraphPad Software). The synergy index and the 3D graph were analyzed by Combenefit software (DiVeroli *Bioinformatics* 2016) using the Highest Single Agent model.

Combination of 5-Azacytidine, Venetoclax, and CC-90011 Results

Figure 18A:
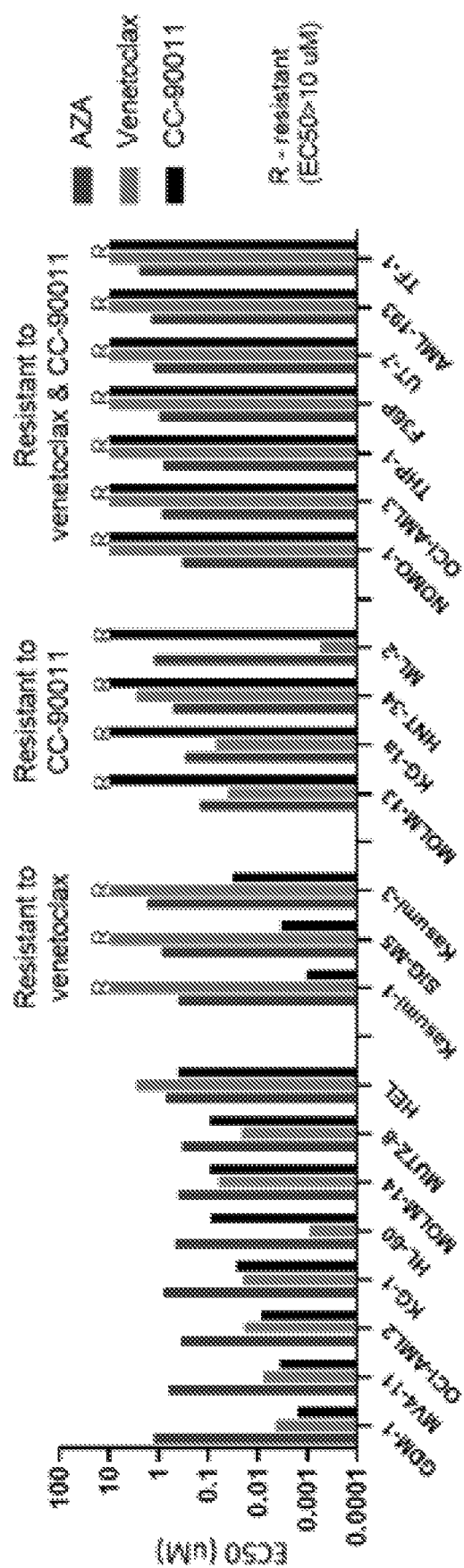
FIGS. 18A-C depict an assessment of cytotoxicity of various agents. The efficacy of CC-90011, AZA, and venetoclax as single agent treatments for inducing cytotoxicity was assessed in 22 AML cell lines (FIG. 18A).

The efficacy of CC-90011, AZA, and venetoclax as single agent treatments for inducing cytotoxicity was assessed in 22 AML cell lines (FIG. 18A). Eleven of these lines were sensitive to CC-90011, of which 8 lines were sensitive to CC-90011, AZA, and venetoclax and 3 cell lines were sensitive to AZA and CC-90011, but not venetoclax ($EC_{50}$ greater than the maximum concentration of venetoclax used, 10 μM). Four cells lines were sensitive to AZA and venetoclax, but resistant to CC-90011 ($EC_{50}$>10 μM), while 7 cell lines were resistant to both venetoclax and CC-90011 (FIG. 18A).

Figure 18B:
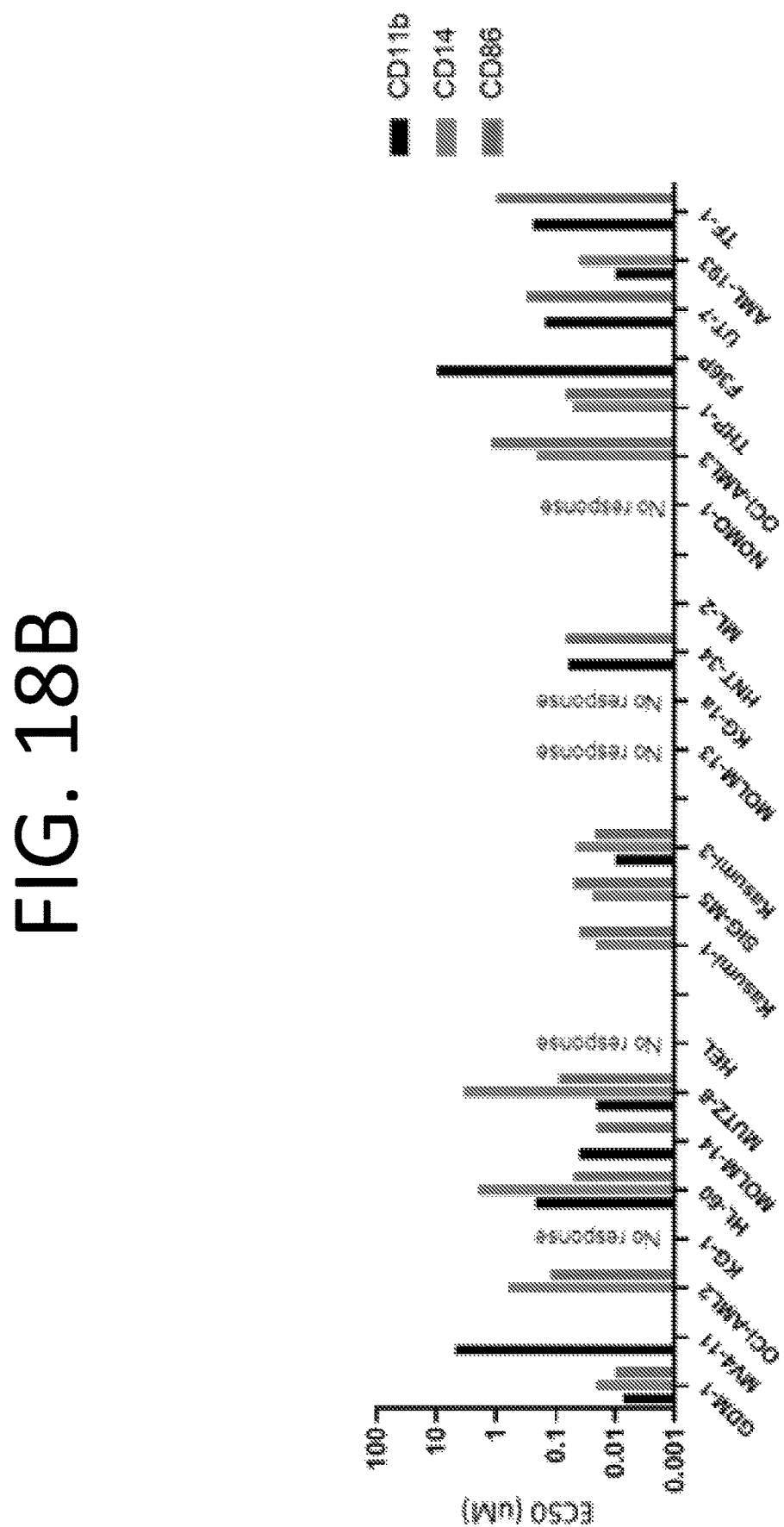
Figure 18C:
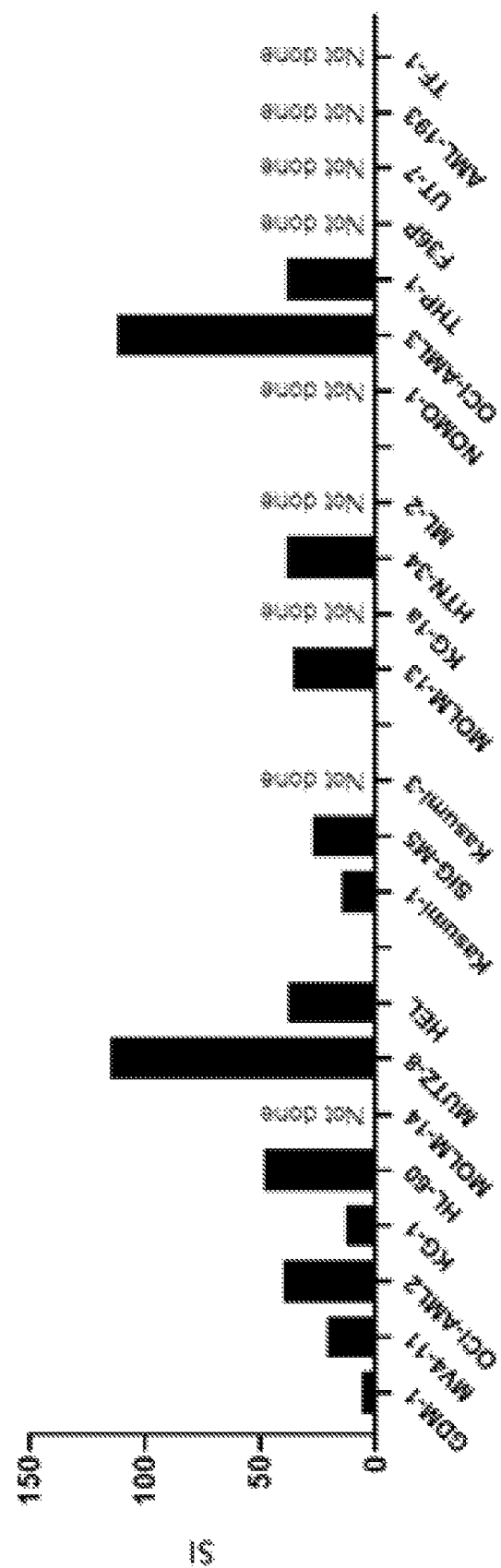
Figure 19D:
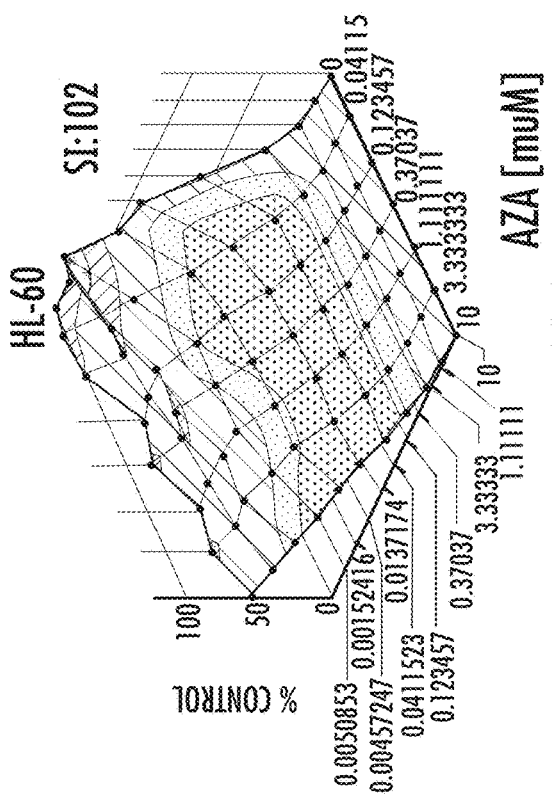
Figure 19E:
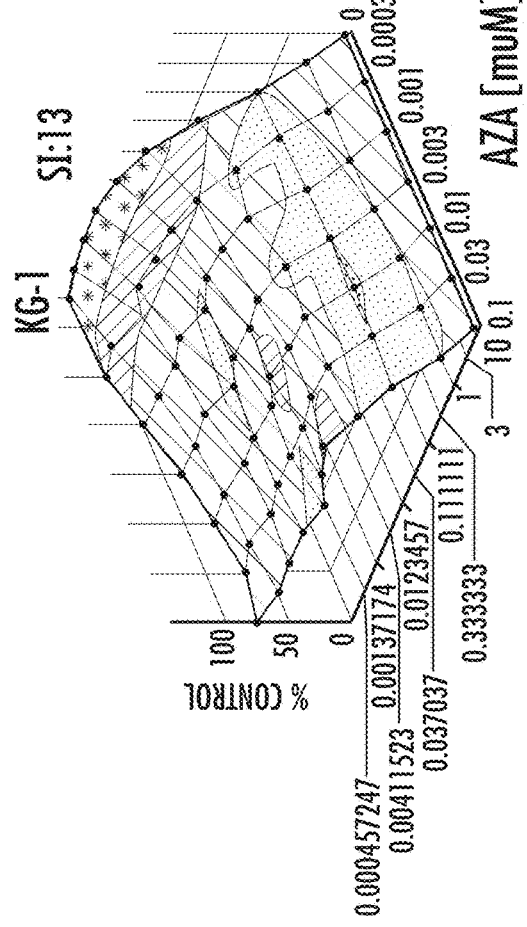
Figure 19F:
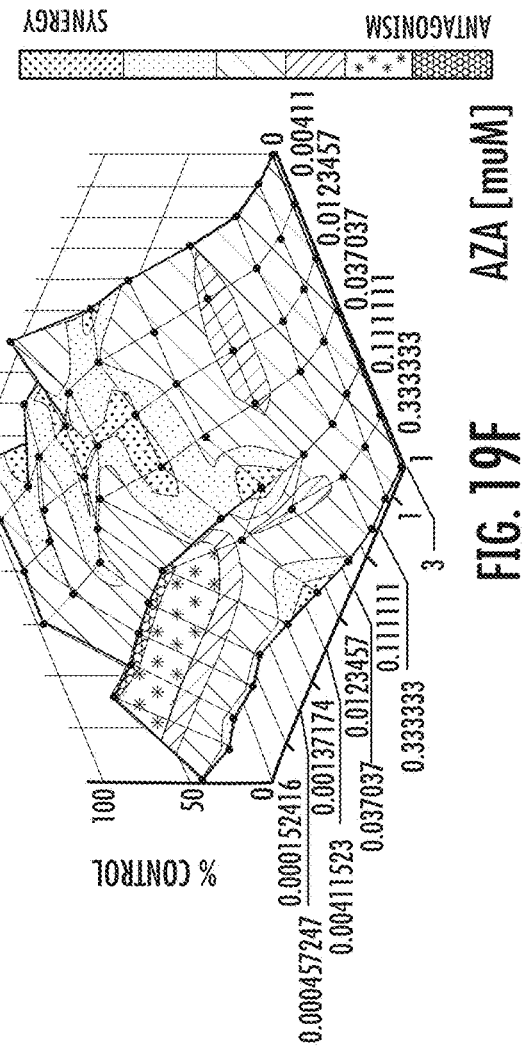
Figures 19G, 19H, 19I:
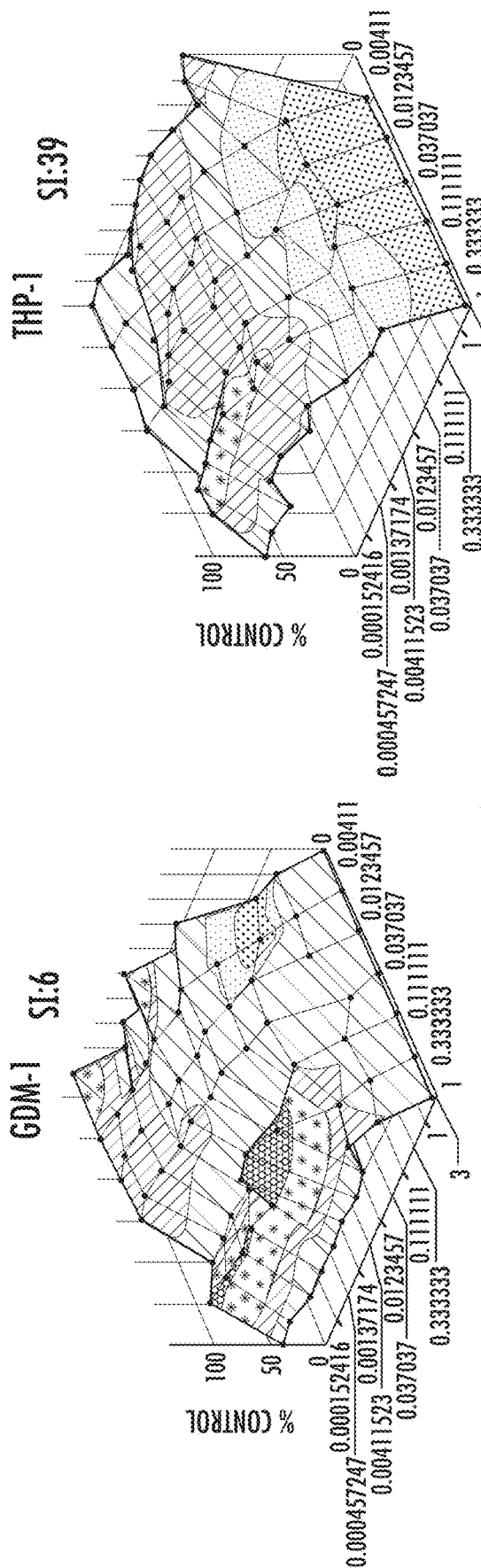
Figure 19K:
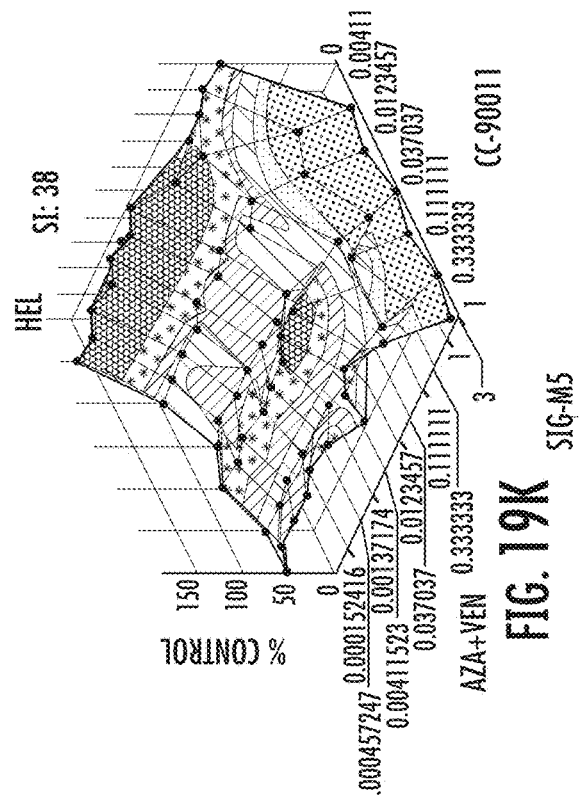
Figure 19J:
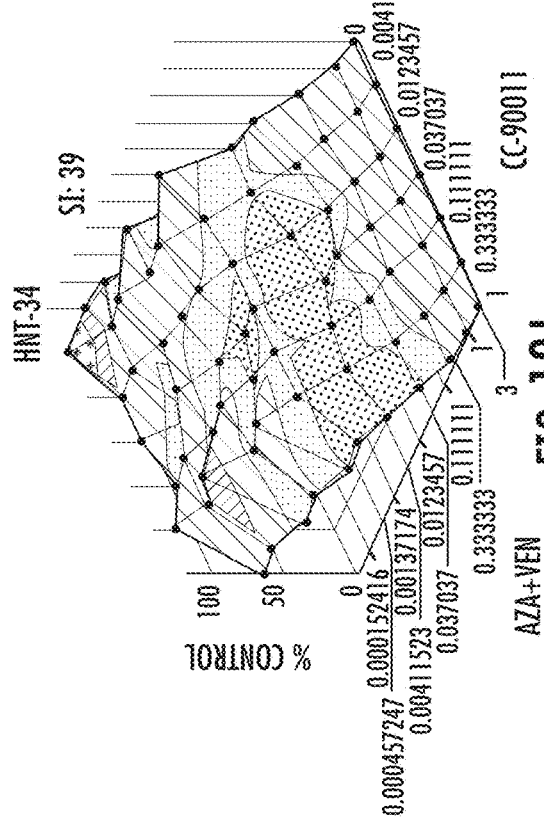
Figure 19M:
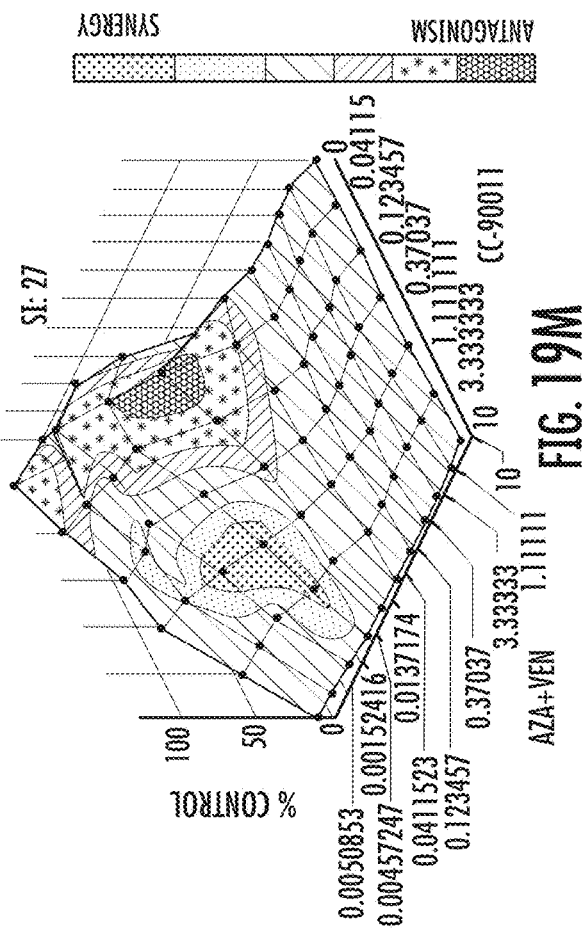
Figure 19L:
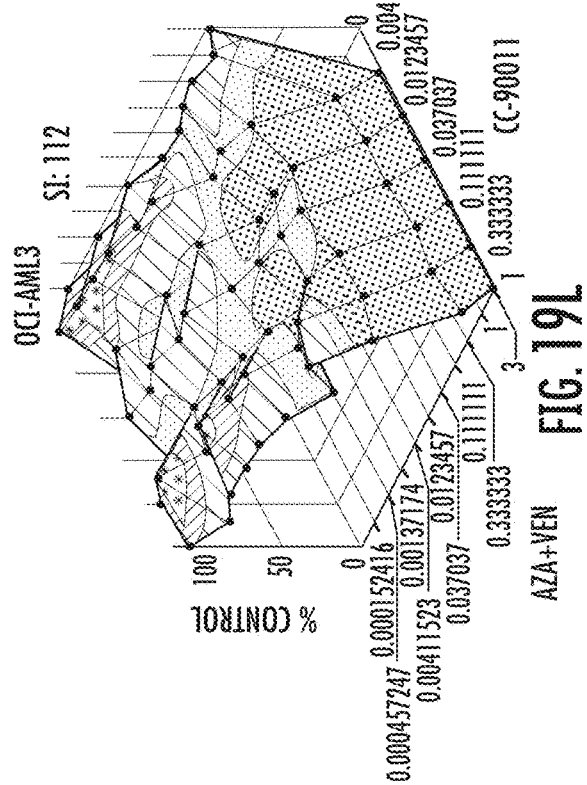

LSD inhibitors increase differentiation in several AML cell lines and in human AML xenograft models (FIG. 18B). To investigate the induction of differentiation markers by CC-90011, flow cytometry was used to measure CD11b, CD14, and CD86 surface marker expression in 22 AML cell lines following CC-90011 treatment. Seventeen of these cell lines increased expression of at least one of these differentiation markers, while five cell lines had no changes in any of these differentiation markers, including HEL, KG-1, MOLM-13, KG-1a, and NOMO-1 (FIG. 18B). Of note, increased expression of differentiation markers did not correlate with sensitivity to CC-90011 cytotoxicity.

To examine whether AZA+Ven+CC-90011 triple combination exhibits synergy in AML cell lines, 13 of 22 AML cell lines were treated with various concentrations of AZA+Ven+CC-90011 (FIGS. 18C and 19A-M). After 7 days of treatment, cell viability was examined using CellTiter-Glo® and synergy was calculated using Combenefit and surface mapped using "Highest Single Agent" modeling (FIGS. 19A-M). AML cell lines treated with AZA+Ven+CC-90011 had varying degrees of synergy, as MUTZ-8 and OCI-AML3 had extremely high synergy (Synergy Index score of 115 and 112, respectively). In contrast, GDM-1 and Kasumi-1 had very little to no synergy (Synergy Index of 6 and 15, respectively). Cell lines that were resistant to single agent venetoclax or CC-90011 (SIG-M5, MOLM-13, HNT-34, OCI-AML3, and THP-1) were responsive to AZA+Ven+CC-90011 triple combination. This suggests that AZA+Ven+CC-90011 triple combination could have efficacy in AML patients, even if those patients were initially resistant to venetoclax or CC-90011.

To determine whether AZA+Ven+CC-90011 triple combination was more effective as compared to AZA+CC-90011 or Ven+CC-90011, triple combination was compared to pairwise combinations of these agents (FIGS. 20A-D). In OCI-AML-2, double combinations of AZA+CC-90011 (FIG. 20A), Ven+CC-90011 (FIG. 20B), or AZA+Ven (FIG.

20C) did not exhibit synergy in OCI-AML2 cells. However, when OCI-AML2 are treated with AZA+Ven+CC-90011 combination (FIG. 20D), synergy is substantially increased.

This demonstrates that the triple combination is better at killing leukemic cells than the single agents alone or in any double combination in OCI-AML2 cells.

Example 2

As used in the following example, CC-90011 refers to the besylate salt of 4-[2-(4-amino-piperidin-1-yl)-5-(3-fluoro-4-methoxy-phenyl)-1-methyl-6-oxo-1,6-dihydro-pyrimidin-4-yl]-2-fluoro-benzonitrile.

Study Objectives: An exemplary objective of the study evaluates the safety and tolerability of CC-90011 in combination with venetoclax and 5-azacytidine in treatment-naïve subjects with AML who are not eligible for intensive induction.

An additional objective includes: (1) Assessing the preliminary efficacy of CC-90011 in combination with venetoclax and 5-azacytidine in treatment-naïve subjects with AML who are not eligible for intensive induction chemotherapy; and (2) evaluating the minimal residual disease (MRD) response rate and MRD conversion rate by multi-color flow cytometry (MFC) and/or next generation sequencing (NGS).

Further objectives include: (1) exploring the duration of MRD response by assessments of bone marrow aspiration and examination of peripheral blood smears; (2) characterizing the PK profile of CC-90011 when given in combination with venetoclax and 5-azacytidine; (3) characterizing the PD to understand the mechanistic effects of CC-90011 in combination with venetoclax and 5-azacytidine; (4) exploring the relationship between PK, PD biomarkers, and/or clinical outcomes of CC-90011 in combination with venetoclax and 5-azacytidine; (5) evaluating molecular and/or cellular markers in the bone marrow and blood that correlate with efficacy with CC-90011 in combination with venetoclax and 5-azacytidine; and (6) evaluating the post-baseline transfusion independence rate of CC-90011 in combination with venetoclax and 5-azacytidine Study endpoints are displayed below in Table 3.

TABLE 3

Study endpoints for the study

| Endpoint | Name | Description | Timeframe |
| --- | --- | --- | --- |
| Primary | Safety & Tolerability | Adverse events (using NCI CTCAE Version 5.0), laboratory tests, vital signs, ECG, ECOG performance status, LVEF, physical exams, concomitant medications, and dose modifications. | From ICF signature until 28 days after last dose of CC-90011 |
| | RP2D | DLTs and MTD (if reached) evaluated using the NCI CTCAE criteria, Version 5.0 | From C1D1 to the end of Cycle 1 in the dose escalation part |
| Secondary | Preliminary Efficacy | CR/CRh rate: defined as the rate of achieving CR or CRh (as assessed by the Investigator) | From C1D1 until 28 days after last dose. Efficacy assessments will be performed on Day 1 of Cycles 2, 3, 4 then every 2 cycles thereafter (eg, Cycle 6, 8, 10, etc) |
| | | ORR: defined as the rate of achieving CR/CR$_{MRD-}$/CRi/PR/MLFS | From C1D1 until 28 days after last dose. Efficacy assessments will be performed on Day 1 of Cycles 2, 3, 4 then every 2 cycles thereafter (eg, Cycle 6, 8, 10, etc) |
| | | DOR (CR/CRh) | From the time from the first CR or CRh to the date of documented disease relapse or death, whichever is earlier. |
| | | DOR (CR/CR$_{MRD-}$/CRi/PR/MLFS) | From the time from the first CR, CR$_{MRD-}$, CRi, PR or MLFS to the date of documented disease relapse, progression, or death, whichever is earlier. |
| Secondary (Continued) | Preliminary Efficacy | EFS | From the first dose of CC-90011 to the first occurrence of relapse or progression or death from any cause. Subjects who do not relapse/progress or die at a data cut-off date will be censored at the date of their last adequate tumor assessment. |

TABLE 3-continued

Study endpoints for the study

| Endpoint | Name | Description | Timeframe |
|---|---|---|---|
| | OS | | From the first dose of CC-90011 to the date of death due to any cause. Subjects who are alive at the analysis cutoff date will be censored at the last contact date. |
| | MRD Response Rate | The rate of having at least a one log reduction in disease burden or an MRD negative ($10^{-3}$) test result | MRD assessments will be performed at Screening, Day 1 of Cycles 2, 3, 4, then every 2 cycles thereafter (eg, Cycle 6, 8, 10, etc) |
| | MRD Conversion Rate | Rate of subjects achieving MRD negativity ($10^{-3}$) at any time on therapy | MRD assessments will be performed at Screening, Day 1 of Cycles 2, 3, 4, then every 2 cycles thereafter (eg, Cycle 6, 8, 10, etc) |
| Exploratory | Duration of MRD Response | Evaluate the durability of MRD response by serial bone marrow aspirate assessment for MRD | Time from achieving first MRD response to having a positive MRD result or increase in disease burden by at least one log. Death will be censored. |
| | PK | Characterize PK of CC-90011 | All planned timepoints in Cycle 1-Cycle 3 |
| Exploratory (Continued) | PK/PD | Assess the relationship between PK/PD biomarkers and clinical outcomes of CC-90011 in combination with venetoclax and 5-azacytidine | Cycle 1 and subsequent cycles at specified timepoints |
| | Pharmacodynamics | Gene expression of MMD and MYL9 in peripheral blood | Select time points concurrent with PK (Days 1-22) |
| | Pharmacodynamics | CC-90011: Analyses of myeloid lineage markers (e.g. CD86 and CD11b), immune cell subsets, and LSC and progenitor cell populations, using gene expression and/or flow cytometry from bone marrow aspirations on MRD population. AZA: DNA methylation changes in blood; VEN: Apoptotic regulators (BCL-2, MCL-1) using gene expression; BH3 profiling | From enrollment to study discontinuation |
| | Predictive biomarkers | Gene mutation analyses from bone marrow aspirates using NGS Single cell RNAseq on sorted MRD cells | From enrollment to study discontinuation |
| | Post-baseline transfusion independence rate | Rate of subjects who were transfusion dependent at baseline and converted to transfusion independent post-baseline | From C1D1 until 28 days after last dose. |

Abbreviations: AE = adverse event; AZA = 5-azacytidine; BCL-2 = B-cell lymphoma 2; BH3 = BCL-2 homology domain 3; C1D1 = Cycle 1 Day 1; CD = cluster of differentiation; CD11b = CD11 antigen-like family member B; CR = complete remission; CRh = CR with partial hematologic recovery; CRi = CR with incomplete hematologic recovery; $CR_{MRD-}$ = CR without minimal residual disease; DLT = dose limiting toxicity; DNA = deoxyribonucleic acid; DOR = duration of response; ECG = electrocardiogram; ECOG = Eastern Cooperative Oncology Group; EFS = event-free survival; ICF = informed consent form; LVEF = left ventricular ejection fraction; MLFS = morphologic leukemia-free state; LSC = leukemic stem cell; MCL-1 = myeloid cell leukemia 1; MLFS = morphologic leukemia-free state; MMD = monocyte to macrophage differentiation-associated; MRD = minimal residual disease; MYL9 = myosin light chain 9; NCI = National Cancer Institute; NGS = next generation sequencing; ORR = overall response rate; OS = overall survival; PD = pharmacodynamics; PK = pharmacokinetics; PR = partial remission; RNAseq = ribonucleic acid sequencing; RP2D = recommended Phase 2 dose; VEN = venetoclax.

Subjects eligible for enrollment will have newly diagnosed AML and must be ineligible for intensive induction chemotherapy due to age ≥75 years or are ≥60 to 74 years with comorbidities precluding the use of intensive induction chemotherapy.

The study will consist of 2 parts: a dose escalation and a dose expansion part, which will enroll up to approximately 18 subjects and 40 subjects, respectively.

FIG. 21 shows the overall study design.

All subjects will be inpatient during Cycle 1 for the venetoclax dose ramp-up (Days 1-3) and at least at a minimum through Cycle 1 Day 8. Subjects may continue study treatment until demonstration of documented relapse from CR or partial remission (PR), disease progression, unacceptable adverse event(s), intercurrent illness that prevents further administration of treatment, Investigator's decision to withdraw the subject, subject withdraws consent, noncompliance with trial treatment or procedure requirements, death, or administrative reasons.

Dose Escalation The dose escalation part will determine the MTD (if reached) and combination recommended phase 2 dose (RP2D) of CC-90011 with venetoclax and 5-azacytidine in 28-day cycles. The dose escalation will to evaluate 3 dose levels of CC-90011, 20 mg PO QW, 40 mg PO QW, and 60 mg PO QW, in combination with standard dosing for venetoclax and 5-azacytidine and may enroll 3 to 6 subjects in each dose cohort. The dose escalation part will enroll approximately 9 to 18 subjects.

Dose escalation will be guided by an mTPI-2 design (Guo, W. et al., Contemp Clin Trials. 2017 July; 58:23-33), and alternative doses and/or schedules may be explored based on the review of clinical safety and laboratory data by the SRC.

Dose Expansion Once the MTD and/or RP2D of the triple combination therapy has been determined, approximately 40 subjects will be enrolled in the dose expansion part to further evaluate the safety and preliminary efficacy of the administered combination RP2D of CC-90011 with venetoclax and 5-azacytidine. Dose reductions may occur based on the observed safety per the dose modification guidelines.

Screening Phase Subject screening procedures will occur during the screening period within 28 days prior to the start of study treatment. The informed consent form (ICF) must be signed and dated by the subject and the administering staff prior to the start of any other study procedures. All screening tests and procedures must be completed within the 28 days prior to the start of study treatment.

Treatment Period Upon confirmation of eligibility, subjects will be enrolled and begin treatment with oral CC-90011 once weekly in continuous 4-week (28-day) cycles. Study treatment should be initiated on Day 1 of each treatment cycle with an allowed window of ±3 days. Study visits will occur daily beginning on Cycle 1 Day 1 through Cycle 1 Day 8, then at least weekly for the first 3 cycles, then every two weeks (Day 1 and Day 15) in each subsequent cycle beginning with Cycle 4.

All subjects will be hospitalized during Cycle 1 for venetoclax dose ramp-up (Days 1-3) and at least through Cycle 1 Day 8 and will receive prophylaxis and monitoring for tumor lysis syndrome (TLS). This hospitalization is required per protocol and does not constitute a serious adverse event. In the absence of residual morphologic leukemia and in the presence of ongoing cytopenias at the completion of Cycle 1, CC-90011, venetoclax, and/or 5-azacytidine could be interrupted for up to 14 days to allow for hematologic recovery. For management of neutropenia, if a patient were to achieve CRi or had morphologic leukemia-free state (MLFS) after completion of Cycle 1, the subsequent cycle can be delayed to allow for ANC recovery from Day 29 until ANC reaches ≥500/µL or up to 14 days. Recurrent events of neutropenia can be addressed with reduction in treatment intensity (ie, venetoclax to 21 days for subsequent cycles and/or 5-azacytidine dose reduction as per label).

Intra-subject dose escalation of CC-90011 is not permitted during Cycle 1, but escalation to a dose subsequently deemed to be tolerated in a higher dosing cohort may be permitted in later cycles if approved by the SRC.

To allow for the best opportunity to benefit from the treatment and given the mechanism of action of CC-90011 and the median time to response for the venetoclax and 5-azacytidine combination, investigators should aim to treat patients for at least 3 cycles, although subjects can be discontinued from treatment earlier if they demonstrate documented relapse from CR or PR, disease progression, unacceptable adverse event(s), intercurrent illness that prevents further administration of treatment, investigator's decision to withdraw the subject, subject withdraws consent, noncompliance with trial treatment or procedure requirements, death, or administrative reasons.

Subjects who discontinue CC-90011 for reasons other than relapse or resistant disease may continue on the venetoclax and 5-azacytidine combination until there is evidence of relapse or resistant disease, or until they are no longer able to tolerate treatment due to an adverse event if the subjects are receiving benefit as per investigator discretion. Subjects who discontinue the combination treatment of venetoclax and 5-azacytidine will also discontinue treatment with CC-90011.

End of Treatment (EOT) Treatment will continue until documented relapse from CR or PR, disease progression, unacceptable adverse event(s), intercurrent illness that prevents further administration of treatment, investigator's decision to withdraw the subject, subject withdraws consent, noncompliance with trial treatment or procedure requirements, death, or administrative reasons.

The end of treatment (EOT) visit should occur at the earliest date after the last dose of CC-90011 and within 14 days from the date of last dose. If the EOT occurs during a scheduled visit, all EOT assessments must also be completed.

Follow-up Period In the Follow-up Period, subjects will be followed for 28 days (±3 days) after the last dose of CC-90011 or the last study visit, whichever period is later, in a safety follow-up visit. After the Safety Follow-up visit, all subjects will be followed every subsequent 4 weeks (±2 weeks) for survival follow-up for up until 1 year or until death, lost to follow-up, withdrawal of consent for further data collection, or the End of Trial, whichever occurs first. Survival follow-up may be conducted by record review (including public records) and/or telephone contact with the subject, family, or the subject's treating physician.

Study Duration for Subjects The expected duration of the entire study will be approximately 5 years, which includes an enrollment period of approximately 25 months, a maximum 28-day Screening Period, a Treatment Period of 15 months, and a Survival Follow-up Period of 1 year post last dose. The actual duration of the study will be dependent upon the median treatment duration and follow-up for subjects.

The expected duration of the study for each individual subject will be approximately 2 years, including the maximum 28-day Screening Period, a Treatment Period of approximately 15 months, and a Survival Follow-up Period of 1 year post last dose.

End of Trial The End of Trial will be defined as either the date of the last visit of the last subject to complete the post-treatment follow-up, or the date of receipt of the last data point from the last subject that is required for primary, secondary and/or exploratory analysis, as prespecified in the protocol, whichever is the later date.

Study Population/Estimated No. Patients This study will enroll up to 58 subjects with AML who are treatment-naïve and not eligible for intensive induction chemotherapy, approximately 9 to 18 subjects in the dose escalation and approximately 40 subjects in the dose expansion.

Key Inclusion Criteria Subjects will satisfy the following criteria in order to be enrolled in the study: (1) Subject must understand and voluntarily sign the informed consent form (ICF) prior to any study-related assessments/procedures being conducted. (2) Subject is willing and able to adhere to the study visit schedule and other protocol requirements. (3) Histologically confirmed treatment naive AML as defined by the World Health Organization (WHO) Classification and is ≥75 years of age at the time of signing the informed consent form, or is ≥60 to 74 years at the time of signing the ICF with comorbidities precluding the use of intensive induction chemotherapy defined by the following: (a) ≥60 to 74 years of age with at least one of the following comorbidities: (i) Eastern Cooperative Oncology Group (ECOG) Performance Status of 2; (ii) Cardiac history of Congestive Heart Failure (CHF) requiring treatment or Ejection Fraction ≤50% or chronic stable angina determined by multigated acquisition (MUGA) or echocardiogram (ECHO); (iii) Creatinine clearance ≥30 mL/min to <45 mL/min; (iv) Moderate hepatic impairment with total bilirubin >1.5 to ≤3.0× Upper Limit of Normal (ULN); (v) Any other comorbidity that the physician judges to be incompatible with intensive chemotherapy must be reviewed by the Sponsor during screening and before study enrollment. (4) Subject must have a projected life expectancy of at least 12 weeks. (5) Subject has not received prior therapy for AML with the exception of hydroxyurea to treat hyperleukocytosis. (6) Subject has ECOG performance status of 0 to 2. (7) Subjects must have the following screening laboratory values: (a) White blood cell (WBC) count of ≤25×10$^9$/L. Hydroxyurea or leukapheresis are permitted to meet this criterion. (b) Potassium and magnesium within normal limits or correctable with supplements. (c) Uric acid ≤7.5 mg/dL (446 μmol/L). Prior and/or concurrent treatment with hypouricemic agents (eg, allopurinol, rasburicase) are allowed. Rasburicase is contraindicated in subjects with baseline glucose-6-phosphate dehydrogenase (G6PD) deficiency. (d) International normalized ratio (INR) <1.5×ULN and activated partial thromboplastin time (aPTT) <1.5×ULN. (8) Adequate organ function as defined by: (a) Renal function: Creatinine clearance ≥30 mL/minute, calculated by the Cockcroft Gault formula or measured by 24 hours urine collection; (b) Hepatic function: AST, ALT≤3× ULN, bilirubin≤1.5×ULN, unless due to Gilbert's syndrome or leukemic organ involvement. Subjects who are <75 years of age may have a bilirubin of ≤3.0×ULN; (c) Left ventricular ejection fraction (LVEF)>50% by MUGA or ECHO. (9) Subject must be able and willing to undergo hospitalization, hydration, and treatment with a uric acid-reducing agent prior to the first dose of venetoclax and during Cycle 1. (10) A female of childbearing potential (FCBP) is a female who: 1) has achieved menarche at some point, 2) has not undergone a hysterectomy or bilateral oophorectomy, or 3) has not been naturally postmenopausal (amenorrhea following cancer therapy or other medical condition does not rule out childbearing potential) for at least 24 consecutive months (ie, has had menses at any time during the preceding 24 consecutive months). Females of childbearing potential must: (a) Either commit to true abstinence* from heterosexual contact (which must be reviewed on a monthly basis and source documented) or agree to use, and be able to comply with, one highly effective contraceptive method plus one barrier method during the following time periods related to this study: 1) from signing of ICF; 2) while taking study treatment; 3) during dose interruptions; and 4) for at least 45 days after the subject's last dose of CC-90011, 30 days following the last dose of venetoclax or 90 days following the last dose of 5-azacytidine, whichever is later. Highly effective contraceptive methods are combined (containing estrogen and progestogen) or progestogen-only hormonal contraception associated with inhibition of ovulation (oral, injectable, intravaginal, patch, or implantable); bilateral tubal ligation; intra-uterine device (IUD); intrauterine hormone-releasing system; or vasectomized partner sterilization (note that vasectomized partner is a highly effective birth control method provided that partner is the sole sexual partner of the FCBP trial participant and that the vasectomized partner has received medical assessment of the surgical success). Barrier methods are male or female latex or non-latex synthetic condom, diaphragm, cervical cap or sponge with spermicide. (b) Have two negative pregnancy tests as verified by the Investigator prior to starting study treatments: (i) a negative serum pregnancy test (sensitivity of at least 25 mIU/mL) at Screening; (ii) a negative serum or urine pregnancy test within 72 hours prior to Cycle 1 Day 1 of study treatment. A urine pregnancy test must have a sensitivity of at least 25 mIU/mL. (c) Agree to ongoing pregnancy testing during the course of the study. This applies even if the subject practices true abstinence* from heterosexual contact. (d) Avoid conceiving or donating ova while on treatment and for 45 days after the last dose of CC-90011, 30 days following the last dose of venetoclax or 90 days following the last dose of 5-azacytidine, whichever is later. (11) Male subjects must: (a) Practice true abstinence* from heterosexual intercourse (which must be reviewed on a monthly basis) or agree to use a condom (a latex or non-latex synthetic condom is recommended) during sexual contact with a pregnant female or a FCBP while participating in the study, during dose interruptions, and for at least 105 days after the subject's last dose of CC-90011, 95 days following the last dose of venetoclax or 90 days following the last dose of 5-azacytidine, whichever is later, even if he has undergone a successful vasectomy. Agree not to donate semen or sperm while on treatment and for at least 105 days following the last dose of CC-90011, 95 days following the last dose of venetoclax or 90 days following the last dose of 5-azacytidine, whichever is later. (*True abstinence is acceptable when this is in line with preferred and usual lifestyle, [Periodic abstinence (eg, calendar, ovulation, symptothermal; using body temperature to determine time of ovulation) and withdrawal are not acceptable methods of contraception].)

Investigation Products (CC-90011) CC-90011 will be supplied as capsules for oral administration. The capsules will be supplied in high-density polyethylene bottles with child-resistant caps, labeled appropriately for investigational use as per the regulations of the relevant country health authority. CC-90011 formulated capsules are available in the following dosages: 20 mg, 40 mg, and 60 mg.

CC-90011 will be stored in room temperature (below 25° C. [77° F.]) and must be used within the individually assigned expiry date on the label. Subjects should not extensively handle CC-90011 capsules and should maintain storage in the packaging until ingestion.

Investigation Products (Venetoclax) Venetoclax (VEN-CLEXTA®) is available as 10 mg, 50 mg, and 100 mg tablets for oral administration. Subjects will be able to obtain commercially available product through their local hospital pharmacy or licensed distributer.

Investigation Products (5-Azacytidine) 5-Azacytidine for Injection is supplied as a lyophilized powder in 100 mg single-dose vials for reconstitution and administration. Subjects will be able to obtain commercially available product through their local hospital pharmacy or licensed distributer.

Treatment Administration and Schedule In order to allow for the best opportunity to benefit from the treatment, and given the mechanism of action of CC-90011 and the median time to response for the venetoclax and 5-azacytidine combination, subjects will be treated for at least 3 cycles, although subjects can be discontinued from the treatment sooner if they demonstrate documented relapse from CR or PR, disease progression, unacceptable adverse event(s), intercurrent illness that prevents further administration of treatment, Investigator's decision to withdraw the subject, subject withdraws consent, noncompliance with trial treatment or procedure requirements, death, or administrative reasons. In the absence of these reasons, subjects may continue on study treatment.

Subjects who discontinue CC-90011 for reasons other than relapse or resistant disease may continue on the combination drugs until there is evidence of relapse or resistant disease, or until they are no longer able to tolerate treatment due to an adverse event if the subjects are receiving benefit as per Investigator discretion. Subjects who discontinue the combination treatment of venetoclax and 5-azacytidine will also discontinue treatment with CC-90011.

CC-90011 will be given PO on a once weekly basis in a continuous 4-week (28-day) cycles (on Days 1, 8, 15, and 22). CC-90011 will be administered with at least 240 mL (8 ounces) of water. Subjects should fast for a minimum of 4 hours prior CC-90011 administration and refrain from any food intake for up to 1 hour after dosing. Subjects should abstain from food or other medication intake for at least 1 hour after each dose.

The dose escalation part will begin with a dose of CC-90011 of 20 mg PO QW in 28-day cycles. If tolerated, the second dose level cohort of 40 mg PO QW may open, followed by the planned third dose level cohort of 60 mg PO QW. If additional information regarding the safety and tolerability of CC-90011 are available at any time during the conduct of the study, alternative doses and/or schedules may be explored per recommendation of the SRC.

When CC-90011, venetoclax, and 5-azacytidine are to be administered on the same day, CC-90011 will be administered first, followed by 5-azacytidine and then venetoclax at least 6 hours after the dose of CC-90011.

Venetoclax will be administered according to the approved label (Venclexta®, 2019), orally QD on Days 1 to 28 of each 28-day cycle. A brief dose ramp-up occurs for Cycle 1 with the dosing of 100 mg on Day 1, 200 mg on Day 2, and 400 mg on Day 3. Venetoclax is administered at 400 mg on subsequent days. Subjects will be hospitalized during venetoclax dose ramp-up in Cycle 1 through at a minimum of Cycle 1 Day 8. This hospitalization is required per protocol and does not constitute a serious adverse event. Subjects should be instructed to take their daily dose at approximately the same time each day ±6 hours. Each dose should be taken with a meal and water and consumed over as short a time as possible. Subjects should be instructed to swallow tablets whole and to not chew the tablets. The consumption of grapefruit, grapefruit products, Seville oranges (including marmalade containing Seville oranges), or Star fruit within 3 days prior to the first venetoclax dose and through the last dose of venetoclax is prohibited.

5-Azacytidine will be administered according to the approved label (VIDAZA®, 2018) at 75 mg/m$^2$ on Days 1 to 7 of each 28-day cycle as an IV infusion or SC injection.

If 5-azacytidine will be administered intravenously, it should be given contralateral to the arm used for CC-90011 PK collection. This only applies to Day 1 of Cycle 1 where intensive PK sample collections for CC-90011 are performed.

In the event 2 or fewer doses are missed during the 7-day dosing period, dosing should continue so the subject receives the full 7 days of therapy. If 3 or more days are missed during the 7-day dosing period, the investigator should contact the Sponsor and a decision on dosing will be made on a case-by-case basis.

Definition of a Subject Evaluable for DLT All subjects who receive at least one dose of CC-90011 and/or combination drug(s) will be evaluable for safety.

After the first dose is administered in any cohort of subjects during dose escalation, subjects in each cohort will be observed for at least 28 days (Cycle 1, DLT window) before the next higher protocol-specified dose cohort can begin.

For a subject to be considered DLT evaluable, the subject must have either had a Cycle 1 DLT after receiving at least one dose of CC-90011 or completed Cycle 1 without a DLT. If a subject is taken off study for reason other than toxicities (eg, personal reason or disease progression) prior to their completing 75% of the planned doses of CC-90011 (ie, 3 of the 4 doses of CC-90011 in 28 days) and 80% of the total planned doses of venetoclax and 5-azacytidine (ie, >22 venetoclax doses; ≥6 doses of 5-azacytidine) of the first cycle of therapy, this subject will not be considered as having completed the treatment cycle and will be replaced.

Criteria for Dose Escalation in the Next Cohort of Subjects The SRC will make dose escalation decisions. For a dose level to be selected by the SRC for dose expansion, at least 6 subjects should be evaluated for DLT in the dose escalation part to declare a tolerable dose level.

The number of dose levels depends on incidence of DLT. A subject may experience more than one DLT. Dose escalation decisions are based on the number of subjects experiencing DLT events.

Efficacy Assessment Serial blood and bone marrow sampling will be used to determine response to study drug therapy starting at Cycle 2 Day 1.

At baseline, a bone marrow aspirate (BMA) sample is required. A biopsy must be collected if the aspirate is not available and may be collected in addition to the aspirate per institutional practice. Cytogenetic and molecular profiling from the BMA are also required at Screening (unless they are available to enter from the subject's medical records from the past 90 days). Complete blood counts, peripheral blood smears (PBS), and BMAs will be used to determine response to therapy per timepoints. Samples may be obtained up to 4 days prior to the end of the cycle, eg, Days 25 to 28.

Response to treatment will be assessed per Investigator based on reported hematology laboratory parameters, peripheral blood smear, bone marrow aspirates and/or biopsies.

Hematologic response will be evaluated as subjects with antecedent hematologic disorders may be enrolled onto study. Transfusion dependence is defined as having received ≥2 units of RBCs and/or platelets within 8 weeks prior to study treatment. Transfusion independence is defined as a period of 8 weeks with no transfusions.

Subjects are to undergo end-of treatment evaluations when study treatment is discontinued. The reason for treatment discontinuation will be recorded in the eCRF pages and in the source document.

The MRD status will also be evaluated by MFC and/or NGS centrally at each bone marrow collection.

Minimal residual disease will be assessed at the same time as efficacy assessments and will be assessed centrally. The site will ensure peripheral blood and bone marrow aspirate (BMA)/bone marrow biopsy (BMB) samples are collected and stored for exploratory testing at the time of each bone marrow collection.

Progressive disease will be defined as: (1) A >50% increase in bone marrow blast count percentage from the baseline (Screening) bone marrow blast count (a minimum 15% point increase is required in cases with <30% blasts at baseline; or persistent marrow bone marrow blast count >70%, over at least 3 months; without at least a 100% improvement in absolute neutrophil count (ANC) to an absolute level (>0.5×10$^9$/L) and/or platelet count >50×10$^9$/L nontranfused), or A >50% increase in peripheral blasts (WBC×% blasts) to >25×10⁹/L (>25,000/μL) (in the absence of differentiation syndrome), or New extramedullary disease.

The date of progressive disease is defined as the first date that there was either a >50% increase in bone marrow blast count from baseline, a persistence of bone marrow blasts >70% in subject with a baseline bone marrow blast count of >70%, a doubling of the peripheral blood blast count, or new extramedullary disease.

Treatment failure will be defined as progressive disease or not achieving at least PR. In the absence of progressive disease (as defined above) or unacceptable toxicity, subjects may continue treatment if they are deriving benefit, as judged by the Investigator.

The marrow aspiration and core sampling (biopsy) should be performed according to the standard of care and analyzed at the local site's laboratory in accordance with the International Council for Standardization in Hematology (ICSH) Guidelines.

Acute myeloid leukemia response criteria will be summarized by best overall response categories: CR/CRh rate, and overall response rate (ORR). The ORR includes all responses of complete remission (ie, CR, $CR_{MRD-}$, CRi,), morphologic leukemia-free state (MLFS), and partial remission (PR). The minimal residual disease (MRD) response rate and MRD conversion rate will also be assessed as efficacy variables.

Other measures of clinical activity including overall survival (OS), event-free survival (EFS, and duration of responses (CR/CRh and ORR) will be summarized.

After treatment is discontinued, the collection of survival data is scheduled every 4 weeks for 1 year post last dose or until death, lost to follow-up, or withdrawal of consent for further data collection.

For PK evaluation of CC-90011 in plasma, blood samples will be collected from all subjects at the time points. Time-matched triplicate ECGs will also be collected on Cycle 1 Day 1 and Cycle 1 Day 2 at the time points.

The present disclosure has been described in connection with certain embodiments and examples; however, unless otherwise indicated, the claimed invention should not be unduly limited to such specific embodiments and examples.

While certain embodiments have been illustrated and described, it should be understood that changes and modifications can be made therein in accordance with ordinary skill in the art without departing from the technology in its broader aspects as defined in the following claims.

The embodiments illustratively described herein may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof, inclusive of the endpoints. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of treating a human subject having acute myeloid leukemia (AML), wherein the method comprises administering to the subject a combination of (i) a pharmaceutical composition comprising 5-azacytidine, (ii) at least one additional therapeutic agent, and (iii) a lysine specific demethylase-1 (LSD-1) inhibitor or a pharmaceutically acceptable salt thereof,
wherein the LSD-1 inhibitor is a compound having the structure:

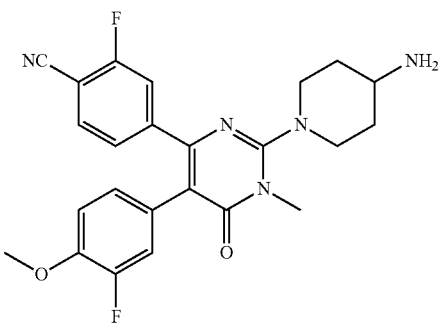 [SMILES: COc1ccc(-c2c(-c3ccc(C#N)c(F)c3)nc(N3CCC(N)CC3)n(C)c2=O)cc1F]

or a pharmaceutically acceptable salt thereof.

2. The method of claim 1, wherein the subject is not eligible for intensive induction chemotherapy.

3. The method of claim 1, wherein:
   (a) the 5-azacytidine and the at least one additional therapeutic agent are administered concomitantly; or
   (b) the 5-azacytidine and the at least one additional therapeutic agent are administered sequentially wherein the 5-azacytidine is administered first.

4. The method of claim 1, wherein:
   (a) the 5-azacytidine and the at least one additional therapeutic agent are co-formulated as a single unit dosage form; or (b) the 5-azacytidine and the at least one additional therapeutic agent are formulated as separate dosage forms.

5. The method of claim 1, wherein:
(a) the 5-azacytidine and the LSD-1 inhibitor, or a pharmaceutically acceptable salt thereof, are administered concomitantly; or
(b) the 5-azacytidine and the LSD-1 inhibitor, or a pharmaceutically acceptable salt thereof, are administered sequentially.

6. The method of claim 1, wherein:
(a) the 5-azacytidine, the at least one additional therapeutic agent, and the LSD-1 inhibitor, or a pharmaceutically acceptable salt thereof, are administered concomitantly; or
(b) the 5-azacytidine, the at least one additional therapeutic agent, and the LSD-1 inhibitor, or a pharmaceutically acceptable salt thereof, are administered sequentially.

7. The method of claim 1, wherein the 5-azacytidine is administered:
(a) subcutaneously or intravenously; and/or
(b) at a dose of about 75 mg/m$^2$ to about 100 mg/m$^2$ subcutaneously or intravenously; and/or
(c) at a dose of about 75 mg/m$^2$ subcutaneously or intravenously; and/or
(d) subcutaneously or intravenously daily for the first seven days of a 28-day cycle.

8. The method of claim 1, wherein the 5-azacytidine is administered:
(a) at a dose of about 50 mg, about 60 mg, about 70 mg, about 80 mg, about 90 mg, about 100 mg, about 150 mg, about 200 mg, about 250 mg, about 300 mg, about 350 mg, about 400 mg, about 450 mg, about 500 mg, about 550 mg, or 600 mg orally; and/or
(b) at a dose of about 200 mg; and/or
(c) at a dose of about 300 mg; and/or
(d) for the first seven, fourteen, or twenty-one days of a 28 day cycle; and/or
(e) to the human subject one or two times per day; and/or;
(f) in the form of a capsule or a tablet.

9. The method of claim 8, wherein the 5-azacytidine is administered in the form of a non-enteric-coated tablet.

10. The method of claim 1, wherein the 5-azacytidine is administered orally:
(a) at a dose of about 200 mg per day for 14 days in a 28-day cycle;
(b) at a dose of about 300 mg per day for 14 days in a 28-day cycle;
(c) at a dose of about 200 mg per day for 21 days in a 28-day cycle; or
(d) at a dose of about 300 mg per day for 21 days in a 28-day cycle.

11. The method of claim 1, wherein the 5-azacytidine is administered orally:
(a) daily for 1, 2, 3, 4, 5, 6, 7, 8, 9, 10, 11, 12, 13, 14, or greater than 14 days, optionally followed by a treatment dosing holiday of 1, 2, 3, 4, 5, 6, 7, 8, 9, 10, 11, 12, 13, 14, or greater than 14 days;
(b) daily for 14 or more days, optionally followed by a treatment dosing holiday of 7 or more days;
(c) for 21 or more days, optionally followed by a treatment dosing holiday of 7 or more days;
(d) for 14 days, optionally followed by a treatment dosing holiday of 14 days;
(e) for 21 or more days, followed by a treatment dosing holiday of 7 or more days; or
(f) for 14 days, followed by a treatment dosing holiday of 14 days.

12. The method of claim 1, wherein the 5-azacytidine is administered orally:
(a) at a dose of about 300 mg daily for 14 days, followed by a treatment dosing holiday of 14 days;
(b) at a dose of about 200 mg daily for 14 days, followed by a treatment dosing holiday of 14 days;
(c) at a dose of about 300 mg daily for 21 days, followed by a treatment dosing holiday of 7 days; or
(d) at a dose of about 200 mg daily, followed by a treatment dosing holiday of 7 days.

13. The method of claim 1, wherein the 5-azacytidine is administered orally:
(a) using a treatment cycle comprising administration of 5-azacytidine per day for 7 days in a 28-day cycle;
(b) using a treatment cycle comprising administration of 5-azacytidine per day for 14 days in a 28-day cycle; or
(c) using a treatment cycle comprising administration of 5-azacytidine per day for 21 days in a 28-day cycle.

14. The method of claim 1, wherein the at least one additional therapeutic agent comprises gilteritinib, midostaurin, quizartinib, enasidenib, ivosidenib, and/or venetoclax.

15. The method of claim 14, wherein the at least one additional therapeutic agent is venetoclax.

16. The method of claim 15, wherein the venetoclax is administered:
(a) orally; and/or
(b) in a form of a tablet; and/or
(c) daily; and/or
(d) at a dose of about 400 mg.

17. The method of claim 1, wherein the LSD-1 inhibitor, or a pharmaceutically acceptable salt thereof, is administered:
(a) orally; and/or
(b) in a form of a tablet or capsule; and/or
(c) once a week; and/or
(d) at a dose of about 20 mg, about 40 mg, or about 60 mg.

18. The method of claim 1, wherein:
(a) the AML is resistant to treatment with the 5-azacytidine alone; and/or
(b) the AML is resistant to treatment with the at least one additional therapeutic agent alone; and/or
(c) the AML is resistant to treatment with the LSD-1 inhibitor, or a pharmaceutically acceptable salt thereof alone; and/or
(d) the combination of the 5-azacytidine, the at least one additional therapeutic agent, LSD-1 inhibitor, and a pharmaceutically acceptable salt thereof, increases AML cell death as compared to the 5-azacytidine alone; and/or
(e) the combination of the 5-azacytidine, the at least one additional therapeutic agent, LSD-1 inhibitor, and a pharmaceutically acceptable salt thereof, increases AML cell death as compared to the 5-azacytidine alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%; and/or
(f) the combination of the 5-azacytidine, the at least one additional therapeutic agent, LSD-1 inhibitor, and a pharmaceutically acceptable salt thereof, increases AML cell death as compared to at least one additional therapeutic agent alone; and/or (g) the combination of the 5-azacytidine, the at least one additional therapeutic agent, LSD-1 inhibitor, and a pharmaceutically acceptable salt thereof, increases AML cell death as compared to the at least one additional therapeutic agent alone by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%; and/or (h) the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof; and/or (i) the combination of 5-azacytidine, the at least one additional therapeutic agent, LSD-1 inhibitor, and a pharmaceutically acceptable salt thereof, increases AML cell death as compared to the LSD-1 inhibitor, or a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%; and/or (j) the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof; and/or (k) the combination of 5-azacytidine, the at least one additional therapeutic agent, LSD-1 inhibitor, and a pharmaceutically acceptable salt thereof, increases AML cell death compared to the combination of any two of 5-azacytidine, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%; and/or (l) the 5-azacytidine administered orally and at least one additional therapeutic agent increases AML cell death as compared to 5-azacytidine administered intravenously or subcutaneously and at least one additional therapeutic agent; and/or (m) the 5-azacytidine administered orally and at least one additional therapeutic agent increases AML cell death as compared to 5-azacytidine administered intravenously or subcutaneously and at least one additional therapeutic agent by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%; and/or (n) the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof; and/or (o) the combination of the 5-azacytidine administered orally, the at least one additional therapeutic agent, LSD-1 inhibitor, and a pharmaceutically acceptable salt thereof, increases AML cell death compared to the combination of the 5-azacytidine administered intravenously or subcutaneously, the at least one additional therapeutic agent, LSD-1 inhibitor, and a pharmaceutically acceptable salt thereof by about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

19. The method of claim 1, wherein the method comprises:
(a) administering the 5-azacytidine subcutaneously or intravenously to the subject once daily for the first 7 days of a 28 day cycle;
(b) administering the at least one additional therapeutic agent to the subject once daily in a 28 day cycle; and
(c) administering the LSD-1 inhibitor, or a pharmaceutically acceptable salt thereof, to the subject once a week in a 28 day cycle.

20. The method of claim 1, wherein the method comprises:
(a) administering the 5-azacytidine subcutaneously or intravenously to the subject on days 1, 2, 3, 4, 5, 6, and 7 days of a 28 day cycle;
(b) administering the at least one additional therapeutic agent to the subject on days 1,2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and
(c) administering the LSD-1 inhibitor, or a pharmaceutically acceptable salt thereof, to the subject on days 1, 8, 15, and 22 of a 28 day cycle.

21. The method of claim 20, furthering comprising:
(a) administering the 5-azacytidine at a dose of about 75 mg/m$^2$ subcutaneously or intravenously every day for the first seven days of a 28 day cycle; and/or
(b) administering the at least one additional therapeutic agent to the subject at a dose of at least about 100 mg every day of a 28 day cycle; and/or
(c) administering the LSD-1 inhibitor to the subject at a dose of about 20 mg, about 40 mg, or about 60 mg once a week of a 28 day cycle.

22. The method of claim 21, wherein the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle.

23. The method of claim 1, wherein the method comprises:
(a) administering the 5-azacytidine at a dose of about 75 mg/m$^2$ subcutaneously or intravenously every day for the first seven days of a 28 day cycle; and/or
(b) administering the at least one additional therapeutic agent to the subject at a dose of about 400 mg orally every day of a 28 day cycle; and/or
(c) administering the LSD-1 inhibitor to the subject at a dose of about 20 mg, about 40 mg or about 60 mg orally once a week of a 28 day cycle.

24. The method of claim 23, wherein administering the at least one additional therapeutic agent comprises administering venetoclax.

25. The method of claim 1, wherein the method comprises the steps of:
(a) administering the 5-azacytidine orally to the subject once daily for the first 14 days of a 28 day cycle;

(b) administering the at least one additional therapeutic agent to the subject once daily in a 28 day cycle; and (c) administering the LSD-1 inhibitor, or a pharmaceutically acceptable salt thereof, to the subject once a week in a 28 day cycle.

26. The method of claim 1, wherein the method comprises the steps of:

(a) administering the 5-azacytidine orally to the subject on days 1, 2, 3, 4, 5, 6, 7, 8, 9, 10, 11, 12, 13, and 14 of a 28 day cycle;

(b) administering the at least one additional therapeutic agent to the subject on days 1, 2, 3, 4, 5, 6, 7, 8, 9, 10, 11, 12, 13, 14, 15, 16, 17, 18, 19, 20, 21, 22, 23, 24, 25, 26, 27, and 28 of a 28 day cycle; and (c) administering the LSD-1 inhibitor, or a pharmaceutically acceptable salt thereof, to the subject on days 1, 8, 15, and 22 of a 28 day cycle.

27. The method of claim 26, furthering comprising:

(a) administering the 5-azacytidine at a dose of about 300 mg every day for the first fourteen days of a 28 day cycle; and/or (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

28. The method of claim 27, wherein the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle.

29. The method of claim 1, wherein the method comprises:

(a) administering the 5-azacytidine at a dose of about 300 mg orally every day for the first fourteen days of a 28 day cycle; and/or (b) administering the at least one additional therapeutic agent to the subject at a dose of about 400 mg orally every day of a 28 day cycle; and/or (c) administering the LSD-1 inhibitor to the subject at a dose of about 20 mg, about 40 mg or about 60 mg orally once a week of a 28 day cycle.

30. The method of claim 29, wherein administering the at least one additional therapeutic agent comprises administering venetoclax.

31. The method of claim 26, furthering comprising:

(a) administering the 5-azacytidine at a dose of about 200 mg every day for the first fourteen days of a 28 day cycle; and/or (b) administering the at least one additional therapeutic agent to the subject at a dose of at least about 100 mg every day of a 28 day cycle; and/or (c) administering the LSD-1 inhibitor to the subject at a dose of about 20 mg, about 40 mg, or about 60 mg once a week of a 28 day cycle.

32. The method of claim 31, wherein the method comprises concurrently administering the at least one additional therapeutic agent to the subject a dose of about 100 mg on Day 1, a dose of about 200 mg on Day 2, a dose of about 300 mg on Day 3, and a dose of about 400 mg on Days 4-28 of a 28 day cycle.

33. The method of claim 1, wherein the method comprises:

(a) administering the 5-azacytidine at a dose of about 200 mg orally every day for the first fourteen days of a 28 day cycle; and/or (b) administering the at least one additional therapeutic agent to the subject at a dose of about 400 mg orally every day of a 28 day cycle; and/or (c) administering the LSD-1 inhibitor to the subject at a dose of about 20 mg, about 40 mg or about 60 mg orally once a week of a 28 day cycle.

34. The method of claim 33, wherein administering the at least one additional therapeutic agent comprises administering venetoclax.

35. The method of claim 1, wherein the acute myeloid leukemia comprises acute myeloid leukemia with recurrent genetic abnormalities, acute myeloid leukemia with myelodysplasia-related changes, therapy-related myeloid neoplasms, myeloid sarcoma, myeloid proliferations related to Down syndrome, blastic plasmacytoid dendritic cell neoplasm, and/or acute promyelocytic leukaemia.

36. A method of treating a human subject having acute myeloid leukemia (AML) who is not eligible for intensive induction chemotherapy, the method comprises administering to the human subject:

(i) in a first continuous 28-day cycle:

(a) the 5-azacytidine subcutaneously or intravenously daily at a dose of about 75 mg/m$^2$ on Days 1 to 7;

(b) the venetoclax orally at a dose of about 100 mg on Day 1; about 200 mg on Day 2, and about 400 mg daily on Days 3 to 28; and (c) a pharmaceutical composition comprising the besylate salt of the following compound:

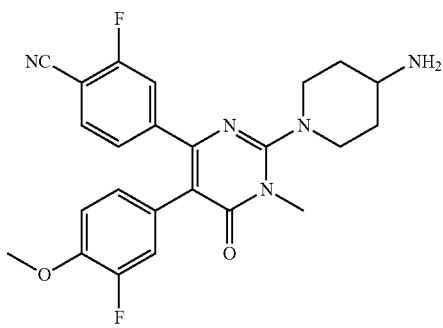 [SMILES: COc1ccc(-c2c(-c3ccc(C#N)c(F)c3)nc(N3CCC(N)CC3)n(C)c2=O)cc1F]

on Days 1, 8, 15, and 22; and (ii) in subsequent 28 day cycles:

(d) the 5-azacytidine subcutaneously or intravenously daily at a dose of about 75 mg/m$^2$ on Days 1 to 7 of each subsequent cycle;

(e) the venetoclax orally at a dose of about 400 mg on Days 1 to 28 of each subsequent cycle; and (f) a pharmaceutical composition comprising the besylate salt of the following compound

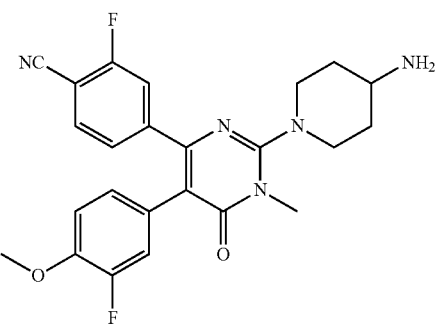 [SMILES: COc1ccc(-c2c(-c3ccc(C#N)c(F)c3)nc(N3CCC(N)CC3)n(C)c2=O)cc1F]

on Days 1, 8, 15, and 22 of each subsequent cycle.

37. The method of claim 36, wherein the pharmaceutical composition is administered at:
   (a) the dose of about 20 mg in the first continuous 28-day cycle and subsequent 28 day cycles;
   (b) the dose of about 40 mg in the first continuous 28-day cycle and subsequent 28 day cycles; or
   (c) the dose of about 60 mg in the first continuous 28-day cycle and subsequent 28 day cycles.

38. The method of claim 37, wherein the pharmaceutical composition is administered at the dose of about 20 mg in the first continuous 28-day cycle and subsequent 28 day cycles; and if the dose of 20 mg is tolerated, then a second dose cohort will open where the pharmaceutical composition is administered at the dose of about 40 mg in the first continuous 28-day cycle and subsequent 28 day cycles.

39. The method of claim 38, wherein if the dose of 40 mg is tolerated, then a third dose cohort will open where the pharmaceutical composition is administered at the dose of about 40 mg in the first continuous 28-day cycle and subsequent 28 day cycles.

* * * * *